US011042131B2

(12) United States Patent
Strohmenger et al.

(10) Patent No.: US 11,042,131 B2
(45) Date of Patent: Jun. 22, 2021

(54) BACKUP OF AN INDUSTRIAL AUTOMATION PLANT IN THE CLOUD

(71) Applicant: Rockwell Automation Technologies, Inc., Mayfield Heights, OH (US)

(72) Inventors: John Strohmenger, Strongsville, OH (US); Jessica L. Korpela, Milwaukee, WI (US); Matthew W. Fordenwalt, Hudson, OH (US); Jan Pingel, Weddington, NC (US); Stephen L. Hickox, Middlefield, OH (US); Douglas B. Weber, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 11 days.

(21) Appl. No.: 14/658,394

(22) Filed: Mar. 16, 2015

(65) Prior Publication Data
US 2016/0274978 A1    Sep. 22, 2016

(51) Int. Cl.
*G05B 13/04*     (2006.01)
*G05B 19/042*    (2006.01)
(Continued)

(52) U.S. Cl.
CPC ............. *G05B 13/04* (2013.01); *G05B 15/02* (2013.01); *G05B 19/0426* (2013.01); *G06F 11/1458* (2013.01); *G06F 2201/84* (2013.01)

(58) Field of Classification Search
CPC ............ G05B 19/0428; G05B 23/0237; G06Q 10/06; G06F 2201/84
(Continued)

(56) References Cited
U.S. PATENT DOCUMENTS

| 5,014,317 A | 5/1991 | Kita et al. |
|---|---|---|
| 5,112,948 A | 6/1992 | Zapolin |

(Continued)

FOREIGN PATENT DOCUMENTS

| CN | 1232553 A | 10/1999 |
|---|---|---|
| CN | 1529837 A | 9/2004 |

(Continued)

OTHER PUBLICATIONS

Extended European Search Report for EP Patent Application Serial No. 16160611.6, dated Aug. 24, 2016, 10 pages.
(Continued)

*Primary Examiner* — Santosh R Poudel
(74) *Attorney, Agent, or Firm* — Amin, Turocy & Watson, LLP

(57) ABSTRACT

Cloud-based backup provides a back up of an industrial plant comprising an industrial automation system(s) (IAS (s)). A cloud-based backup component comprising a modeler component can generate a model of industrial assets of the IAS(s) and relationships between industrial assets based on information obtained from the industrial assets via cloud gateways, a communication device associated with the IAS (s), or another source. The cloud-based backup component can store the model in a data store to be employed as a backup of the IAS(s) or to be used to configure a new IAS that is the same as or similar to the IAS(s). The model can be stored in the data store in a standardized or an agnostic format, wherein the backup component can translate the model to a format suitable to an IAS for which it is to be implemented based on characteristics associated with the IAS.

29 Claims, 17 Drawing Sheets

(51) Int. Cl.
    *G05B 15/02* (2006.01)
    *G06F 11/14* (2006.01)
(58) Field of Classification Search
    USPC .......................................................... 700/29
    See application file for complete search history.

(56) References Cited

U.S. PATENT DOCUMENTS

| | | | |
|---|---|---|---|
| 5,199,009 A | 3/1993 | Svast | |
| 5,598,572 A | 1/1997 | Tanikoshi et al. | |
| 5,611,059 A | 3/1997 | Benton et al. | |
| 5,612,869 A | 3/1997 | Letzt et al. | |
| 5,682,460 A | 10/1997 | Hyziak et al. | |
| 5,710,885 A | 1/1998 | Bondi | |
| 5,844,794 A | 12/1998 | Keeley | |
| 5,845,149 A | 12/1998 | Husted et al. | |
| 5,856,931 A | 1/1999 | McCasland | |
| 5,957,985 A | 9/1999 | Wong et al. | |
| 5,966,301 A | 10/1999 | Cook et al. | |
| 5,970,430 A | 10/1999 | Burns et al. | |
| 5,978,568 A | 11/1999 | Abraham et al. | |
| 6,167,337 A | 12/2000 | Haack | |
| 6,175,770 B1 | 1/2001 | Bladow | |
| 6,175,801 B1 | 1/2001 | Millington | |
| 6,199,068 B1 | 3/2001 | Carpenter | |
| 6,279,113 B1 | 8/2001 | Vaidya | |
| 6,282,455 B1 | 8/2001 | Engdahl | |
| 6,324,607 B1 | 11/2001 | Korowitz et al. | |
| 6,381,502 B1 | 4/2002 | Rudder et al. | |
| 6,400,996 B1 | 6/2002 | Hoffberg et al. | |
| 6,412,032 B1 | 6/2002 | Neet et al. | |
| 6,437,692 B1 | 8/2002 | Petite et al. | |
| 6,457,024 B1 | 9/2002 | Felsentein et al. | |
| 6,463,338 B1 | 10/2002 | Neet | |
| 6,466,972 B1 * | 10/2002 | Paul | G06F 9/4416 709/219 |
| 6,529,780 B1 | 3/2003 | Soergel et al. | |
| 6,535,926 B1 | 3/2003 | Esker | |
| 6,578,005 B1 | 6/2003 | Lesaint et al. | |
| 6,624,388 B1 | 9/2003 | Blankenship et al. | |
| 6,640,145 B2 | 10/2003 | Hoffberg et al. | |
| 6,651,062 B2 | 11/2003 | Ghannam et al. | |
| 6,675,226 B1 | 1/2004 | Nair et al. | |
| 6,686,838 B1 | 2/2004 | Rezvani et al. | |
| 6,691,159 B1 | 2/2004 | Grewal et al. | |
| 6,705,229 B2 | 3/2004 | Frankenberger | |
| 6,708,074 B1 | 3/2004 | Chi et al. | |
| 6,708,385 B1 | 3/2004 | Lemelson | |
| 6,714,974 B1 | 3/2004 | Machida | |
| 6,728,262 B1 | 4/2004 | Woram | |
| 6,732,165 B1 | 5/2004 | Jennings, III | |
| 6,732,191 B1 | 5/2004 | Baker et al. | |
| 6,757,897 B1 | 6/2004 | Shi et al. | |
| 6,774,598 B1 | 8/2004 | Kohler | |
| 6,801,920 B1 | 10/2004 | Wischinski | |
| 6,819,960 B1 | 11/2004 | McKelvey et al. | |
| 6,891,850 B1 | 5/2005 | Vandesteeg et al. | |
| 6,895,532 B2 | 5/2005 | Raynham | |
| 6,904,600 B1 | 6/2005 | James et al. | |
| 6,907,302 B2 | 6/2005 | Karbassi | |
| 6,920,502 B2 | 7/2005 | Araujo et al. | |
| 6,952,680 B1 | 10/2005 | Melby et al. | |
| 6,965,802 B2 | 11/2005 | Sexton | |
| 6,968,242 B1 | 11/2005 | Hwu et al. | |
| 6,970,913 B1 | 11/2005 | Albert et al. | |
| 6,982,953 B1 | 1/2006 | Swales | |
| 7,032,045 B2 | 4/2006 | Kostadinov | |
| 7,085,814 B1 | 8/2006 | Gandhi et al. | |
| 7,103,428 B2 | 9/2006 | Varone et al. | |
| 7,133,900 B1 | 11/2006 | Szeto | |
| 7,149,792 B1 | 12/2006 | Hansen et al. | |
| 7,151,966 B1 | 12/2006 | Baier et al. | |
| 7,203,560 B1 | 4/2007 | Wylie et al. | |
| 7,210,095 B1 | 4/2007 | Mor | |
| 7,233,830 B1 | 6/2007 | Callaghan et al. | |
| 7,242,009 B1 | 7/2007 | Wilson et al. | |
| 7,275,037 B2 | 9/2007 | Lauer | |
| 7,277,865 B1 | 10/2007 | Silverstone et al. | |
| 7,289,994 B2 | 10/2007 | Nixon et al. | |
| 7,298,275 B2 | 11/2007 | Brandt et al. | |
| 7,310,344 B1 | 12/2007 | Sue | |
| 7,383,155 B2 | 6/2008 | Rosam et al. | |
| 7,412,548 B2 | 8/2008 | Sichner | |
| 7,428,495 B2 | 9/2008 | Dhar et al. | |
| 7,478,010 B2 | 1/2009 | Hashemian | |
| 7,480,728 B2 | 1/2009 | Evans | |
| 7,539,724 B1 | 5/2009 | Callaghan | |
| 7,734,590 B2 | 6/2010 | Chand et al. | |
| 7,827,122 B1 | 11/2010 | Campbell, Jr. et al. | |
| 7,831,317 B2 | 11/2010 | McGreevy et al. | |
| 8,150,959 B1 | 4/2012 | Bezdicek et al. | |
| 8,266,066 B1 | 9/2012 | Wezter et al. | |
| 8,353,012 B2 | 1/2013 | Del Real | |
| 8,392,845 B2 | 3/2013 | Cahill et al. | |
| 8,451,753 B2 | 5/2013 | Vanga et al. | |
| 8,468,272 B2 | 6/2013 | Giroti | |
| 8,686,871 B2 | 4/2014 | Jensen et al. | |
| 8,924,328 B1 * | 12/2014 | Kozlovsky | H04L 41/0816 703/2 |
| 9,024,955 B2 | 5/2015 | Ramarao et al. | |
| 9,117,076 B2 | 8/2015 | Devost | |
| 9,438,648 B2 | 9/2016 | Asenjo et al. | |
| 9,507,807 B1 | 11/2016 | Florissi et al. | |
| 9,685,053 B2 | 6/2017 | Palmeri | |
| 9,690,669 B2 * | 6/2017 | Bernal | G06F 11/1461 |
| 10,026,049 B2 | 7/2018 | Asenjo et al. | |
| 10,054,914 B2 | 8/2018 | Vartiainen et al. | |
| 2001/0035729 A1 | 11/2001 | Graiger et al. | |
| 2002/0004798 A1 | 1/2002 | Babula et al. | |
| 2002/0016839 A1 | 2/2002 | Smith | |
| 2002/0042756 A1 | 4/2002 | Kumar et al. | |
| 2002/0046239 A1 | 4/2002 | Stawikowski et al. | |
| 2002/0049833 A1 | 4/2002 | Kikinis | |
| 2002/0065898 A1 | 5/2002 | Leontiev et al. | |
| 2002/0068983 A1 | 6/2002 | Sexton | |
| 2002/0068984 A1 | 6/2002 | Alexander et al. | |
| 2002/0073236 A1 | 6/2002 | Helgeron et al. | |
| 2002/0077711 A1 | 6/2002 | Nixon et al. | |
| 2002/0078432 A1 | 6/2002 | Charisius et al. | |
| 2002/0082966 A1 | 6/2002 | O'Brien et al. | |
| 2002/0094588 A1 | 7/2002 | Fan et al. | |
| 2002/0096077 A1 | 7/2002 | Frankenberger | |
| 2002/0107904 A1 | 8/2002 | Talluri et al. | |
| 2002/0138378 A1 | 9/2002 | Leskuski | |
| 2002/0156872 A1 | 10/2002 | Brown | |
| 2002/0156926 A1 | 10/2002 | Batka | |
| 2002/0161745 A1 | 10/2002 | Call | |
| 2002/0169993 A1 | 11/2002 | Woods et al. | |
| 2003/0004937 A1 | 1/2003 | Salmenkaita et al. | |
| 2003/0009253 A1 | 1/2003 | McIntyre et al. | |
| 2003/0009572 A1 | 1/2003 | Thurner | |
| 2003/0011467 A1 | 1/2003 | Suomela | |
| 2003/0014149 A1 | 1/2003 | Kreidler et al. | |
| 2003/0023336 A1 | 1/2003 | Kreidler et al. | |
| 2003/0033179 A1 | 2/2003 | Katz et al. | |
| 2003/0041089 A1 | 2/2003 | Mauro | |
| 2003/0051074 A1 | 3/2003 | Edwards | |
| 2003/0056224 A1 | 3/2003 | Stone | |
| 2003/0084016 A1 | 5/2003 | Norgaard et al. | |
| 2003/0105535 A1 | 6/2003 | Rammler | |
| 2003/0105585 A1 | 6/2003 | Ukita | |
| 2003/0109942 A1 | 6/2003 | Yeh et al. | |
| 2003/0120817 A1 | 6/2003 | Ott et al. | |
| 2003/0150908 A1 | 8/2003 | Pokorny et al. | |
| 2003/0156639 A1 | 8/2003 | Liang | |
| 2003/0167238 A1 | 9/2003 | Zeif | |
| 2003/0167449 A1 | 9/2003 | Warren et al. | |
| 2003/0177169 A1 | 9/2003 | Nutt et al. | |
| 2003/0177201 A1 | 9/2003 | Shen | |
| 2003/0198188 A1 | 10/2003 | Castlebury et al. | |
| 2003/0208545 A1 | 11/2003 | Eaton et al. | |
| 2003/0217100 A1 | 11/2003 | Kronk | |
| 2003/0224769 A1 | 12/2003 | Solve et al. | |
| 2003/0236576 A1 | 12/2003 | Resnick et al. | |

(56) References Cited

U.S. PATENT DOCUMENTS

| | | | |
|---|---|---|---|
| 2004/0024572 A1* | 2/2004 | Pagnano | G05B 19/0425 702/188 |
| 2004/0025173 A1 | 2/2004 | Levonai et al. | |
| 2004/0032935 A1 | 2/2004 | Mills et al. | |
| 2004/0083165 A1 | 4/2004 | Lawrence | |
| 2004/0111512 A1 | 6/2004 | Barth | |
| 2004/0148039 A1 | 7/2004 | Farchmin et al. | |
| 2004/0148187 A1 | 7/2004 | Boettcher et al. | |
| 2004/0148383 A1 | 7/2004 | Gonsalves | |
| 2004/0159113 A1 | 8/2004 | Singh et al. | |
| 2004/0199573 A1 | 10/2004 | Schwartz et al. | |
| 2004/0203895 A1 | 10/2004 | Balasuriya | |
| 2004/0214566 A1 | 10/2004 | Suzuki et al. | |
| 2004/0215551 A1 | 10/2004 | Eder | |
| 2004/0225629 A1 | 11/2004 | Eder | |
| 2004/0267729 A1 | 12/2004 | Swaminathan et al. | |
| 2005/0005093 A1 | 1/2005 | Bartels et al. | |
| 2005/0021158 A1 | 1/2005 | De meyer et al. | |
| 2005/0038528 A1 | 2/2005 | McKlvey et al. | |
| 2005/0055429 A1 | 3/2005 | Abele | |
| 2005/0080799 A1 | 4/2005 | Hamden et al. | |
| 2005/0091410 A1 | 4/2005 | Gibart et al. | |
| 2005/0120112 A1 | 6/2005 | Wing et al. | |
| 2005/0125441 A1 | 6/2005 | Clemens et al. | |
| 2005/0137735 A1 | 6/2005 | Loy et al. | |
| 2005/0149922 A1 | 7/2005 | Vincent | |
| 2005/0203869 A1 | 9/2005 | Minamino et al. | |
| 2005/0209902 A1 | 9/2005 | Iwasaki et al. | |
| 2005/0257204 A1 | 11/2005 | Bryant et al. | |
| 2005/0278441 A1 | 12/2005 | Bond et al. | |
| 2006/0022048 A1 | 2/2006 | Johnson | |
| 2006/0026193 A1* | 2/2006 | Hood | G05B 19/0426 |
| 2006/0046712 A1 | 3/2006 | Shamp et al. | |
| 2006/0077095 A1 | 4/2006 | Tucker et al. | |
| 2006/0078859 A1* | 4/2006 | Mullin | G03G 15/5016 434/219 |
| 2006/0149813 A1 | 7/2006 | Janik | |
| 2006/0153089 A1 | 7/2006 | Silverman | |
| 2006/0173873 A1 | 8/2006 | Prompt et al. | |
| 2006/0190106 A1 | 8/2006 | Kay et al. | |
| 2006/0236374 A1 | 10/2006 | Hartman | |
| 2006/0253205 A1 | 11/2006 | Gardiner | |
| 2006/0259472 A1 | 11/2006 | MacClellan | |
| 2006/0282432 A1 | 12/2006 | Cassidy et al. | |
| 2007/0008129 A1 | 1/2007 | Soliman | |
| 2007/0019641 A1 | 1/2007 | Pai et al. | |
| 2007/0021968 A1 | 1/2007 | Amir et al. | |
| 2007/0050206 A1 | 3/2007 | Whikehart et al. | |
| 2007/0061018 A1 | 3/2007 | Callaghan et al. | |
| 2007/0073850 A1 | 3/2007 | Callaghan et al. | |
| 2007/0078525 A1 | 4/2007 | Chand | |
| 2007/0078536 A1 | 4/2007 | Gordon et al. | |
| 2007/0078537 A1 | 4/2007 | Chand et al. | |
| 2007/0078736 A1 | 4/2007 | Chand et al. | |
| 2007/0078862 A1 | 4/2007 | Chand et al. | |
| 2007/0095907 A1 | 5/2007 | Robinson et al. | |
| 2007/0112801 A1 | 5/2007 | McGreevy et al. | |
| 2007/0118560 A1 | 5/2007 | Bomhoevd et al. | |
| 2007/0130112 A1 | 6/2007 | Lin | |
| 2007/0168057 A1 | 7/2007 | Blevins et al. | |
| 2007/0192213 A1 | 8/2007 | Wu et al. | |
| 2007/0194097 A1 | 8/2007 | Jones | |
| 2007/0213989 A1 | 9/2007 | Cooksy et al. | |
| 2007/0244892 A1 | 10/2007 | Narancic | |
| 2007/0245169 A1 | 10/2007 | Farchmin et al. | |
| 2007/0247789 A1 | 10/2007 | Benson et al. | |
| 2007/0255431 A1 | 11/2007 | Kinsey | |
| 2008/0004739 A1 | 1/2008 | Varadhan et al. | |
| 2008/0027704 A1 | 1/2008 | Kephart | |
| 2008/0049013 A1 | 2/2008 | Nasle | |
| 2008/0065243 A1 | 3/2008 | Fallman et al. | |
| 2008/0077512 A1 | 3/2008 | Grewal | |
| 2008/0082186 A1 | 4/2008 | Hood et al. | |
| 2008/0109099 A1 | 5/2008 | Moshier | |
| 2008/0125887 A1 | 5/2008 | Case | |
| 2008/0155064 A1 | 6/2008 | Kosuge | |
| 2008/0162688 A1 | 7/2008 | Reumann et al. | |
| 2008/0189637 A1 | 8/2008 | Krajewski et al. | |
| 2008/0208365 A1 | 8/2008 | Grgic et al. | |
| 2008/0209211 A1 | 8/2008 | Grgic et al. | |
| 2008/0214104 A1 | 9/2008 | Baumert et al. | |
| 2008/0263514 A1 | 10/2008 | DeMesa | |
| 2008/0303472 A1* | 12/2008 | John | G05B 19/0426 318/568.2 |
| 2009/0024440 A1 | 1/2009 | Spahn | |
| 2009/0037378 A1 | 2/2009 | Moor et al. | |
| 2009/0037872 A1 | 2/2009 | Schnabele et al. | |
| 2009/0063258 A1 | 3/2009 | Mueller et al. | |
| 2009/0065578 A1 | 3/2009 | Peterson et al. | |
| 2009/0070163 A1 | 3/2009 | Angell et al. | |
| 2009/0083204 A1 | 3/2009 | Baier et al. | |
| 2009/0086692 A1 | 4/2009 | Chen | |
| 2009/0088875 A1 | 4/2009 | Baier et al. | |
| 2009/0089032 A1 | 4/2009 | Sturrock et al. | |
| 2009/0089233 A1 | 4/2009 | Gach et al. | |
| 2009/0089359 A1 | 4/2009 | Siorek et al. | |
| 2009/0089682 A1 | 4/2009 | Baier | |
| 2009/0109889 A1 | 4/2009 | Budampati et al. | |
| 2009/0125460 A1 | 5/2009 | Hewison et al. | |
| 2009/0127325 A1 | 5/2009 | Macurek et al. | |
| 2009/0132458 A1 | 5/2009 | Edwards et al. | |
| 2009/0182689 A1 | 7/2009 | Chiles et al. | |
| 2009/0204234 A1 | 8/2009 | Sustaeta et al. | |
| 2009/0210071 A1 | 8/2009 | Agrusa et al. | |
| 2009/0210814 A1 | 8/2009 | Agrusa et al. | |
| 2009/0216341 A1 | 8/2009 | Enkerud et al. | |
| 2009/0300151 A1 | 12/2009 | Friedman et al. | |
| 2009/0316977 A1 | 12/2009 | Juncker et al. | |
| 2009/0319831 A1 | 12/2009 | Kruchinin et al. | |
| 2010/0010859 A1 | 1/2010 | Ratakonda et al. | |
| 2010/0023562 A1 | 1/2010 | Kreuch et al. | |
| 2010/0057660 A1 | 3/2010 | Kato | |
| 2010/0076575 A1 | 3/2010 | Vasko et al. | |
| 2010/0082127 A1 | 4/2010 | Plache et al. | |
| 2010/0082129 A1 | 4/2010 | McGreevy et al. | |
| 2010/0082142 A1 | 4/2010 | Usadi et al. | |
| 2010/0082453 A1 | 4/2010 | Speers et al. | |
| 2010/0082669 A1 | 4/2010 | Obitko et al. | |
| 2010/0083232 A1 | 4/2010 | Chouinard et al. | |
| 2010/0118895 A1 | 5/2010 | Radulescu | |
| 2010/0146014 A1 | 6/2010 | Ionescu et al. | |
| 2010/0153487 A1 | 6/2010 | Greven et al. | |
| 2010/0192144 A1 | 7/2010 | Schmit | |
| 2010/0211509 A1 | 8/2010 | Jacobs | |
| 2010/0219950 A1 | 9/2010 | Kong et al. | |
| 2010/0223212 A1 | 9/2010 | Manolescu et al. | |
| 2010/0241260 A1 | 9/2010 | Kilibarda et al. | |
| 2010/0256795 A1 | 10/2010 | McLaughlin et al. | |
| 2010/0257227 A1 | 10/2010 | McLaughlin | |
| 2010/0257228 A1 | 10/2010 | Staggs et al. | |
| 2010/0306377 A1 | 12/2010 | DeHaan et al. | |
| 2010/0318392 A1 | 12/2010 | Cassels et al. | |
| 2010/0318837 A1* | 12/2010 | Murphy | G06F 11/1461 714/4.1 |
| 2010/0324855 A1 | 12/2010 | Parker | |
| 2010/0332008 A1 | 12/2010 | Knipfer et al. | |
| 2011/0016058 A1 | 1/2011 | Pinchuk | |
| 2011/0035253 A1 | 2/2011 | Mason et al. | |
| 2011/0047230 A1 | 2/2011 | McGee | |
| 2011/0078300 A9 | 3/2011 | Grelewicz et al. | |
| 2011/0093308 A1 | 4/2011 | Majeed | |
| 2011/0161378 A1 | 6/2011 | Williamson | |
| 2011/0173127 A1 | 7/2011 | Ho et al. | |
| 2011/0257766 A1 | 10/2011 | Sundaram et al. | |
| 2011/0265020 A1 | 10/2011 | Fields et al. | |
| 2011/0276498 A1 | 11/2011 | Madhik | |
| 2011/0288667 A1 | 11/2011 | Noda et al. | |
| 2011/0295634 A1 | 12/2011 | Bhamidipaty et al. | |
| 2012/0005242 A1 | 1/2012 | Feng et al. | |
| 2012/0054246 A1 | 3/2012 | Fischer | |
| 2012/0072597 A1 | 3/2012 | Teather et al. | |
| 2012/0079461 A1 | 3/2012 | Copass et al. | |
| 2012/0083906 A1 | 4/2012 | Weatherhead et al. | |
| 2012/0084400 A1 | 4/2012 | Almadi et al. | |

(56) References Cited

U.S. PATENT DOCUMENTS

| | | |
|---|---|---|
| 2012/0089920 A1 | 4/2012 | Eick |
| 2012/0095808 A1 | 4/2012 | Kattapuram et al. |
| 2012/0101801 A1* | 4/2012 | Van Dorsselaer ........ G06F 8/71 703/22 |
| 2012/0143374 A1 | 6/2012 | Mistry et al. |
| 2012/0147894 A1 | 6/2012 | Mulligan et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0297249 A1 | 11/2012 | Yang et al. |
| 2012/0304007 A1 | 11/2012 | Hanks et al. |
| 2012/0306620 A1 | 12/2012 | Karaffa et al. |
| 2012/0311387 A1 | 12/2012 | Santhosh et al. |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1* | 1/2013 | Keller ................ G05B 19/0428 709/217 |
| 2013/0031158 A1 | 1/2013 | Salsburg |
| 2013/0036198 A1 | 2/2013 | Galm et al. |
| 2013/0041705 A1 | 2/2013 | Hampapur et al. |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111019 A1 | 5/2013 | Tjew et al. |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0125233 A1 | 5/2013 | Bush et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211546 A1* | 8/2013 | Lawson ............ G05B 19/4185 700/9 |
| 2013/0211547 A1 | 8/2013 | Buchdunger et al. |
| 2013/0211555 A1 | 8/2013 | Lawson et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0212521 A1 | 8/2013 | Fedoseyeva et al. |
| 2013/0218971 A1 | 8/2013 | Sasaki et al. |
| 2013/0237204 A1 | 9/2013 | Buck et al. |
| 2013/0257627 A1 | 10/2013 | Rafael |
| 2013/0262654 A1 | 10/2013 | Masli et al. |
| 2013/0283265 A1 | 10/2013 | Acharya et al. |
| 2013/0304237 A1 | 11/2013 | Schroeder et al. |
| 2013/0311827 A1 | 11/2013 | Drory et al. |
| 2013/0325545 A1 | 12/2013 | Mordvinova et al. |
| 2013/0347003 A1 | 12/2013 | Whitmore |
| 2014/0013100 A1* | 1/2014 | Menzel ............ H04N 21/43637 713/150 |
| 2014/0046618 A1* | 2/2014 | Arunachalam .... G05B 19/0428 702/127 |
| 2014/0046977 A1 | 2/2014 | Gopalakrishnan et al. |
| 2014/0047107 A1 | 2/2014 | Maturana et al. |
| 2014/0052499 A1 | 2/2014 | Wagner et al. |
| 2014/0059056 A1 | 2/2014 | Chaney et al. |
| 2014/0067360 A1 | 3/2014 | Bhamidipaty et al. |
| 2014/0081691 A1 | 3/2014 | Wendell |
| 2014/0095231 A1 | 4/2014 | Cherusseri et al. |
| 2014/0095654 A1 | 4/2014 | Finnerty et al. |
| 2014/0121789 A1 | 5/2014 | Brandes et al. |
| 2014/0137257 A1 | 5/2014 | Martinez et al. |
| 2014/0156032 A1 | 6/2014 | Jenkins et al. |
| 2014/0156584 A1 | 6/2014 | Motukuri |
| 2014/0215487 A1 | 7/2014 | Cherkasova et al. |
| 2014/0250153 A1 | 9/2014 | Nixon et al. |
| 2014/0250337 A1 | 9/2014 | Yamaji et al. |
| 2014/0278738 A1 | 9/2014 | Feit et al. |
| 2014/0279201 A1 | 9/2014 | Iyoob et al. |
| 2014/0279641 A1 | 9/2014 | Singh et al. |
| 2014/0279948 A1 | 9/2014 | Mahate et al. |
| 2014/0282015 A1 | 9/2014 | Nixon et al. |
| 2014/0282257 A1 | 9/2014 | Nixon et al. |
| 2014/0297354 A1 | 10/2014 | Kogiso et al. |
| 2014/0306533 A1 | 10/2014 | Paquin et al. |
| 2014/0316794 A1 | 10/2014 | Goll et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0337086 A1 | 11/2014 | Asenjo et al. |
| 2014/0358606 A1 | 12/2014 | Hull |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0032242 A1* | 1/2015 | Schouwenburg ....... G06F 30/00 700/98 |
| 2015/0032886 A1 | 1/2015 | Wang |
| 2015/0048952 A1 | 2/2015 | Murphy |
| 2015/0235161 A1 | 8/2015 | Azar et al. |
| 2015/0278407 A1 | 10/2015 | Vennelakanti et al. |
| 2015/0304193 A1 | 10/2015 | Ishii et al. |
| 2015/0378356 A1 | 12/2015 | Hefeeda et al. |
| 2016/0154693 A1 | 6/2016 | Uhde et al. |
| 2016/0217378 A1 | 7/2016 | Bellala et al. |
| 2016/0217410 A1 | 7/2016 | Santos et al. |
| 2017/0019483 A1 | 1/2017 | Maturana et al. |
| 2017/0236391 A1 | 8/2017 | Palmeri |
| 2018/0157995 A1 | 6/2018 | O'Malley |
| 2018/0205803 A1 | 7/2018 | Asenjo et al. |

FOREIGN PATENT DOCUMENTS

| | | |
|---|---|---|
| CN | 1690685 A | 11/2005 |
| CN | 1833424 A | 9/2006 |
| CN | 100362442 C | 1/2008 |
| CN | 101114160 | 1/2008 |
| CN | 101326471 A | 12/2008 |
| CN | 101536002 | 9/2009 |
| CN | 101739007 | 6/2010 |
| CN | 101776862 | 7/2010 |
| CN | 102435870 A | 5/2012 |
| CN | 102449567 A | 5/2012 |
| CN | 102640475 A | 8/2012 |
| CN | 102830666 A | 12/2012 |
| CN | 102927937 | 2/2013 |
| CN | 103019102 | 4/2013 |
| CN | 103403753 A | 11/2013 |
| CN | 104142629 A | 11/2014 |
| CN | 104142630 A | 11/2014 |
| CN | 104142662 A | 11/2014 |
| CN | 104142664 A | 11/2014 |
| CN | 104142679 A | 11/2014 |
| DE | 19834456 | 2/2000 |
| DE | 10 2014 102 844 A1 | 9/2014 |
| EP | 1209558 A2 | 5/1996 |
| EP | 1 491 977 A2 | 12/2004 |
| EP | 1531373 A2 | 5/2005 |
| EP | 1686442 A1 | 8/2006 |
| EP | 1 868 152 A1 | 12/2007 |
| EP | 1933214 | 6/2008 |
| EP | 2189900 A1 | 5/2010 |
| EP | 2293164 A1 | 3/2011 |
| EP | 2453326 | 5/2012 |
| EP | 2469466 A1 | 6/2012 |
| EP | 2 509 042 A1 | 10/2012 |
| EP | 2 660 667 A2 | 11/2013 |
| EP | 2 704 401 A1 | 3/2014 |
| EP | 2 778 816 A1 | 9/2014 |
| EP | 2 790 101 A1 | 10/2014 |
| EP | 2 801 935 A1 | 11/2014 |
| EP | 2 801 936 A1 | 11/2014 |
| EP | 2801938 | 11/2014 |
| EP | 2801940 | 11/2014 |

(56) References Cited

FOREIGN PATENT DOCUMENTS

| EP | 2801941 | 11/2014 |
| --- | --- | --- |
| EP | 3 037 901 A2 | 6/2016 |
| EP | 3 070 550 B1 | 7/2018 |
| JP | 2001-242931 A | 9/2001 |
| WO | 0111586 A | 2/2001 |
| WO | 169329 A2 | 9/2001 |
| WO | 0217131 | 2/2002 |
| WO | 02/057856 A2 | 7/2002 |
| WO | 03/007097 A1 | 1/2003 |
| WO | 03058506 A1 | 7/2003 |
| WO | 2008133715 | 11/2008 |
| WO | 2009046095 | 4/2009 |
| WO | 2011050482 | 5/2011 |
| WO | 2013007866 A1 | 1/2013 |
| WO | 2014/090310 A1 | 6/2014 |
| WO | 2016/001718 A1 | 1/2016 |

OTHER PUBLICATIONS

Final Office Action for U.S. Appl. No. 14/087,730, dated Aug. 24, 2016, 113 pages.
Extended European Search Report for EP Patent Application Serial No. 16160602.5, dated Sep. 2, 2016, 9 pages.
Non-Final Office Action for U.S. Appl. No. 14/087,835, dated Sep. 23, 2016, 82 pages.
Final Office Action for U.S. Appl. No. 14/087,821, dated Sep. 9, 2016, 97 pages.
Extended European Search Report for EP Patent Application Serial No. 13166670.3, dated Jun. 14, 2016, 10 pages.
"Cloud Computing," Whatis.com, Oct. 27, 2009, http://searchcloudcomputing.techtarget.com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index.html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
Chinese Office Action for Chinese Application No. 201410196775.0 dated May 5, 2016, 14 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016, 13 pages.
Chinese Office Action for Chinese Application No. 201410196114.8 dated Apr. 25, 2016, 20pages.
Chinese Office Action for Chinese Application No. 201410196525.7, dated May 5, 2016, 13 pages.
Non-Final Office Action for U.S. Appl. No. 14/088,011 dated May 12, 2016, 96 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.
Office Action dated Nov. 25, 2015 for U.S. Appl. No. 14/087,873, 57 pages.
Final Office Action for U.S. Appl. No. 13/725,619 dated Dec. 4, 2015, 21 pages.
Final Office Action for U.S. Appl. No. 13/608,821 dated Dec. 7, 2015, 39 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 14167626.2-1955, 8 pages.
Office Action dated Sep. 22, 2015 for European Application No. 14167707.0-1955, 9 pages.
Notice of Allowance for U.S. Appl. No. 13/725,619 dated Mar. 31, 2016, 26 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Non-Final Office Action for U.S. Appl. No. 14/087,821 dated Mar. 2, 2016, 86 pages.
Non-Final Office Action for U.S. Appl. No. 14/087,977 dated Mar. 17, 2016, 83 pages.
"Recursion Software, ""SCADA-Aware Mobile""", Frisco, TX, Aug. 29, 2012 (accessed from<<http://www.emsenergyautomation.com/brochures/scada.pdf» on Feb. 11, 2016)".
"Ars Technica, ""Windows 7 themes: how to unlock them or create your own""", Nov. 12, 2009 (accessed from<<http://arstechnica.com/information-technology/2009/11/unlock-hidden-windows-7-themesl on Mar. 8, 2016»)".
Non-Final Office Action for U.S. Appl. No. 14/088,014 dated Mar. 22, 2016, 98 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth= 1).
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Chinese Office Action for Chinese Application No. 201410196198.5 dated Mar. 29, 2016, 18 pages.
Office Action for U.S. Appl. No. 13/725,660 dated Aug. 18, 2015, 90 pgs.
Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.
Colombo, Amando Walter, et al., "Towards the Factory of the Future: A Service-Oriented Cross-layer Infrastructure," ICT Shaping the World: A Scientific View, 2009, pp. 65-81.
Notice of Allowance for U.S. Appl. No. 13/725,578, dated Apr. 24, 2015, 23 pages.
Office Action for U.S. Appl. No. 13/677,060, dated Oct. 20, 2015, 48 pages.
Office Action for U.S. Appl. No. 13/615,195, dated Sep. 21, 2015, 19 pages.
Office Action for U.S. Appl. No. 13/725,660, dated Oct. 26, 2015, 79 pages.
Office Action dated Dec. 27, 2004 for U.S. Appl. No. 10/162,315, 8 pages.
Office Action dated Jun. 15, 2005 for U.S. Appl. No. 10/162,315, 9 pages.
Office Action dated Sep. 9, 2005 for U.S. Appl. No. 10/162,315, 10 pages.
Vasudevan, A Web Services Primer, Apr. 4 2001, XML.com, http://webservices.xml.com/pub/a/ws/2001/04/04/webservices/index.htnnl, 10 pages.
Office Action dated Mar. 6, 2006 for U.S. Appl. No. 10/162,315, 8 pages.
W3C, Web Services Description Language, http://www.w3.org/TR/wsd1, Mar. 15, 2001, 36 pages.

(56) References Cited

OTHER PUBLICATIONS

European Search Report dated Mar. 18, 2004 for European Patent Application Serial No. 03026339, 3 Pages.
Compuquest, Inc., SPM-IM-Instant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
International Business Machines Corporation, Cross platform instant messaging using web services, Research Disclosure, Kenneth Mason Publications, Hampshire, GB, vol. 458, No. 156, Jun. 2002, 3 pages.
Office Action dated Jun. 18, 2014 for U.S. Appl. No. 13/725,578, 13 pages.
Office Action dated Aug. 19, 2014 for U.S. Appl. No. 13/615,195, 22 pages.
European Search Report dated Aug. 11, 2014 for European Application No. 14167706.2-1955, 7 pages.
European Search Report dated Aug. 11, 2014 for European Application No. 14167714.6-1955, 5 pages.
European Search Report dated Aug. 11, 2014 for European Application No. 14167626.2-1955, 9 pages.
European Search Report dated Aug. 11, 2014 for European Application No. 14167627.0-1955, 6 pages.
European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
Office Action dated Oct. 9, 2014 for U.S. Appl. No. 13/725,543, 10 pages.
Office Action dated Dec. 12, 2014 for U.S. Appl. No. 13/725,578, 24 pages.
Office Action dated Jan. 20, 2015 for U.S. Appl. No. 13/615,195, 22 pages.
Third Party Submission under 37 CFR 1.290 dated Nov. 21, 2014 for U.S. Appl. No. 14/087,873, 23 pages.
Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action for U.S. Appl. No. 13/725,619 dated Jul. 17, 2015, 45 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.
Office Action for U.S. Appl. No. 14/088,011, dated Nov. 1, 2016, 79 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application Serial No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.
European Office Action for EP Patent Application Serial No. 16160610.8, dated Oct. 17, 2016, 2 pages.
Non-Final Office Action for U.S. Appl. No. 14/087,730, dated Feb. 9, 2017, 78 pages.
Chinese Office Action for CN Application Serial No. 201410198289.2, dated Dec. 15, 2016, 21 pages.
Chinese Office Action for CN Application Serial No. 201410195780.X, dated Feb. 3, 2017, 18 pages.
Chinese Office Action for CN Application Serial No. 201410196127.5, dated Nov. 30, 2016, 13 pages.
Chinese Office Action for Chinese Application Serial No. 201410195780.X, dated May 26, 2016, 16 pages (including translation).
Final Office Action for U.S. Appl. No. 14/087,977, dated Jul. 13, 2016, 59 pages.
Final Office Action for U.S. Appl. No. 14/088,014, dated Jul. 15, 2016, 65 pages.
Non-Final Office Action for U.S. Appl. No. 14/087,922, dated Jul. 19, 2016, 120 pages.
Extended European Search Report for European Patent Application Serial No. 16160604.1, dated Aug. 17, 2016, 9 pages.
Office Action for European Patent Application Serial. No. 16160604.1-1802, dated May 17, 2017, 6 pages.
Office Action for U.S. Appl. No. 14/658,365, dated Mar. 23, 2017, 100 pages.
Chinese Office Action for CN Application Serial No. 201410196150.4, dated Mar. 2, 2017, 37 pages (with English Translation).
Office Action for U.S. Appl. No. 14/087,970, dated Apr. 12, 2017, 59 pages.
Office Action for U.S. Appl. No. 15/388,260, dated Apr. 24, 2017, 101 pages.
Office Action for U.S. Appl. No. 14/658,345, dated Mar. 17, 2017, 95 pages.
Office Action for U.S. Appl. No. 14/658,327, dated May 1, 2017, 99 pages.
Givehchi, et al., "Control-as-a-Service from the Cloud: A Case Study for using Virtualized PLCs," 2014 10th IEEE Workshop on Factory Communication Systems (WFCS 2014), 20140505 IEEE, 4 pages.
Office Action for U.S. Appl. No. 14/088,011, dated May 17, 2017.
Rouse, et al. "Definition Industrial Control System (ICS," whatis.techtarget.com, ed. Mar. 2016 (accessed from <<http://whatis.techtarget.com/definition/industrial-control-system-ICS>> on Jan. 11, 2017).
Examiner Answer to Appeal Brief for U.S. Appl. No. 14/087,977, dated Feb. 1, 2017.
Final Office Action for U.S. Appl. No. 14/658,365 dated Sep. 8, 2017, 59 pages.
Office Action for U.S. Appl. No. 14/087,821 dated Sep. 7, 2017, 63 pages.
Final Office Action for U.S. Appl. No. 14/087,730 dated Aug. 18, 2017, 72 pages.
Office Action for U.S. Appl. No. 15/214,583 dated Aug. 28, 2017, 80 pages.
Final Office Action for U.S. Appl. No. 14/658,345 dated Sep. 25, 2017, 52 pages.
Final Office Action for U.S. Appl. No. 15/388,260 dated Oct. 18, 2017, 76 pages.
Office Action for U.S. Appl. No. 15/206,744 dated Nov. 6, 2017, 48 pages.
Office Action for U.S. Appl. No. 14/658,327 dated Oct. 30, 2017, 48 pages.
Office Action for U.S. Appl. No. 15/490,076 dated Dec. 20, 2017, 37 pages.
Office Action for U.S. Appl. No. 15/278,139 dated Jan. 11, 2018, 103 pages.
Final Office Action for U.S. Appl. No. 14/087,821 dated Dec. 14, 2017, 37 pages.
Final Office Action for U.S. Appl. No. 14/088,011 dated Nov. 22, 2017, 77 pages.
Office Action for U.S. Appl. No. 14/087,970 dated Feb. 12, 2018, 69 pages.

(56) References Cited

OTHER PUBLICATIONS

Chinese Office Action for CN Application Serial No. 201410196114.8, dated Dec. 13, 2017, 26 pages.
Office Action for U.S. Appl. No. 15/143,733 dated Mar. 8, 2018, 141 pages.
Office Action for U.S. Appl. No. 15/490,076 dated Apr. 2, 2018, 23 pages.
Office Action for U.S. Appl. No. 14/658,327 dated Apr. 10, 2018, 43 pages.
Office Action for U.S. Appl. No. 14/658,345 dated Mar. 14, 2018, 56 pages.
Office Action for U.S. Appl. No. 14/658,365, dated Apr. 15, 2018, 64 pages.
Office Action for U.S. Appl. No. 15/143,733, dated Jun. 18, 2018, 76 pages.
Office Action for U.S. Appl. No. 15/599,921, dated Jun. 29, 2018, 75 pages.
Office Action for U.S. Appl. No. 14/087,970, dated Aug. 1, 2018, 68 pages.
Wikipedia; "PID Controller"; Jul. 20, 2018; https://en.wikipedia.org/wiki/PID_controller (Year: 2018).
Communication pursuant to Article 94(3) EPC for EP Application Serial No. 14167714.6 dated Aug. 3, 2018, 5 pages.
Communication pursuant to Article 94(3) EPC for EP Application Serial No. 14167708.8 dated Aug. 3, 2018, 5 pages.
Communication pursuant to Article 94(3) EPC for EP Application Serial No. 14167712.0 dated Aug. 3, 2018, 5 pages.
Search Report received for Chinese Application Serial No. 201610149668.1 dated Apr. 2, 2018, 1 page.
Search Report received for Chinese Application Serial No. 201610149635.7 dated Apr. 2, 2018, 1 page.
First Office Action received for Chinese Patent Application Serial No. 201610151380.8 dated Jul. 17, 2018, 65 pages.
Final Office Action received for U.S. Appl. No. 13/615,195 dated Jan. 20, 2015, 22 pages.
Chinese First Office Action for Chinese Application No. 201703396697 dated Dec. 11, 2018, 25 pages (Including English Translation).
Non-Final Office Action received for U.S. Appl. No. 15/621,206 dated Mar. 22, 2019, 118 pages.
Non-Final Office Action received for U.S. Appl. No. 14/658,345 dated May 13, 2019, 78 pages.
Non-Final Office Action received for U.S. Appl. No. 14/658,365 dated Jun. 3, 2019, 70 pages.
Third Office Action received for Chinese Patent Application Serial No. 201610149635.7 dated Apr. 26, 2019, 23 pages (including English Translation).
Notice of Opposition received for EP Patent Application U.S. Appl. No. 16160611.6 dated Apr. 11, 2019, 789 pages.
Wen et al., "Current Trends and Perspectives in Wireless Virtualization", 2013 International Conference on Selected Topics in Mobile and Wireless Networking (MoWNeT), 2013, 6 pages.
Wang et al., "The Research of Chemical Plant Monitoring Base on the Internet of Things and 3D Visualization Technology", Proceeding of the IEEE International Conference on Information and Automation, Aug. 2013, 5 pages.
Non-Final Office Action received for U.S. Appl. No. 10/234,504 dated Oct. 18, 2006, 15 pages.
Final Office Action received for U.S. Appl. No. 10/234,504 dated Feb. 7, 2007, 12 pages.
Final Office Action received for U.S. Appl. No. 10/234,504 dated May 1, 2007, 12 pages.
Non-Final Office Action received for U.S. Appl. No. 10/162,314 dated Dec. 15, 2005, 17 pages.
Final Office Action received for U.S. Appl. No. 10/162,314 dated Jun. 5, 2006, 23 pages.
Non-Final Office Action received for U.S. Appl. No. 10/162,314 dated Nov. 16, 2006, 20 pages.
Final Office Action received for U.S. Appl. No. 10/162,314 dated Apr. 30, 2007, 35 pages.
Non-Final Office Action received for U.S. Appl. No. 10/162,314 dated Oct. 25, 2007, 28 pages.
Final Office Action received for U.S. Appl. No. 10/162,314 dated May 5, 2008, 31 pages.
Non-Final Office Action received for U.S. Appl. No. 10/161,848 dated Nov. 15, 2005, 15 pages.
Final Office Action received for U.S. Appl. No. 10/161,848 dated Mar. 27, 2006, 13 pages.
Non-Final Office Action received for U.S. Appl. No. 10/161,848 dated Sep. 5, 2006, 15 pages.
Final Office Action received for U.S. Appl. No. 10/161,848 dated Feb. 23, 2007, 17 pages.
Non-Final Office Action received for U.S. Appl. No. 10/161,848 dated May 7, 2007, 14 pages.
Final Office Action received for U.S. Appl. No. 10/161,848 dated Oct. 17, 2007, 15 pages.
Non-Final Office Action received for U.S. Appl. No. 10/161,848 dated Feb. 7, 2008, 14 pages.
Final Office Action received for U.S. Appl. No. 10/161,848 dated Sep. 9, 2008, 17 pages.
Non-Final Office Action received for U.S. Appl. No. 12/410,632 dated Feb. 1, 2011, 56 pages.
Final Office Action received for U.S. Appl. No. 12/410,632 dated May 17, 2011, 17 pages.
Non-Final Office Action received for U.S. Appl. No. 12/410,632 dated Sep. 2, 2011, 11 pages.
Non-Final Office Action received for U.S. Appl. No. 10/298,366 dated Apr. 20, 2006, 13 pages.
Final Office Action received for U.S. Appl. No. 10/298,366 dated Sep. 29, 2006, 16 pages.
Non-Final Office Action received for U.S. Appl. No. 10/298,366 dated Jan. 31, 2007, 12 pages.
Final Office Action received for U.S. Appl. No. 10/298,366 dated Jul. 18, 2007, 14 pages.
Non-Final Office Action received for U.S. Appl. No. 10/298,366 dated Dec. 17, 2007, 10 pages.
Non-Final Office Action received for U.S. Appl. No. 10/298,366 dated Jun. 11, 2008, 24 pages.
Final Office Action received for U.S. Appl. No. 10/298,366 dated Nov. 18, 2008, 20 pages.
Notice of Allowance received for U.S. Appl. No. 10/298,366 dated Feb. 2, 2009, 23 pages.
Non-Final Office Action received for U.S. Appl. No. 13/615,195, dated Aug. 19, 2014, 24 pages.
Communication pursuant to Article 96(2) EPC for EP Application Serial No. 03026339.6 dated Apr. 6, 2006, 6 pages.
Communication pursuant to Article 96(2) EPC for EP Application Serial No. 13166670.3 dated Dec. 14, 2018, 4 pages.
Chinese Third Office Action for Chinese Application No. 201410196114.8 dated Apr. 12, 2017, 25 pages (Including English Translation).
Chinese Fourth Office Action for Chinese Application No. 201410196114.8 dated Aug. 15, 2017, 24 pages (Including English Translation).
Chinese Second Office Action for Chinese Application No. 201410196198.5 dated Dec. 21, 2016, 10 pages Including English Translation).
Chinese Third Office Action for Chinese Application No. 201410196198.5 dated Mar. 28, 2017, 10 pages (Including English Translation).
Chinese Second Office Action for Chinese Application No. 201410196525.7 dated Dec. 21, 2016, 8 pages (Including English Translation).
Chinese Second Office Action for Chinese Application No. 201410196775.0 dated Dec. 7, 2016, 8 pages (Including English Translation).
Chinese Third Office Action for CN Application Serial No. 201410196150.4, dated Nov. 29, 2017, 10 pages (Including English Translation).
Communication pursuant to Article 94(3) EPC for EP Application Serial No. 14167511.6 dated Jan. 23, 2019, 7 pages.
Communication pursuant to Article 94(3) EPC for EP Application Serial No. 14167703.9 dated Jan. 23, 2019, 6 pages.

(56) References Cited

OTHER PUBLICATIONS

Anonymous: "Hash function—Wikipedia", Wikipedia, Apr. 19, 2009, URL:https://en.wikipedia.org/w/index.php?title=Hash_function&oldid=284890279, 9 pages.
Communication pursuant to Article 94(3) EPC for EP Application Serial No. 16160611.6 dated Apr. 5, 2017, 5 pages.
Communication pursuant to Article 94(3) EPC for EP Application Serial No. 16160611.6 dated May 10, 2017, 5 pages.
Second Office Action received for Chinese Patent Application Serial No. 201610151417.7 dated Jan. 22, 2019, 7 pages (Including English Translation).
Communication pursuant to Article 94(3) EPC for EP Application Serial No. 16160604.1 dated Jun. 13, 2017, 6 pages.
Summons to attend oral proceedings pursuant to Rule 115(1) EPC received for EP Patent Application Serial No. 14167706.2 dated Dec. 13, 2018, 65 pages.
Second Office Action received for Chinese Patent Application Serial No. 201410196150.4 dated Aug. 3, 2017, 10 pages (Including English Translation).
Extended European Search Report received for EP Patent Application Serial No. 16160610.8 dated Sep. 8, 2016, 9 pages.
Non-Final Office Action received for U.S. Appl. No. 13/725,543 dated Oct. 9, 2014, 10 pages.
Final Office Action received for U.S. Appl. No. 13/725,543 dated May 20, 2015, 15 pages.
Final Office Action received for U.S. Appl. No. 14/658,345, dated Sep. 13, 2018, 49 pages.
Final Office Action received for U.S. Appl. No. 14/658,365, dated Oct. 16, 2018, 42 pages.
Notice of Allowance received for U.S. Appl. No. 15/923,127 dated Nov. 21, 2018, 85 pages.
Non-Final Office Action received for U.S. Appl. No. 14/658,327 dated Nov. 1, 2018, 58 pages.
Second Office Action received for Chinese Patent Application Serial No. 201610149668.1 dated Oct. 24, 2018, 18 pages (including English Translation).
Second Office Action received for Chinese Patent Application Serial No. 201610149635.7 dated Oct. 24, 2018, 24 pages (including English Translation).
First Office Action received for Chinese Patent Application Serial No. 201610151417.7 dated Sep. 18, 2018, 28 pages (including English Translation).
Non-Final Office Action received for U.S. Appl. No. 15/714,333 dated Jul. 17, 2019, 113 pages.
Notice of Allowance received for U.S. Appl. No. 15/621,206 dated Aug. 19, 2019, 52 pages.
First Office Action received for Chinese Patent Application Serial No. 201710778822.6 dated Jun. 24, 2019, 29 pages (Including English Translation).
Second Office Action received for Chinese Patent Application Serial No. 201710339669.7 dated Jul. 2, 2019, 20 pages (Including English Translation).
Final Office Action received for U.S. Appl. No. 15/714,333 dated Oct. 25, 2019, 36 pages.
Non-Final Office Action received for U.S. Appl. No. 15/970,932 dated Nov. 14, 2019, 122 pages.
Second Office Action received for Chinese Patent Application Serial No. 201710778822.6 dated Sep. 20, 2019, 5 pages.
Final Office Action received for U.S. Appl. No. 14/658,345 dated Nov. 26, 2019, 48 pages.
Final Office Action received for U.S. Appl. No. 14/658,365 dated Nov. 29, 2019, 48 pages.
Supplementary Search Report received for Chinese Patent Application Serial No. 201710339669.7 dated Sep. 18, 2019, 2 pages.
Non-Final Office Action received for U.S. Appl. No. 16/129,116 dated Apr. 1, 2020, 142 pages.
Non-Final Office Action received for U.S. Appl. No. 15/714,333 dated Apr. 15, 2020, 44 pages.
Final Office Action received for U.S. Appl. No. 15/970,932 dated Apr. 13, 2020, 37 pages.
Non-Final Office Action received for U.S. Appl. No. 14/658,345 dated May 14, 2020, 83 pages.
Communication pursuant to Article 94(3) EPC received for EP Patent Application Serial No. 16160602.5 dated May 19, 2020, 07 pages.
Communication pursuant to Article 94(3) EPC received for EP Patent Application Serial No. 16160610.8 dated May 27, 2020, 08 pages.
Summons to attend oral proceedings pursuant to Rule 115(1) EPC received for EP Patent Application Serial No. 14167703.9 dated Feb. 6, 2020, 8 pages.
Third Office Action received for Chinese Patent Application Serial No. 201710778822.6 dated Mar. 3, 2020, 43 pages (Including English Translation).
Communication pursuant to Article 94(3) EPC received for EP Patent Application Serial No. 14167627.0 dated Jan. 23, 2020, 6 pages.
Notification of Grant of Patent for Invention received for Chinese Patent Application Serial No. 201710339669.7 dated Dec. 31, 2019, 7 pages (Including English Translation).
Summons to attend oral proceedings pursuant to Rule 115(1) EPC received for EP Patent Application Serial No. 16160611.6 dated Dec. 19, 2019, 26 pages.
Notice of Allowance received for U.S. Appl. No. 15/714,333 dated Dec. 17, 2020, 59 pages.
Final Office Action received for U.S. Appl. No. 15/714,333 dated Nov. 4, 2020, 62 pages.
Summons to attend oral proceedings pursuant to Rule 115(1) EPC received for EP Patent Application Serial No. 16160611.6 dated Oct. 30, 2020, 05 pages.
Notification of Reexamination received for Chinese Application No. 201610149635.7, dated Nov. 5, 2020, 17 pages.
Notification of Reexamination received for Chinese Application No. 201610149668.1, dated Oct. 20, 2020, 3 pages.
Non-Final Office Action received for U.S. Appl. No. 16/129,116 dated Nov. 16, 2020, 51 pages.
Final Office Action received for U.S. Appl. No. 114/658,365 dated Jan. 21, 2021, 96 pages.
Final Office Action received for U.S. Appl. No. 16/129,116 dated Jul. 2, 2020, 58 pages.
Final Office Action received for U.S. Appl. No. 15/714,333 dated Jul. 22, 2020, 40 pages.
Non-Final Office Action received for U.S. Appl. No. 14/658,365 dated Jul. 13, 2020, 72 pages.
Advisory Office Action received for U.S. Appl. No. 14/658,365 dated Mar. 25, 2021, 09 pages.
Summons to attend oral proceedings pursuant to Rule 115(1) EPC received for European Patent Application Serial No. 14167708.8 dated Mar. 18, 2021, 09 pages.

* cited by examiner

BACKUP OF AN INDUSTRIAL AUTOMATION PLANT IN THE CLOUD

TECHNICAL FIELD

The subject application relates generally to industrial automation, and, more particularly, to backing up an industrial automation plant in the cloud.

BACKGROUND

Industrial controllers and their associated input/output (I/O) devices can be useful to the operation of modern industrial automation systems. These industrial controllers can interact with field devices on the plant floor to control automated processes relating to such objectives as product manufacture, material handling, batch processing, supervisory control, and other such applications. Industrial controllers can store and execute user-defined control programs to effect decision-making in connection with the controlled process. Such programs can include, but are not limited to, ladder logic, sequential function charts, function block diagrams, structured text, or other such programming structures. In general, industrial controllers can read input data from sensors and metering devices that can provide discreet and telemetric data regarding one or more states of the controlled system, and can generate control outputs based on these inputs in accordance with the user-defined program.

In addition to industrial controllers and their associated I/O devices, some industrial automation systems also can include low-level control systems, such as vision systems, barcode marking systems, variable frequency drives, industrial robots, and the like, which can perform local control of portions of the industrial process, or which can have their own localized control systems.

During operation of a given industrial automation system, comprising a collection of industrial devices, industrial processes, other industrial assets, and network-related assets, users (e.g., operators, technicians, maintenance personnel, etc.) typically can monitor or manage operations of the industrial automation system, perform maintenance, repairs, or upgrades on the industrial automation system, or perform other tasks in connection with operation of the industrial automation system. The above-described description of today's industrial control and business systems is merely intended to provide a contextual overview of relating to conventional industrial automation systems, and is not intended to be exhaustive.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Various aspects and embodiments of the disclosed subject matter relate to the use of data analysis (e.g., big data analysis) in a cloud platform to facilitate generating a model of one or more industrial automation systems and using the model as a backup for the one or more industrial automation systems, in accordance with various embodiments and aspects of the disclosed subject matter. A backup component (e.g., a cloud-based backup component) can comprise or be associated with a modeler component that can generate, update, or use a model of an industrial automation system(s) that can correspond to the industrial automation system(s) and its respective constituent components (e.g., industrial devices, industrial processes, other industrial assets, network-related devices), and the respective relationships (e.g., functional relationships, geographical relationships) between the respective constituent components based at least in part on information obtained from the respective constituent components via cloud gateway components associated with the respective constituent components, a communication device associated with the industrial automation system(s), or another source (e.g., an extrinsic data source associated with the cloud platform). The model can be a multi-dimensional (e.g., three-dimensional (3-D) or two-dimensional (2-D)) model that can facilitate presenting a multi-dimensional view (e.g., 3-D view or 2-D view) of the industrial automation system(s). The backup component can store the model in a data store, wherein the model can be employed, for example, as a backup of the industrial automation system(s) or can be used to configure a new industrial automation system(s) that is the same as or similar to the industrial automation system(s).

In some implementations, the industrial devices or network-related devices of an industrial automation system can be integrated with or associated with (e.g., communicatively connected to) cloud gateway components that can facilitate communication of data (e.g., industrial-automation-system-related data, network-related data) from the industrial devices or network-related devices to the cloud platform (e.g., a collection component of the cloud platform) for analysis by the backup component or modeler component. For a given device (e.g., industrial device, network-related device), the data can comprise a pre-deployed model of the industrial device or network-related device that can be stored on such device, identifier information that can facilitate identifying the type, model, manufacturer, etc., of such device, information relating to relationships between such device and another device(s), operational data associated with such device, specification information associated with such device, or other information that can be used to facilitate modeling such device to facilitate modeling the industrial automation system. With regard to legacy devices (e.g., legacy industrial device, legacy network-related device) that may not be integrated or associated with a cloud gateway component, a communication device can be employed to facilitate inventorying the respective legacy devices. The communication device can capture (e.g., via a camera) physical information (e.g., shape, inputs, outputs, size) relating to such legacy device, identifier information regarding such legacy device (e.g., as provided on an identifier plate on the legacy device), information relating to relationships between such legacy device and another device (s), operational information associated with such legacy device, or other information that can be used to facilitate modeling such legacy device to facilitate modeling the industrial automation system.

The backup component can store the model in the data store (e.g., a cloud-based data store) in a standardized or an agnostic format (e.g., coding format and/or language format), or another desired format (e.g., a commonly used format). In some instances, it can be desired to employ the model (e.g., information of the model) to facilitate configuring or implementing industrial assets of a target industrial automation system (e.g., a backed-up industrial automation system that is to have its configuration, physical, and operational data restored, another (e.g., a new) industrial automation system that is to be configured and implemented using all or a portion of the model of the backed-up industrial automation system). In such instances, the backup component can determine the characteristics of the respective target constituent components (e.g., industrial devices, industrial processes, other industrial assets, network-related devices) of the target industrial automation system based at least in part on information relating to the target constituent components obtained from the respective target constituent components, industrial-asset-related information already contained in the model (e.g., as stored in the cloud-based data store), other information (e.g., other industrial-asset-related information) stored in the cloud-based data store, and/or extrinsic information (e.g., other industrial-asset-related information) obtained from another data source(s) (e.g., extrinsic data source(s)).

The backup component can translate the information of the model from its current format to another format suitable to the target industrial automation system for which the information of the model is to be implemented based at least in part on the characteristics associated with the respective target constituent components of the target industrial automation system. The backup component can communicate the translated information of the model to the target industrial automation system to facilitate configuring and implementing the respective target constituent components of the target industrial automation system, in accordance with the model (e.g., backed-up model of the industrial automation system(s)).

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
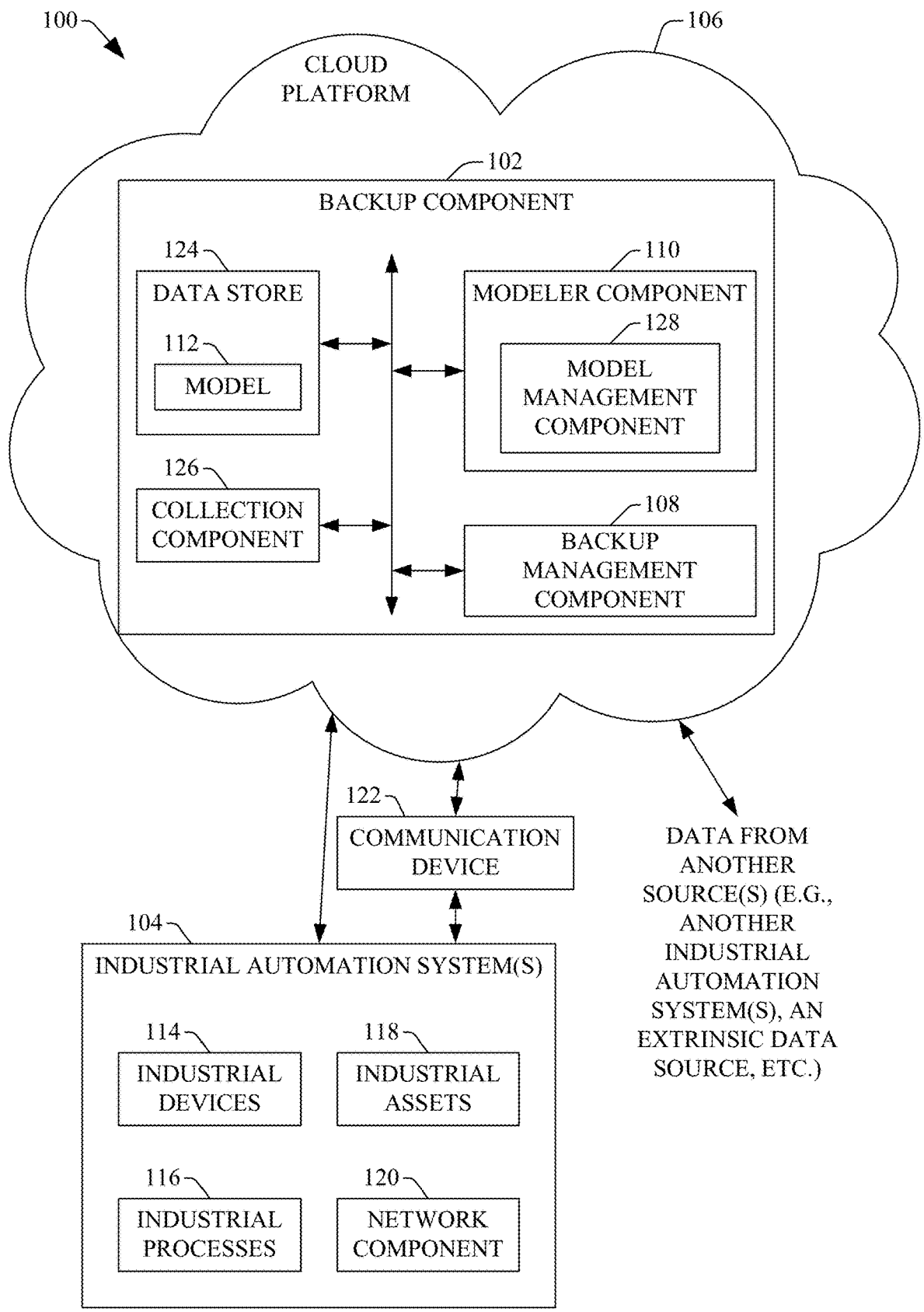
FIG. 1 illustrates a block diagram of an example system that can use of data analysis in a cloud platform to facilitate collecting industrial-automation-system-related data and generating a model of one or more industrial automation systems and using the data and/or model as a backup for the one or more industrial automation systems or for other desired uses, in accordance with various embodiments and aspects of the disclosed subject matter.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

Industrial automation systems can perform various processes to produce desired products or processed materials. An industrial automation system can comprise various industrial devices, industrial processes, other industrial assets, and network-related assets (e.g., communication network devices and software). During operation of a given industrial automation system, users, such as, for example, operators, technicians, maintenance personnel, typically can monitor or manage operations of the industrial automation system, perform maintenance, repairs, or upgrades on the industrial automation system, or perform other tasks in connection with operation of the industrial automation system.

To that end, presented are various systems, methods, and techniques of the disclosed subject matter that relate to the use of data analysis (e.g., big data analysis) in a cloud platform to facilitate generating a model of one or more industrial automation systems and using the model as a backup for the one or more industrial automation systems, in accordance with various embodiments and aspects of the disclosed subject matter. A backup component (e.g., a cloud-based backup component) can comprise or be associated with a modeler component that can generate a model of industrial assets (e.g., industrial devices, industrial processes, or other industrial assets) of the one or more industrial automation systems, and respective relationships between respective industrial assets of the one or more industrial automation systems, based at least in part on information obtained from the industrial assets via cloud gateway components associated with the industrial assets, a communication device associated with the one or more industrial automation systems, or another source (e.g., an extrinsic data source associated with the cloud platform). The backup component can store the model in a data store, wherein the model can be employed as a backup of the one or more industrial automation systems, or can be used to configure a new industrial automation system(s) that is the same as or similar to the one or more industrial automation systems.

The backup component can store the model in the data store in a standardized or an agnostic format, or another desired format (e.g., a commonly used format). When the model (e.g., information of the model) is to be employed to facilitate configuring or implementing industrial assets of a target industrial automation system (e.g., a backed-up industrial automation system that is to have its configuration, physical, and operational data restored, another (e.g., a new) industrial automation system that is to be configured and implemented using all or a portion of the model of the backed-up industrial automation system), the backup component can determine the characteristics of the respective target industrial assets of the target industrial automation system based at least in part on information relating to the target industrial assets obtained from the respective target industrial assets, industrial-asset-related information already contained in the model (e.g., as stored in the cloud-based data store), other information (e.g., industrial-asset-related information) stored in the cloud-based data store, and/or information (e.g., industrial-asset-related information) obtained from another data source(s) (e.g., extrinsic data source(s)). The backup component can translate the information of the model from its current format to another format suitable to the target industrial automation system for which the information of the model is to be implemented based at least in part on the characteristics associated with the target industrial automation system. The backup component can communicate the translated information of the model to the target industrial automation system to facilitate configuring and implementing the target industrial automation system, in accordance with the model (e.g., backed-up model of the industrial automation system(s)).

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or application programming interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a block diagram of an example system 100 (e.g., a backup system) that can use of data analysis (e.g., big data analysis) in a cloud platform to facilitate collecting industrial-automation-system-related data and generating a model of one or more industrial automation systems and using the data and/or model as a backup for the one or more industrial automation systems or for other desired uses, in accordance with various embodiments and aspects of the disclosed subject matter. The model (e.g., a plant model) can correspond to an industrial automation system(s) associated with an industrial enterprise based at least in part on cloud-based data relating to the industrial enterprise. The model generated and managed by the system 100 can be maintained and updated (e.g., automatically or dynamically, in real or near real time) on the cloud platform to reflect any changes to the industrial automation system(s) upon which the model is based to facilitate backing up the most recent iteration of the industrial automation system(s) to the cloud platform.

The system 100 can comprise a backup component 102 (e.g., a cloud-based backup component) that can obtain and backup information (e.g., identifier information, specification information, configuration information, parameter information, other operational information) relating to one or more industrial automation systems, such as industrial automation system 104 (only one industrial automation system is depicted in FIG. 1, for brevity and clarity) for analysis and storage in the cloud platform 106, in accordance with various aspects and implementations of the disclosed subject matter. In some implementations, the backed-up information can be maintained substantially as is on the cloud platform 106 for use to restore information (e.g., operational information) relating to the industrial automation system 104, or a portion thereof, as desired, for example, when information is lost by the industrial automation system 104, when a constituent component of the industrial automation system 104 is replaced, or for other desired reasons. In other implementations, the information relating to the industrial automation system 104 can be analyzed to facilitate generating a model of the industrial automation system 104, as more fully disclosed herein, wherein the model (e.g., information in the model), or a portion thereof, can be used to restore information (e.g., operational information) relating to the industrial automation system 104, or a portion thereof, as desired, or for other desired uses.

The backup component 102 can comprise a backup management component 108 that can manage operations of other components of or associated with the backup component 102, perform analysis and operations on information to facilitate performing information-backup-related operations in connection with the industrial automation system 104, and/or perform other desired operations, as more fully disclosed herein. The backup component 102 also can comprise or be associated with a modeler component 110 (e.g., a cloud-based modeler component) that can generate, update, or use a model 112 of an industrial automation system 104 that can correspond to (e.g., replicate, represent in data form) the industrial automation system 104 and its respective constituent components (e.g., industrial devices 114, industrial processes 116, other industrial assets 118, network-related devices of a network component 120), and the respective relationships (e.g., functional relationships, geographical relationships) between the respective constituent components based at least in part on information (e.g., industrial-automation-system-related data) obtained from the respective constituent components via cloud gateway components (not shown in FIG. 1) associated with the respective constituent components, a communication device 122 associated with the industrial automation system 104, or another source (e.g., an extrinsic data source associated with the cloud platform 106), in accordance with defined modeling criteria. The modeler component 110 can generate the model 112 (e.g., plant model) of the industrial automation system(s) 104 of the industrial facility (e.g., industrial plant) such that the model 112 can encode identities of all industrial automation systems in the plant, configuration information and programming information for all industrial automation systems and their constituent components (e.g., industrial devices 114, industrial processes 116, other industrial assets 118, network-related devices of the network component 120), design information for machine components (e.g., industrial devices 114), and other industrial-automation-system-related information. Once the model 112 is created, the backup component 102 can use the model 112 as a hot plant backup that can be downloaded to industrial assets and devices (e.g., 114, 116, 118, 120) of the industrial automation system 104 on the plant floor to restore missing (e.g., lost) asset or device configurations and programs.

The model 112 (e.g., plant backup) or other backup information associated with the industrial automation system 104 also can be used to standardize plant configurations across different industrial facilities. For instance, the backup component 102 can download the model 112 or other backup information associated with the industrial automation system 104 to another industrial automation system (e.g., one that is the same as or similar to industrial automation system 104) in another industrial facility to facilitate configuring, programming, setting parameters of, etc., the constituent components of the other industrial automation system using backup information (e.g., model 112, other backup information) that represents a configuration of an industrial automation system that is known to operate correctly or at least acceptably, in accordance with defined backup criteria. The hot plant backup (e.g., model 112 or other backup information) stored on the cloud platform 106 (e.g., in the data store 124) can thereby reduce or eliminate troubleshooting that otherwise would typically be involved with new industrial-facility startups, and can ensure desired standardization across multiple industrial facilities.

The model 112 can be a multi-dimensional (e.g., three-dimensional (3-D) or two-dimensional (2-D)) model that can facilitate presenting a multi-dimensional view (e.g., 3-D view or 2-D view) of the industrial automation system 104. The backup component 102 can store the model 112 in a data store 124 (e.g., cloud-based data store of or associated with the backup component 102), wherein the model 112 can be employed, for example, as a backup of the industrial automation system 104, or portion thereof, or can be used to configure a new industrial automation system(s), or portion thereof, that is the same as or similar to the industrial automation system 104.

The backup component 102 and modeler component 110 can employ and provide a variety of services (e.g., cloud-based services) including cloud-based backup-related services and model generation services. As part of providing a cloud-based model generation service, the modeler component 110 can perform data analysis (e.g., big data analysis) in the cloud platform 106 to facilitate generating the model 112 of the industrial automation system 104, wherein the model 112 can be used to facilitate interacting with (e.g., backing up, restoring or reconfiguring, remotely monitoring operation of, tracking operation of, controlling operation of, troubleshooting problems with, providing assistance relating to, etc., via, for example, a communication device (e.g., 122)) the industrial automation system 104.

As more fully disclosed herein, the backup component 102 and modeler component 110, as part of providing the cloud-based services, can employ a collection component 126 (e.g., data collection component) that can collect industrial-automation-system-related data from one or more industrial automation systems (e.g., 104) of one or more industrial customers (e.g., industrial enterprises) for storage (e.g., in a cloud-based data store 124) and analysis (e.g., by the backup component 102 or modeler component 110) on the cloud platform 106. The collection component 126 can be associated with (e.g., interfaced with and/or communicatively connected to) the industrial automation system 104 associated with an industrial enterprise.

The industrial automation system 104 can comprise one or more industrial devices 114, industrial processes 116, or other industrial assets 118 that can be distributed throughout an industrial facility(ies) in accordance with a desired industrial-automation-system configuration. The industrial automation system 104 can perform industrial processes or other actions to facilitate producing desired products, processed materials, etc., as an output.

The industrial automation system 104 also can include a network component 120 that can be associated with (e.g., integrated with, interfaced with, and/or communicatively connected to) the various industrial devices 114, industrial processes 116, and/or other industrial assets 118 of the industrial automation system 104 to facilitate communication of information (e.g., command or control information, status information, production information, etc.) between the various industrial devices 114, industrial processes 116, and/or other industrial assets 118 via the network component 120, and/or facilitate communication of information between the various constituent components (e.g., industrial devices 114, industrial processes 116, other industrial assets 118, network component 120) and a user(s) (e.g., plant personnel), for example, via the communication device 122 and network component 120. The network component 120, and/or all or a portion of the industrial devices 114 or other industrial assets 118, can be associated with (e.g., interfaced with, communicatively connected to) the collection component 126 to facilitate the communication of data between the industrial automation system 104 and the collection component 126. The network component 120 can comprise network-related devices (e.g., communication devices, routers (e.g., wireline or wireless routers), switches, etc.), wherein respective network-related devices can be connected to or interfaced with certain other network-related devices to form a communication network having a desired communication network configuration. In some implementations, one or more network-related devices of the network component 120 can be connected to or interfaced with one or more industrial devices 114, industrial processes 116, and/or other industrial assets 118 to facilitate collecting data (e.g., industrial-automation-system-related data) from the one or more industrial devices 114, industrial processes 116, and/or other industrial assets 118 or communicating information (e.g., control signals, parameter data, configuration data, etc.) to the one or more industrial devices 114, industrial processes 116, and/or other industrial assets 118.

The backup component 102 and/or modeler component 110 can monitor or track the operation of the industrial automation system 104, including monitoring and tracking the respective operations of respective industrial devices 114, industrial processes 116, industrial assets 118, and/or network-related devices of the network component 120, and monitoring and tracking the configuration of the industrial automation system 104. The collection component 126 can receive, obtain, detect, or collect data relating to the operation and configuration of the industrial automation system 104, as desired (e.g., automatically, dynamically, or continuously, in real or near real time), in accordance with defined backup criteria and/or defined modeling criteria. For example, the collection component 126 can receive data relating to the industrial devices 114 (e.g., operation, status, or configurations of the industrial devices, properties or characteristics of the industrial devices, maintenance records of the industrial devices, etc.), industrial processes 116 (e.g., operation, status, or configurations of the industrial processes, properties or characteristics of the industrial processes, maintenance records associated with the industrial processes, etc.), and the other industrial assets 118 (e.g., operation, status, or configurations of the industrial assets, properties or characteristics of the industrial assets, maintenance records associated with the industrial assets, etc.). The collection component 126 also can receive or collect data relating to operation of the sub-components (e.g., network-related devices) of the network component 120 (e.g., operation or status of the network devices or assets, communication conditions associated with a communication channel, total bandwidth of a communication channel, available bandwidth of a communication channel, properties or characteristics of the network devices or assets, maintenance records associated with the network devices or assets, configurations of the network devices or assets, etc.).

The data store 124 can be associated with (e.g., interfaced with, communicatively connected to) the collection component 126 and the other components of or associated with the backup component 102. The collection component 126 can provide (e.g., communicate, write, etc.) the data received or collected from the industrial automation system 104 and the network component 120, or from other sources (e.g., another industrial automation system(s), another type of extrinsic data source(s)), to the data store 124 for storage in the data store 124, and/or to the backup component 102 or modeler component 110 for data analysis.

The backup component 102 (e.g., via the backup management component 108) can store the received or collected data (e.g., backup information), and/or the model 112 based in part on the data, in the data store 124 in a standardized (e.g., generalized) or an agnostic format (e.g., standardized or agnostic coding format or language format), or another desired format (e.g., a commonly used format). For instance, the backup management component 108 can analyze and process the received or collected data, and/or the model 112, can determine a data conversion(s) to employ to convert the data or model 112 to the standardized, agnostic (e.g., a controller-agnostic format), or other desired format, and can convert the data or model 112 to the standardized, agnostic, or other (e.g., commonly used) desired format, wherein the data or model 112 in the standardized, agnostic, or other desired format can be stored in the data store 124. As an example, the data can comprise a control program that can be used by a controller of the industrial automation system 104, and the backup management component 108 can convert or generalize the control program to the standardized, agnostic, or other desired format on the cloud platform 106 (e.g., in the data store 124), wherein, at a desired time or with regard to a desired event or condition (e.g., restoring lost data to the controller or configuring another similar controller), the backup management component 108 can convert the control program from the standardized, agnostic, or other desired format to a format that is suitable for the target controller (e.g., the controller, the other similar controller) that is to employ the control program.

The model 112 or other backup information can be converted from the standardized, agnostic, or common format to a different format and/or device platform (e.g., controller platform), including a third-party format or device platform, that is suitable to the constituent components of an industrial automation system for which the model 112 or other backup information is to be used. For instance, it can be desired to employ the model 112 (e.g., model data of the model 112) or other backup information associated with the industrial automation system 104 to facilitate configuring, programming, or implementing industrial assets (e.g., 114, 116, 118) or other devices (e.g., network-related devices of the network component 120) of a target industrial automation system (e.g., a backed-up industrial automation system (e.g., 106) that is to have its configuration, physical, and operational data restored, another (e.g., a new) industrial automation system that is to be configured and implemented using all or a portion of the model of the backed-up industrial automation system).

In such instance when the model 112 or other backup information is to be downloaded to an industrial automation system, the backup management component 108 can identify the target constituent components (e.g., industrial devices (e.g., controller(s), drive(s), server(s)) of the target industrial automation system, determine respective relevant backup information (e.g., relevant model data or other relevant backup information) for the respective constituent components, and convert (e.g., translate) the respective relevant backup information from the standardized, agnostic, or common format to a particular format and/or device platform that is suitable for (e.g., that matches the target device format(s) or platform(s) of) the respective target constituent components of the target industrial automation system that will be receiving the converted model data or other converted backup information, wherein the backup management component 108 can facilitate pushing (e.g., communicating) the backup information down to the controller or other industrial asset(s) (e.g., 114, 116, or 118) in the industrial automation system (e.g., 104). For example, the backup component 102 (e.g., via the backup management component 108) can determine the characteristics of the respective target constituent components (e.g., industrial devices (e.g., 114), industrial processes (e.g., 116), other industrial assets (e.g., 118), network-related devices) of the target industrial automation system (e.g., 104) based at least in part on results of an analysis of information relating to the target constituent components obtained from the respective target constituent components, industrial-asset-related information already contained in the model 112 (e.g., as stored in the cloud-based data store 124), other information (e.g., other industrial-asset-related information) stored in the data store 124, and/or extrinsic information (e.g., other industrial-asset-related information) obtained from another data source (s) (e.g., extrinsic data source(s)). If the backup component 102 or data store 124 do not have sufficient information (e.g., manufacturer information, identifier information, make or model number, specification information, functionality information) regarding all or some of the target constituent components to determine the characteristics of those target constituent components (e.g., when the target industrial automation system is a new industrial automation system), the backup management component 108 can query the target constituent components or another data source (e.g., extrinsic data source) to obtain information relating to the target constituent components that can enable the backup management component 108 to determine the characteristics of the target constituent components.

The backup component 102 (e.g., via the backup management component 108) can translate (e.g., convert) the model 112 (e.g., model data) and/or other backup information from the current format (e.g., standardized or agnostic format, common format) to another (e.g., different) format suitable to the target industrial automation system, or portion thereof (e.g., target constituent component(s)) for which the model 112 and/or other backup information is to be implemented based at least in part on the characteristics associated with the respective target constituent components of the target industrial automation system. The backup component 102 can communicate the translated information and/or translated model to the target industrial automation system to facilitate configuring, programming, and/or otherwise implementing the respective target constituent components of the target industrial automation system, in accordance with the model (e.g., backed-up model 112 of the industrial automation system(s) 104) or other backup information. Thus, the system 100, by employing the backup component 102, can enforce the standardization of plant functions and features across different production lines and industrial facilities, even if the respective lines or respective facilities use different industrial assets (e.g., industrial devices, other industrial assets) from different equipment models or vendors.

For industries that require validation, for example, by outside entities, before a new industrial facility or production line is allowed to operate, the model 112 (e.g., plant model) or other backup information associated with (e.g., corresponding to) the industrial automation system 104 can be previously validated and/or approved, e.g., by an outside entity. This can reduce startup times for the new industrial facility or production line by allowing customers (e.g., via the respective constituent components in the new facility or line, or a communication device associated therewith) to download the model 112 or other backup information to the new industrial facility or production line from the cloud platform 106 via the backup component 102, since the model 112 or other backup information was previously validated and/or approved. This can thereby eliminate or virtually eliminate the need to have a new industrial facility or production line validated.

In some implementations, the backup component 102 and/or modeler component 110 can provide various cloud-based product modeling services and product model management services. For instance, the modeler component 110 can generate product models (e.g., a model of or comprising code) of products or machine components based at least in part on an analysis of information relating to the products or machine components. The product models generated by the modeler component 110 can comprise, for example, code (e.g., executable code), product design or specification information, or other relevant information, that can be used to produce (e.g., generate) or reproduce the products or machine components. The product models can be stored on the cloud platform 106, for example, in the data store 124, and the backup component 102 can manage and maintain the product models on the cloud platform 106.

The backup management component 108 can allow an authorized entity (e.g., using a communication device 122) to download a product model from the cloud platform 106 (e.g., the data store 124 of the cloud platform 106) to a product generator component (e.g., a 3-D printer) to facilitate the manufacture of the product or machine component represented by the product model, based at least in part on the product model (e.g., code or other information of or modeled by the product model). An owner or manager of a product model stored on the cloud platform 106 can lease or otherwise control access to the product model (e.g., as controlled by the backup management component 108) to or by customers. In other implementations, the backup component 102 can provide customers the means for generating their own product models of products or machine components for their internal use, for example, to run their production lines or to distribute desired product designs (e.g., via the product models) to supplier facilities, so the supplier facilities can produce the products or machine components based on the product models.

With further regard to the modeler component 110 and other aspects of the disclosed subject matter, the modeler component 110 can comprise a model management component 128 that can manage and generate a model(s) 112 (e.g., an interactive model(s)) of one or more industrial automation systems 104 (e.g., of an industrial plant environment (s)). In some implementations, the model management component 128 can facilitate providing cloud-based services (e.g., backup-related services, modeling services, product modeling or management services, troubleshooting services, optimization services, remote viewing or controlling services, and/or other cloud-based services) to users and an industrial automation system(s) 104. Users (e.g., operators, technicians, maintenance personnel, supervisors, information technology (IT) personnel, or other plant personnel) can interact with a model 112, or a virtualized industrial automation system generated based on the model 112, of an industrial automation system(s) 104 to perform various work tasks, functions, and/or operations, etc. For instance, a user can interact with the model 112 or the corresponding virtualized industrial automation system to facilitate restoring functionality to an industrial automation system 104 (e.g., that has lost operational data), implementing features (e.g., configuration features, parameter settings, functional features, other operational features) of the industrial automation system 104 in another (e.g., same or similar) industrial automation system, remote viewing of, interaction with, troubleshooting of problems with, controlling operation of, and/or optimization of industrial assets (e.g., industrial devices 114, industrial processes 116, other assets 118) or the network component 120 of the industrial automation system 104.

The industrial assets (e.g., industrial devices 114, industrial processes 116, other industrial assets 118) and network-related devices of the network component 120 of an industrial automation system(s) 104 can be equipped with or associated with components, tools, functions, etc., that can allow the backup management component 108 or model management component 128 to inventory such industrial assets (e.g., 114, 116, 118) and network-related devices from the cloud platform 106 and generate the model 112 of the industrial automation system(s) 104 based at least in part on such inventory. The backup management component 108 or model management component 128 can poll (e.g., request information from) industrial assets, such as industrial devices 114, industrial processes 116, or other industrial assets 118, and/or network-related devices of the network component 120 via cloud gateway components (not shown in FIG. 1) to facilitate obtaining information regarding the industrial assets (e.g., 114, 116, 118) or network-related devices of the network component 120 from the industrial assets (e.g., 114, 116, 118) or network-related devices for backup (e.g., by the backup component 102), analysis (e.g., by the backup component 102 or modeler component 110), and storage (e.g., in the data store 124) on the cloud platform 106. For example, an industrial asset (e.g., 114, 116, 118) and/or a network-related device of the network component 120 can comprise (e.g., be integrated with) or be associated with a cloud gateway component that can enable the industrial asset (e.g., 114, 116, 118) and/or network-related device to communicate with the backup component 102 or modeler component 110 in the cloud platform 106 to facilitate enabling the backup management component 108 or model management component 128 discovering, obtaining information from, and/or modeling the industrial asset (e.g., 114, 116, 118) and/or network-related device of the network component 120. The information can comprise, for example, identification information (e.g., identifiers) that can identify an industrial asset (e.g., 114, 116, 118) or network-related device, type, make, or model information (e.g., make or model number) of the industrial asset or network-related device, manufacturer information indicating the manufacturer of the industrial asset or network-related device, specification information for the industrial asset or network-related device, configuration information that can identify a configuration of an industrial asset or network-related device, contextual information relating to an industrial asset or network-related device, information relating functional or geographical relationships between respective industrial assets or between an industrial asset and a network-related device of the network component 120, information relating to a layout (e.g., functional layout, logic layout, geographical layout) of an industrial automation system 104, communication network connections, or other information.

In some implementations, an industrial automation system 104 can contain legacy industrial assets (e.g., legacy industrial devices or other legacy industrial assets) or legacy network-related components that do not comprise or are not directly associated with a cloud gateway component. A communication device 122 (e.g., a handheld communication device), such as a computer (e.g., a laptop computer), a mobile phone (e.g., a smart phone or other type of cellular phone), an electronic tablet, electronic eyeglasses (e.g., electronic eyeglasses (e.g., smart glasses) with computing and communication functionality), or other type of communication device, can be employed to facilitate inventorying and collecting information relating to such legacy industrial assets or legacy network-related components. The communication device 122 can comprise a camera that can be used to take one or more pictures of legacy industrial assets, legacy network-related components, other industrial assets or network-related components in proximity to the legacy industrial assets or legacy network-related components, and/or an area of the plant in proximity to a legacy industrial asset or legacy network-related component. For instance, the communication device 122 can take a picture of nameplate or other identifier information on a legacy industrial asset or legacy network-related component to facilitate identifying the legacy industrial asset or legacy network-related component. The communication device 122 can comprise a recognizer component (not shown in FIG. 1) that can recognize (e.g. using pattern or optical character recognition (OCR) recognition) or identify the legacy industrial asset or legacy network-related component based at least in part on information obtained via the photograph. Information relating to legacy industrial assets or legacy network-related components also can be input to the communication device 122 by a user via a keyboard, keypad, or audio interface (e.g., a microphone that receives information from the user via the user's voice).

The communication device 122 can interface with the cloud platform 106 (e.g., via a wireline or wireless communication connection), including with the backup component 102 or modeler component 110, to communicate (e.g., migrate) the information relating to legacy industrial assets or legacy network-related components to the backup component 102 or modeler component 110. The collection component 126 can collect the information relating to the legacy industrial assets or legacy network-related components, and can facilitate storing this information in the data store 124.

The model management component 128 can model the industrial automation system 104, including modeling industrial assets (e.g., 114, 116, 118), legacy industrial assets, network-related components (e.g., of the network component 120), and/or legacy network-related components, based at least in part on the respective information obtained from the industrial assets (e.g., 114, 116, 118), network component 120, and/or communication device 122, to generate the interactive model 112 (e.g., a data-rich interactive model) of the industrial automation system 104. To facilitate generating a model 112 that can correspond to and be associated with (e.g., can interact or be interfaced with) the industrial automation system 104, the model management component 128 can access the data store 124 (e.g., cloud-based data store) to obtain a set of data relating to the industrial automation system 104 and/or another industrial automation system (e.g., another system comprising an industrial device(s), process(es), and/or asset(s) that can be the same or similar to an industrial device(s) 114, process(es) 116, and/or asset(s) 118 of the industrial automation system 104). The set of data can comprise information relating to, for example, the respective properties, characteristics, functions, configurations, etc., of respective industrial devices 114, industrial processes 116, other industrial assets 118, or network-related devices of the network component 120; or the configuration of industrial devices 114, industrial processes 116, and/or other industrial assets 118 in relation to each other. For example, the properties or characteristics for industrial devices 114 or industrial processes 116 can comprise mechanical or process properties or characteristics associated with industrial devices or processes (e.g., mechanical latency, process cycle times, operating schedules, etc., associated with industrial devices). As another example, the properties or characteristics for network-related devices can comprise communication properties or characteristics (e.g., wireless and/or wireline communication functionality, type(s) of network or communication protocol(s), network or communication specifications, total bandwidth, etc.) of the respective network-related devices.

The set of data also can comprise information relating to, for example, the configuration of the network-related devices in relation to each other, or the configuration of network-related devices in relation to the industrial devices 114, industrial processes 116, and/or other industrial assets 118; software, firmware, and/or operating system utilized by the industrial automation system 104 (e.g., type(s), version(s), revision(s), configuration(s), etc., of the software, firmware, and/or operating system); functional and communicative relationships between industrial devices 114, industrial processes 116, industrial assets 118, network-related devices of the network component 120, etc. (e.g., communication connections or conditions between industrial devices, types of connections between industrial devices, communication connections between industrial devices and network-related devices, etc.). The set of data further can include information relating to, for example, human behavior or interaction in connection with the industrial automation system 104 (e.g., maintenance schedules, shift-specific or operator-specific behavior or interaction of operators with the industrial automation system); production or process flows of the industrial automation system 104 at particular times or in connection with particular projects; and/or other aspects or features of the industrial automation system 104.

The model management component 128 can analyze the set of data and can generate the model 112 of the industrial automation system 104 based at least in part on the results of the analysis of the set of data. In some implementations, the model management component 128 can generate the model 112, which can be a multidimensional (e.g., 2-D or 3-D) model, in accordance with an International Standardization Organization (ISO) standard(s).

The model management component 128 also can facilitate generation of a multi-dimensional (e.g., 2-D or 3-D) visualization or virtualization of the industrial automation system. The multi-dimensional virtualization of the industrial automation system can be used (e.g., interacted with by a user) to facilitate using (e.g., accessing) backup-related services or modeling services, and/or facilitate remote viewing of, interaction with, troubleshooting of problems with, controlling operation of, determining and/or generating optimization recommendations for, and/or optimization of industrial assets (e.g., 114, 116, 118) or the network component 120 of the industrial automation system 104.

When there are multiple industrial plant facilities, the model management component 128 can generate a model 112 that can represent (e.g., model) the multiple industrial automation systems (e.g., 104) of the multiple industrial plant facilities and/or respective models (e.g., sub-models) of the respective industrial automation systems (e.g., 104) of the respective industrial plant facilities. The model management component 128 also can facilitate the use of backup-related services or modeling services, and/or facilitate generation of a multi-dimensional visualization or virtualization of the multiple industrial automation systems (e.g., 104) that can be interacted with by users to facilitate remote viewing of, interaction with, troubleshooting of problems with, controlling operation of, determining and/or generating optimization recommendations for, and/or optimization of industrial assets (e.g., 114, 116, 118) of the multiple industrial automation systems (e.g., 104).

In some implementations, to facilitate the modeling of an industrial asset (e.g., industrial device 114, industrial process 116, other industrial asset 118) or network-related device of the network component 120, the industrial asset (e.g., 114, 116, 118) or network-related device can comprise a pre-deployed model of that industrial asset (e.g., 114, 116, 118) or network-related device that the industrial asset (e.g., 114, 116, 118) or network-related device can provide (e.g., communicate) to the modeler component 110 on the cloud platform 106 via a cloud gateway component associated with the industrial asset (e.g., 114, 116, 118) or network-related device and/or the network component 120. For instance, when an industrial asset (e.g., 114 or 118) is installed into an industrial automation system 104, the model management component 128 can discover (e.g., automatically or dynamically detect the presence of) the industrial asset (e.g., 114 or 118) in the industrial automation system 104, and/or the industrial asset (e.g., 114 or 118) can make its presence known (e.g., automatically or dynamically make its presence known by communicating presence or identification information) to the model management component 128 via an associated cloud gateway component. The industrial asset (e.g., 114 or 118) can communicate its pre-deployed model (e.g., information relating to the pre-deployed model) to the modeler component 110 or backup component 102.

In response to receiving the model (e.g., pre-deployed model) of the industrial asset (e.g., 114 or 118), the model management component 128 can integrate or incorporate the model of the industrial asset (e.g., 114 or 118) into the model 112 of the industrial automation system 104 to update the model 112 and generate a modified model 112 of the industrial automation system 104. The model management component 128 also can analyze the modified model 112 of the industrial automation system 104 to determine whether any modification(s) is to be made or recommended to be made to an industrial asset(s) (e.g., 114, 116, 118) or network-related device(s) of the network component 120 to facilitate optimizing or improving operation of the industrial automation system 104 with the new industrial asset (e.g., 114 or 118). In some implementations, the model management component 128 can communicate modification information to an industrial asset(s) (e.g., 114, 116, 118) or network-related device(s) of the network component 120 to facilitate modifying (e.g., automatically, dynamically) such industrial asset(s) (e.g., 114, 116, 118) or network-related device(s), wherein such industrial asset(s) (e.g., 114, 116, 118) or network-related device(s) can modify or reconfigure itself based at least in part on the received modification information. In other implementations, the model management component 128 can generate a recommendation that can recommend modifying or reconfiguring such industrial asset(s) (e.g., 114, 116, 118) or network-related device(s) and can present the recommendation (e.g., via an interface, such as an human machine interface (HMI) or communication device), wherein a user can review the recommendation and decide whether or not to implement the recommendation to modify or reconfigure the such industrial asset(s) (e.g., 114, 116, 118) or network-related device(s). The modification or reconfiguration can comprise, for example, modifying a parameter(s) of the industrial asset (e.g., industrial device 114, industrial process 116, other industrial asset 118), modifying a connection of the industrial asset (e.g., 114, 116, 118) to another industrial asset or network-related device, updating software or firmware for an industrial asset (e.g., 114, 116, 118) or a network-related device, generating a new load balancing scheme for the industrial automation system 104, or other desired modification or reconfiguration of an industrial asset (e.g., 114, 116, 118) or network-related device of the network component 120.

In response to any modification or reconfiguration of such industrial asset(s) (e.g., 114, 116, and/or 118) or network-related device(s) of the network component 120 (e.g., in response to modification information communicated to (and implemented by) such industrial asset(s) or network-related device(s) by the modeler component 110, or in response to implementation of a recommendation to modify or reconfigure such industrial asset(s) (e.g., 114, 116, and/or 118) or network-related device(s), the modeler component 110 can receive updated information that can reflect such modification or reconfiguration from such industrial asset(s) (e.g., 114, 116, and/or 118) or network-related device(s) of the network component 120, and/or the communication device 122. The model management component 128 can update or modify the model 112 (e.g., the modified model with the model of the newly installed industrial asset) to generate a new modified model 112 based at least in part on the updated information to reflect the modification or reconfiguration of such industrial asset(s) (e.g., 114, 116, and/or 118) or network-related device(s).

In some implementations, the industrial asset (e.g., industrial asset (e.g., 114, 116, or 118) with an associated (e.g., integrated) cloud gateway component) not only can identify itself to the modeler component 110 (e.g., via the cloud gateway component), but also can detect or identify other industrial assets (e.g., 114, 116, 118) or network-related devices of the network component 120 near the industrial asset (e.g., 114, 116, or 118) and/or having a relationship (e.g., functional relationship or connection, sharing a common network) with the industrial asset (e.g., 114, 116, or 118). The industrial asset (e.g., 114, 116, or 118) can communicate information relating to the detected or identified industrial assets (e.g., 114, 116, 118) or network-related devices that are near the industrial asset (e.g., 114, 116, 118) and/or the relationships between the industrial asset (e.g., 114, 116, or 118) and the detected or identified industrial assets or network-related devices to the modeler component 110. The model management component 128 can integrate or incorporate such information into the model 112 of the industrial automation system 104 to update or modify the model 112 of the industrial automation system 104 to generate a modified model of the industrial automation system 104.

An industrial device 114 or a network-related device of the network component 120, or another device, also can comprise components, tools, functions, etc., that can allow users (e.g., original equipment manufacturers (OEMs)) who are providing a custom solution to an entity (e.g., customer) to construct (e.g., build) or design a model (e.g., sub-model) that can correspond to their sub-system (e.g., a motor control cabinet). The sub-model can be stored on one or more devices (e.g., industrial assets (e.g., controller, motor drive), network-related devices (e.g., router, transceiver)) of the sub-system. When the sub-system is installed in the industrial automation system 104, the modeler component 110 can discover (e.g., automatically detect) the addition of the sub-system to the industrial automation system 104 and/or the sub-system can make (e.g., automatically) its presence in the industrial automation system 104 known to the modeler component 110 or backup component 102.

The one or more devices (e.g., one or more industrial assets (e.g., 114, 116, 118) or network-related devices) of the sub-system can communicate the model of the sub-system (e.g., information relating to the model) to the modeler component 110 (e.g., via the cloud gateway component). The model management component 128 can integrate or incorporate the sub-model of the sub-system with the other modeling information relating to the other industrial assets (e.g., 114, 116, 118) and components (e.g., 120) of the industrial automation system 104 to modify the model 112 of the industrial automation system 104 to generate a modified model 112 of the industrial automation system 104.

As part of a model of an industrial automation system 104, the model management component 128 can store configuration information for respective industrial assets (e.g., 114, 116, 118) or network-related devices of the industrial automation system 104 in or with the model 112 (e.g., in a model file of the model 112 that can be stored (e.g., backed up) in the data store 124 in the cloud). The model management component 128 can, for example, store such configuration information in a device-agnostic format and/or platform-agnostic format, or another desired format (e.g., a common and convertible format) to facilitate enabling the configuration information to be used with different devices (e.g., replacement devices) and/or different platforms (e.g., used by a replacement device) in an industrial automation system 104.

In some implementations, the model management component 128 can facilitate communicating (e.g., transferring, pushing down) configuration information for respective (e.g., various) types of industrial assets (e.g., 114, 116, 118) or network-related device of the network component 120 of the industrial automation system 104 to the respective types of industrial assets (e.g., 114, 116, 118) or network-related devices to facilitate configuring the respective types of industrial assets (e.g., 114, 116, 118) or network-related devices. This can facilitate improved (e.g., easier) deployment of new industrial assets (e.g., 114, 116, 118), network-related devices, or systems, and/or can facilitate ensuring consistency of plant standards across the plant (e.g., comprising an industrial automation system) or multiple plants (e.g., comprising multiple industrial automation systems) and/or one or more entities (e.g., supplier entities) associated with the one or more plants. For example, if an old industrial device 114 (e.g., old controller) in a particular part of an industrial automation system 104 is replaced with a new industrial device 114 (e.g., new controller) for whatever reason, in response to discovering or being notified of the new industrial device 114 in the industrial automation system, the model management component 128 can retrieve configuration information that was previously used for the old industrial device 114 from the data store 124 in the cloud and can communicate desirable (e.g., suitable) configuration information to the new industrial device 114 to facilitate configuring (e.g., quickly configuring) the new industrial device 114 so that the new industrial device 114 can operate desirably (e.g., optimally, acceptably, suitably) in the industrial automation system 104, wherein the desirable configuration information can be the same as, or based at least in part on, the retrieved configuration information associated with the old industrial device 114, depending on the respective types, models, manufacturers, and/or other features of the old industrial device 114 and new industrial device 114.

The model 112 of an industrial automation system(s) 104 generated by the modeler component 110 can be agnostic with regard to the different vendors or platforms that can be associated with industrial assets (e.g., 114, 116, 118) or network-related device of the network component 120 that can be employed in the industrial automation system(s) 104. Thus, for instance, with regard to the example replacement of the old industrial device 114, the model management component 128 or backup component 102 can, as desired (e.g., as necessary), translate configuration information in a first format relating to the old industrial device 114 (e.g., controller of a first type, of a first model, and/or from a first manufacturer) to new configuration information in a second format relating to the new industrial device 114 (e.g., controller of a second type, of a second model, and/or from a second manufacturer), and can communicate the new configuration information in the second format from the cloud platform 106 to the new industrial device 114 at the plant to facilitate configuring the new industrial device 114 using the new configuration information in a format (e.g., the second format) that can be usable and understood by the new industrial device 114. That is, prior to configuration information for an industrial asset (e.g., 114, 116, 118) or a network-related device at a plant being communicated to (e.g., pushed down to) the industrial asset or network-related device, the model management component 128 or backup management component 108 can translate the configuration information relating to such industrial asset or network-related device that is stored in the cloud-based data store 124 to a format that can be compatible with the new industrial asset or network-related device to which the configuration information is being sent. This can shorten installation time for installing a new industrial device 114, industrial process 116, other type of industrial asset 118, network-related device of the network component 120, etc., and can ensure that the new industrial device 114, industrial process 116, other type of industrial asset 118, network-related device, etc., can operate according to the same parameters as the previous industrial device 114, industrial process 116, other type of industrial asset 118, network-related device, etc., regardless of the respective types, models, manufacturers, and/or other features of the previous industrial device 114, industrial process 116, other type of industrial asset 118, network-related device, etc., and the new industrial device 114, industrial process 116, other type of industrial asset 118, network-related device, etc.

The model 112 of an industrial automation system 104 of an entity (e.g., a company) can be used for other purposes as well. For instance, an entity, such as a large company, may work with various suppliers, vendors, or system integrators to obtain industrial assets (e.g., 114, 116, 118) or network-related devices, have industrial assets (e.g., 114, 116, 118) or network-related devices designed, etc., for the industrial automation system 104. The entity can have respective, relevant portions of the model 112 of its industrial automation system 104 provided to respective suppliers, vendors, or system integrators so that the respective suppliers, vendors, or system integrators can have respective, relevant information (e.g., parameters, configuration information, specification information) for the respective industrial assets (e.g., 114, 116, 118) or network-related devices they are designing and/or providing to the entity for the respective portions of the industrial automation system 104. For example, the model management component 128 or backup management component 108 can provide specifications for an industrial device 114 (e.g., controller or motor), which is designed and/or manufactured by a supplier entity and used in an industrial automation system 104 of an enterprise entity, to the supplier entity (e.g., a communication device of the supplier entity) via a relevant portion of the model 112 of the portion of the industrial automation system 104 that comprises the industrial device 114. Also, with regard to device configuration and manufacturing standards developed by the enterprise entity or another entity(ies) in connection with one or more industrial devices 114 of the industrial automation system 104 and employed at a facility (e.g., main facility) of the enterprise entity, the model management component 128 can encode or incorporate such device configuration and manufacturing standards in the model 112 of the industrial automation system 104. The model management component 128 or backup management component 108 can provide the model 112 of the industrial automation system 104, or a relevant portion thereof, to one or more other facilities (e.g., one or more communication devices of the one or more facilities) associated with the enterprise entity to provide such device configuration and manufacturing standards to the one or more other facilities to enforce operational standardization across multiple facilities and to make configuration of industrial automation systems (e.g., 104) at other (e.g., new) facilities easier through the use of such device configuration and manufacturing standards obtained from the model at the other facilities. Thus, the model 112 can be used by an enterprise entity to facilitate homogenizing industrial automation systems (e.g., 104) and/or product lines of the enterprise entity globally.

In accordance with other aspects and implementations of the disclosed subject matter, once the model 112 of an industrial automation system 104 is constructed, the model 112 can be an active part of the enterprise entity's industrial automation system 104 and can be integrated with other services (e.g., backup-related services, virtualization services, custom data services, remote services) and applications.

Figure 2:
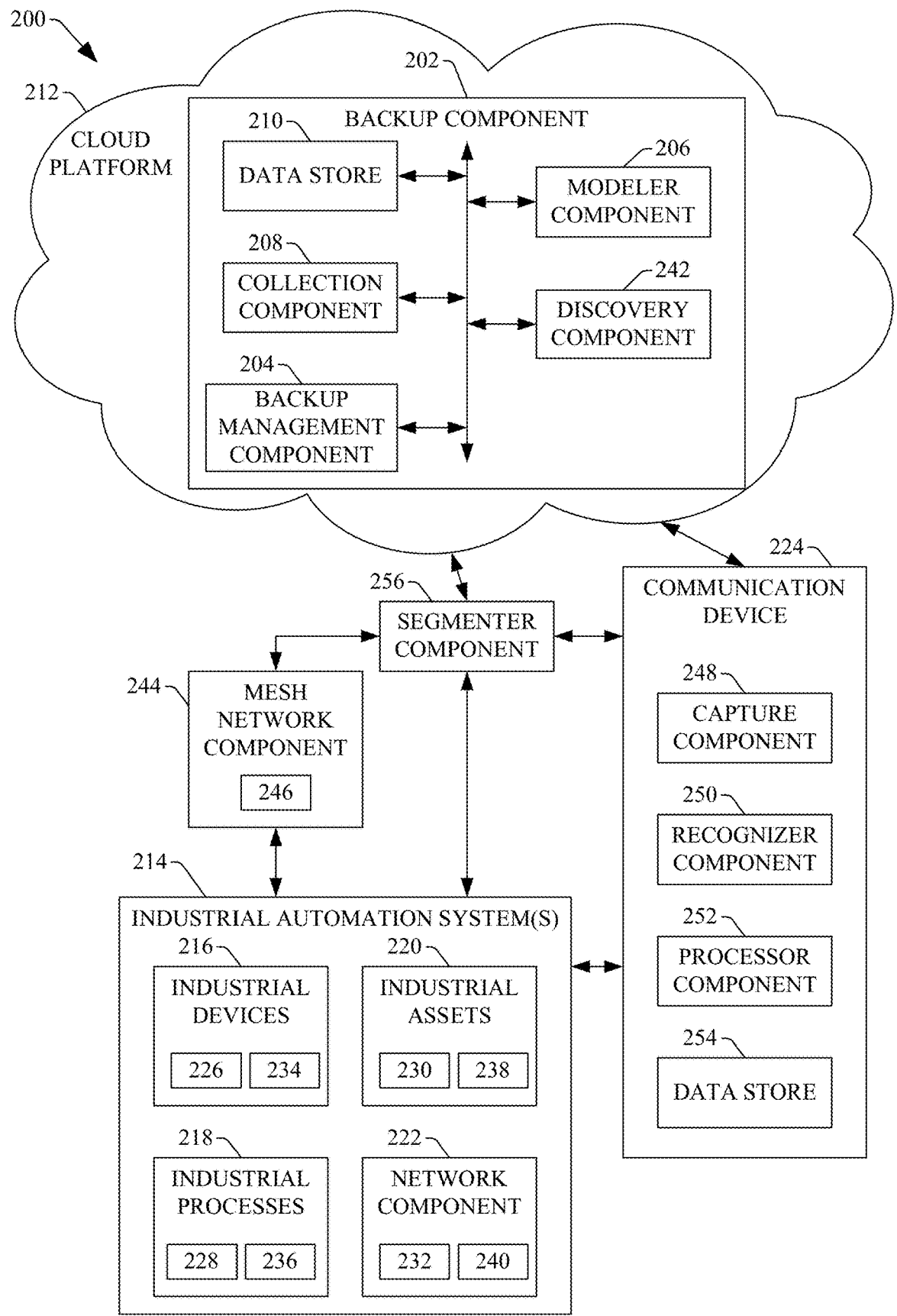
FIG. 2 depicts a block diagram of an example system that can facilitate performing an inventory of assets of an industrial automation system to facilitate backing up and modeling the industrial automation system, in accordance with various aspects and embodiments of the disclosed subject matter.

FIG. 2 illustrates a block diagram of an example system 200 that can facilitate performing an inventory of assets of an industrial automation system to facilitate backing up and modeling the industrial automation system, in accordance with various aspects and embodiments of the disclosed subject matter. The system 200 can comprise a backup component 202, which can comprise or be associated with a backup management component 204, a modeler component 206, a collection component 208, and a data store 210, wherein these components can reside on a cloud platform 212. The system 200 also can comprise an industrial automation system 214 that can comprise industrial devices 216, industrial processes 218, other industrial assets 220, a network component 222, wherein the industrial automation system 214 can be associated with (e.g., interfaced with, communicatively connected to) the components of the cloud platform 212. The system 200 also can comprise a communication device 224 that can be associated with (e.g., interfaced with, communicatively connected to) the components of the cloud platform 212 and the industrial automation system 214.

In some implementations, some or all of the industrial devices 216, industrial processes 218, other assets 220 and network-related devices of the network component 222 of an industrial automation system(s) 214 can comprise respective information provider components, such as information provider components 226, 228, 230, and 232, wherein the respective information provider components 226, 228, 230, and 232 can comprise and provide (e.g., communicate, present) respective information regarding the respective industrial devices 216, industrial processes 218, other assets 220 and network-related devices of the network component 222 of the industrial automation system(s) 214 to the backup component 202, for example, via respective cloud gateway components or via the communication device 224. Some or all of the industrial devices 216, industrial processes 218, other assets 220 and network-related devices of the network component 222 can comprise respective cloud gateway components, such as cloud gateway components 234, 236, 238, and 240. The respective cloud gateway components 234, 236, 238, and 240 can facilitate communication of information between the cloud platform 212, including the backup component 202 on the cloud platform 212, and the respective industrial devices 216, industrial processes 218, other assets 220 and network-related devices of the network component 222 of the industrial automation system 214.

The respective information provider components 226, 228, 230, and 232 can be equipped with or associated with components, tools, functions, etc., that can allow the backup management component 204 or modeler component 206 to inventory the respective industrial devices 216, industrial processes 218, other assets 220 and network-related devices of the network component 222 to obtain information regarding the respective industrial devices 216, industrial processes 218, other assets 220 and network-related devices of the network component 222 from them. The backup management component 204 or modeler component 206 can utilize such information to facilitate backing up information relating to the industrial automation system 214, generating a model of the industrial automation system(s) 214, or performing other cloud-based services, based at least in part on such inventory of the respective industrial devices 216, industrial processes 218, other assets 220 and network-related devices of the network component 222.

The backup component 202 can comprise a discovery component 242 that can poll (e.g., transmit queries, request information from) the respective industrial devices 216, industrial processes 218, other industrial assets 220, and/or network-related devices of the network component 222 via the respective cloud gateway components 234, 236, 238, and 240 to facilitate obtaining the information regarding the respective industrial devices 216, industrial processes 218, other industrial assets 220, and/or network-related devices of the network component 222 from the respective information provider components 226, 228, 230, and 232. In accordance with various implementations, the respective cloud gateway components 234, 236, 238, and 240 can be associated with (e.g., communicatively connected to) and/or integrated with the respective industrial devices 216, industrial processes 218, other industrial assets 220, and/or network-related devices of the network component 222, wherein the respective cloud gateway components 234, 236, 238, and 240 can enable the respective information provider components 226, 228, 230, and 232 to communicate with the backup component 202 in the cloud to facilitate the discovery component 242 detecting, discovering, obtaining information from, the respective industrial devices 216, industrial processes 218, other industrial assets 220, and/or network-related devices of the network component 222 of the industrial automation system(s) 214.

With regard to the respective industrial devices 216, industrial processes 218, other industrial assets 220, and/or network-related devices of the network component 222, the information can comprise, for example, respective pre-deployed models of the respective industrial devices 216, industrial processes 218, other industrial assets 220, and/or network-related devices of the network component 222, respective identification information (e.g., respective identifiers) that can respectively identify the respective industrial devices 216, industrial processes 218, other industrial assets 220, and/or network-related devices of the network component 222, respective configuration information that can respectively identify a configuration of the respective industrial devices 216, industrial processes 218, other industrial assets 220, and/or network-related devices of the network component 222, respective contextual information relating to respective industrial assets (e.g., 216, 218, 220) or network-related devices, information relating functional or geographical relationships between respective industrial assets (e.g., 216, 218, 220) or between an industrial asset (e.g., 216, 218, or 220) and a network-related device of the network component 222, information relating to a layout (e.g., functional layout, logic layout, geographical layout) of the industrial automation system 214, communication network connections, or other information.

In some implementations, the discovery component 242 can employ one or more detection or discovery techniques, tools, functions, etc., to facilitate detecting, discovering, and/or identifying industrial devices 216, industrial processes 218, other industrial assets 220, and/or network-related devices of the network component 222 (e.g., newly added industrial devices 216, industrial processes 218, other industrial assets 220, and/or network-related devices) of the industrial automation system 214. For example, the discovery component 242, and/or the respective information provider components 226, 228, 230, and 232, can use WHO techniques combined with ping techniques to facilitate detecting, discovering, and/or identifying industrial devices 216, industrial processes 218, other industrial assets 220, and/or network-related devices of the network component 222 of the industrial automation system 214.

In still other implementations, the system 200 can comprise a mesh network component 244 that can be associated with the backup component 202 in the cloud platform 212 via a cloud gateway component 246 associated with (e.g., integrated with (as depicted), communicatively connected to) the mesh network component 244. The mesh network component 244 can be or can comprise a wireless mesh network appliance, for example. The mesh network component 244 can obtain and gather respective information relating to the respective industrial devices 216, industrial processes 218, other industrial assets 220, and/or network-related devices of the network component 222 of the industrial automation system 214, for example, via the respective information provider components 226, 228, 230, and 232, or via the communication device 224. The mesh network component 244 can provide (e.g., communicate) such information to the backup component 202 in the cloud via the cloud gateway component 246.

In some implementations, an industrial automation system 214 can contain legacy industrial assets (e.g., legacy industrial devices or other legacy industrial assets) or legacy network-related devices that do not comprise or are not directly associated with a cloud gateway component. The communication device 224 (e.g., a laptop computer, a mobile phone, an electronic tablet, electronic eyeglasses, or other type of communication device) can be employed to facilitate inventorying (e.g., locally inventorying) and collecting information relating to such legacy industrial assets or legacy network-related devices.

The communication device 224 can comprise a capture component 248 that can comprise a camera that can be used to take one or more pictures, or video, of legacy industrial assets, legacy network-related devices, other industrial assets or network-related devices in proximity to the legacy industrial assets or legacy network-related devices, and/or an area of the plant in proximity to a legacy industrial asset or legacy network-related device. For example, the capture component 248 can take a picture or video of a nameplate or other identifier information on a legacy industrial asset or legacy network-related device to facilitate identifying the legacy industrial asset or legacy network-related device. The capture component 248 also can take a picture or video of a relationship (e.g., functional relationship (e.g., connection(s)), geographical relationship), for example, between a first industrial asset and another industrial asset(s).

In some implementations, the communication device 224 can comprise a recognizer component 250 that can analyze a photograph or video of one or more industrial assets and/or network-related devices, and can recognize (e.g. using pattern or OCR recognition) or identify a legacy industrial asset or legacy network-related device, a relationship between industrial assets, and/or a relationship between an industrial asset and a network-related device, based at least in part on information obtained via the photograph or video. In other implementations, the recognizer component can reside in the cloud (e.g., in the backup component 202), wherein the photograph or video can be received by the recognizer component in the cloud and analyzed by the recognizer component to facilitate recognizing or identifying a legacy industrial asset or legacy network-related device, a relationship between industrial assets, and/or a relationship between an industrial asset and a network-related device. Information relating to legacy industrial assets or legacy network-related devices also can be input to the communication device 224 by a user via a keyboard, keypad, or audio interface (e.g., a microphone) and communicated to the discovery component 242 or collection component 208 by the communication device 224.

The communication device 224 also can comprise a processor component 252 that can operate in conjunction with the other components (e.g., capture component 248) to facilitate performing the various functions and operations of the communication device 224. The processor component 252 can employ one or more processors (e.g., central processing units (CPUs), graphical processing units (GPUs), field-programmable gate arrays (FPGAs), etc.), microprocessors, or controllers that can process data, such as industrial-automation-system-related data (e.g., device data, process data, asset data, system data, etc.) associated with industrial automation systems, customer or client related data, data relating to parameters associated with an industrial automation system, etc., to facilitate communicating respective information relating to respective industrial assets or network-related devices to the backup component 202 or other component (e.g., on the cloud platform 212), or performing other discovery or identification related operations; and can control data flow between the communication device 224 and other components associated with the communication device 224.

In yet another aspect, the communication device 224 can contain a data store 254 that can store data structures (e.g., user data, metadata); code structure(s) (e.g., modules, objects, classes, procedures), commands, or instructions; industrial-automation-system-related data (e.g., including pictures or video) or other data associated with industrial automation systems or industrial enterprises; customer or client related information; parameter data; algorithms (e.g., algorithm(s) relating to recognizing or identifying respective industrial devices, industrial processes, industrial assets, network-related devices, interrelationships between such devices, processes, or assets); and so on. In an aspect, the processor component 252 can be functionally coupled (e.g., through a memory bus) to the data store 254 in order to store and retrieve data desired to operate and/or confer functionality, at least in part, to the capture component 248, recognizer component 250, etc., of the communication device 224 and/or substantially any other operational aspects of the communication device 224. It is to be appreciated and understood that the various components of the communication device 224 can communicate data, instructions, or signals between each other and/or between other components associated with the communication device 224 as desired to carry out operations of the communication device 224. It is to be further appreciated and understood that respective components (e.g., capture component 248, recognizer component 250, etc.) of the communication device 224 each can be a stand-alone unit, can be included within the communication device 224 (as depicted), can be incorporated within another component of the communication device 224 or a component separate from the communication device 224, and/or virtually any suitable combination thereof, as desired.

In certain implementations, the system 200 can comprise a segmenter component 256 that can be located at the local (e.g., plant) level (as depicted) or on the cloud platform 212. The segmenter component 256 can be associated with the industrial automation system 214, communication device 224, and/or mesh network component 244. The segmenter component 256 can classify, determine, filter, and/or segment respective data with regard to data that can be provided to the cloud platform (e.g., to the backup component 202 in the cloud) and data that is not to be provided to the cloud (e.g., to the backup component 202 in the cloud) based at least in part on one or more preferences (e.g., enterprise entity preference(s), user preference(s)). The one or more preferences can be determined or selected based at least in part on the respective levels of data sensitivity of respective items of data associated with the industrial automation system 214, as such respective levels of data sensitivity are determined or assigned to the respective data by the enterprise entity or other user. In certain implementations, the segmenter component 256 can have a slider component (e.g., a graphical slider component) or other control that can be manipulated (e.g., moved) by a user to facilitate setting the respective levels of data sensitivity for respective types of data associated with the industrial automation system 214.

Figure 3:
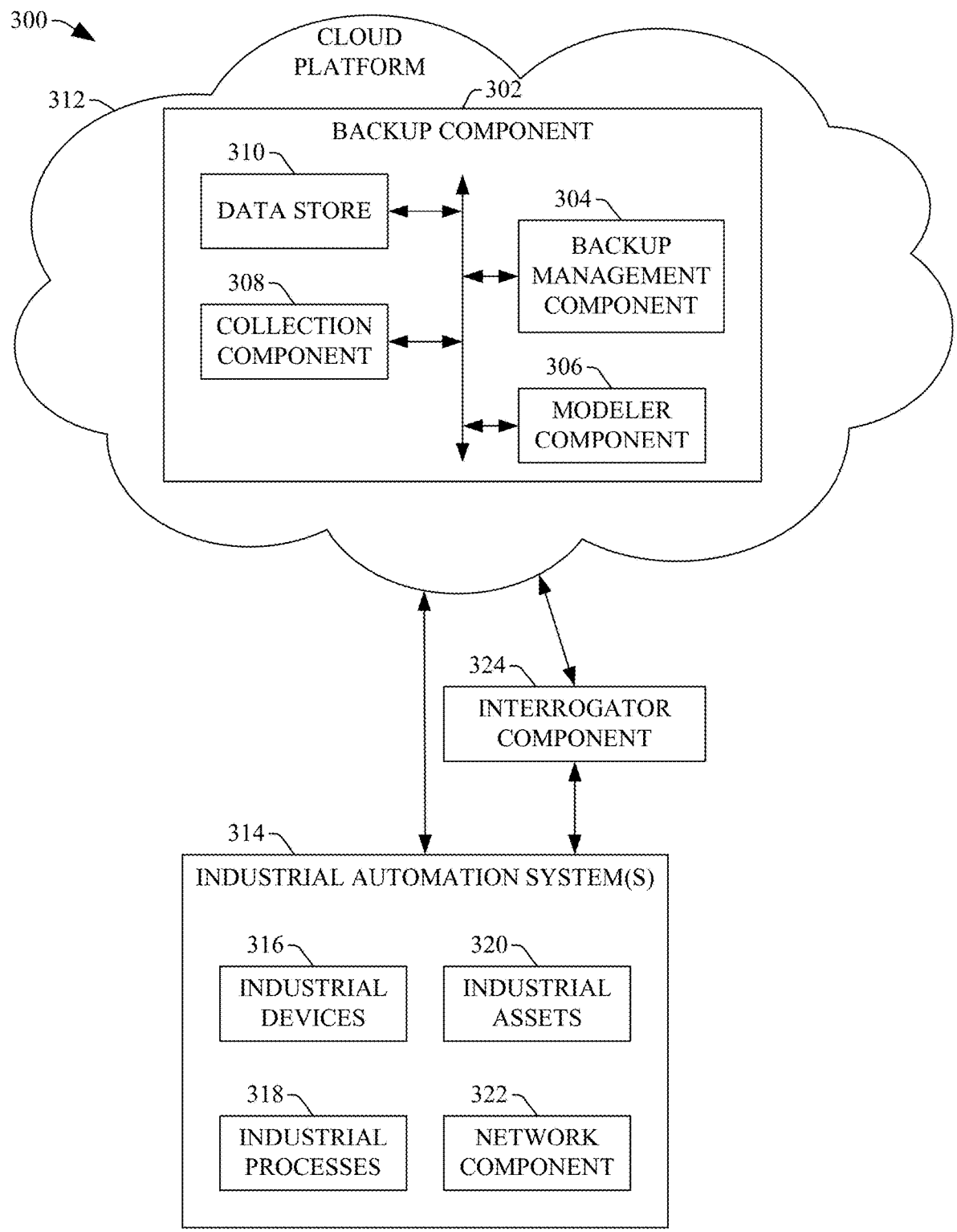
FIG. 3 depicts a block diagram of an example system that can facilitate identifying a user or device that is attempting to obtain an Internet Protocol (IP) address associated with an industrial automation system, in accordance with various aspects and embodiments of the disclosed subject matter.

FIG. 3 depicts a block diagram of an example system 300 that can facilitate identifying a user or device that is attempting to obtain an IP address associated with an industrial automation system, in accordance with various aspects and embodiments of the disclosed subject matter. The system 300 can comprise a backup component 302, a backup management component 304, a modeler component 306, a collection component 308, and a data store 310, wherein these components can reside on a cloud platform 312. The system 200 also can comprise an industrial automation system 314 that can comprise industrial devices 316, industrial processes 318, other industrial assets 320, a network component 322, wherein the industrial automation system 314 can be associated with (e.g., interfaced with, communicatively connected to) the components of the cloud platform 312.

The system 300 also can comprise an interrogator component 324 that can facilitate identifying a user or device that is attempting to obtain an IP address associated with the industrial automation system 314. For instance, at any given time, the interrogator component 324 can identify what devices (e.g., computer, mobile phone, electronic pad or table, industrial device, or other device) are on the network associated with the industrial automation system 314. The interrogator component 324 can employ one or more tools or techniques (e.g., troubleshooting or assistance tools or techniques) to facilitate identifying what user or device is trying to obtain an IP address in connection with the industrial automation system 314 (e.g., the network component 322 of the industrial automation system 314). In accordance with various implementations, the interrogator component 324 can be located at the local or plant level, or can be located in the cloud platform. For example, the interrogator component 324 can reside between the machine network and plant network, and can report (e.g., communicate) data, such as network-related or architecture data, to the backup component 302 on the cloud platform 312 for use by the backup component 302 to perform backup-related services in connection with the industrial automation system 314 and/or the modeler component 306 to facilitate generating or updating the model of the industrial automation system 314.

Figure 4:
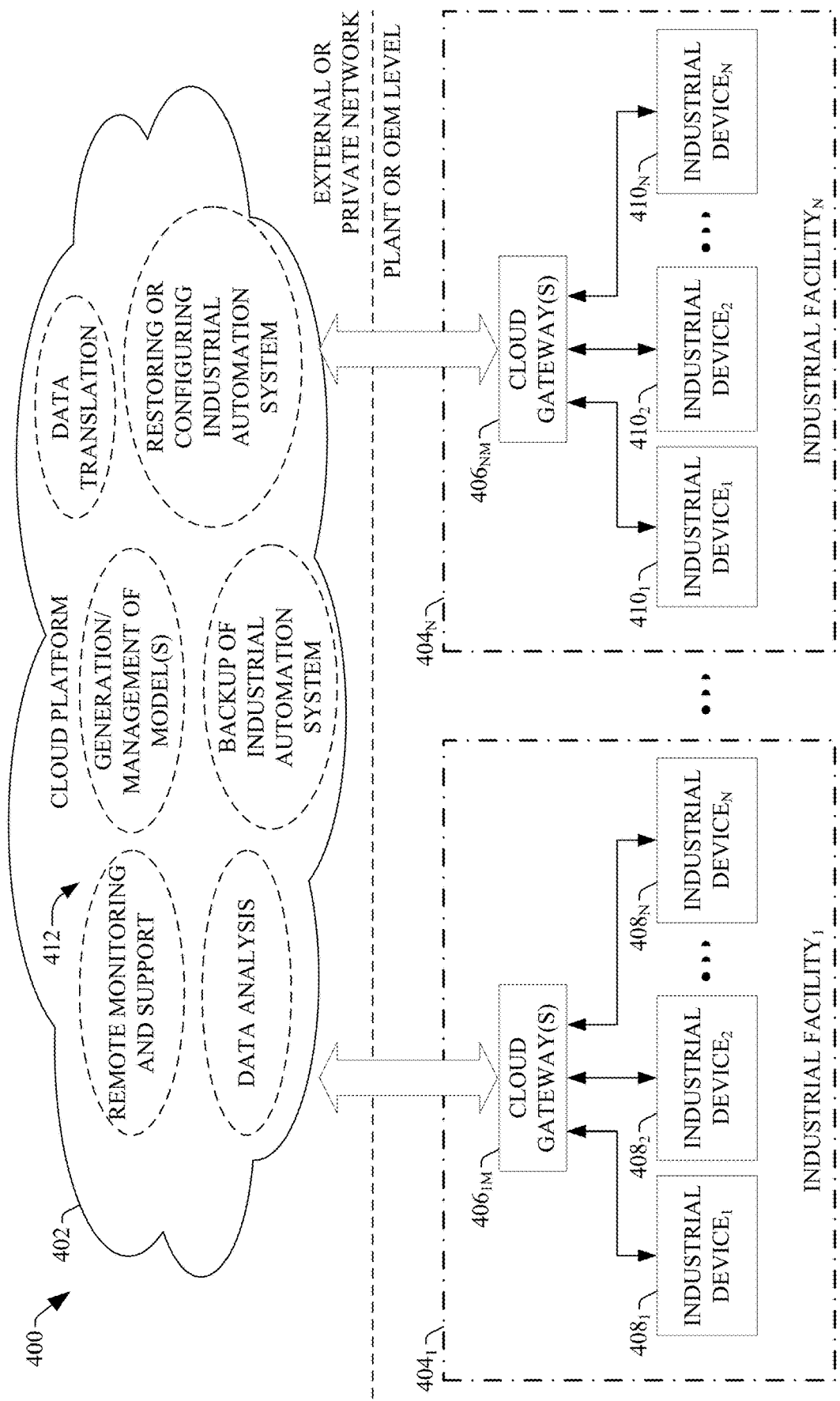
FIG. 4 illustrates a block diagram of a high-level overview of an example industrial enterprise that can leverage cloud-based services, including industrial-plant-backup-related services, modeling services, data collection services, and data storage services, in accordance with various aspects and embodiments of the disclosed subject matter.

As disclosed herein, the backup system, modeling system, or constituent components, such as described with regard to the systems (e.g., 100, 200, 300, etc.) described herein, or respective portions thereof, can be located on a cloud platform. To provide a general context for the cloud-based modeler system, cloud-based virtualization system, and services described herein, FIG. 4 illustrates a block diagram of a high-level overview of an example industrial enterprise 400 that can leverage cloud-based services, including industrial-plant-backup-related services, modeling services, data collection services, and data storage services, in accordance with various aspects and embodiments of the disclosed subject matter. The industrial enterprise 400 can comprise one or more industrial facilities, such as industrial facility$_1$ 404$_1$ up through industrial facility$_N$ 404$_N$, wherein each industrial facility can include a number of industrial devices in use. For example, industrial facility$_1$ 404$_1$ can comprise industrial device$_1$ 408$_1$ up through industrial device$_N$ 408$_N$, and industrial facility$_N$ 404$_N$ can comprise industrial device$_1$ 410$_1$ up through industrial device$_N$ 410$_N$. The industrial devices (e.g., 408$_1$, 408$_N$, 410$_1$, 410$_N$, etc.) can make up one or more industrial automation systems that can operate within the respective industrial facilities (e.g., industrial facility$_1$ 404$_1$ up through industrial facility$_N$ 404$_N$). Exemplary industrial automation systems can include, but are not limited to, batch control systems (e.g., mixing systems), continuous control systems (e.g., proportional-integral-derivative (PID) control systems), or discrete control systems. Industrial devices (e.g., 408$_1$, 408$_N$, 410$_1$, 410$_N$, etc.) can include such industrial devices as industrial controllers (e.g., programmable logic controllers or other types of programmable automation controllers); field devices such as sensors and meters; motor drives; HMIs; industrial robots, barcode markers, and readers; vision system devices (e.g., vision cameras); smart welders; or other types of industrial devices.

Exemplary industrial automation systems can include one or more industrial controllers that can facilitate monitoring and controlling of their respective industrial processes. The industrial controllers can exchange data with the field devices using native hardwired input/output (I/O) or via a plant network, such as Ethernet/Internet Protocol (IP), Data Highway Plus, ControlNet, Devicenet, or the like. A given industrial controller typically can receive any combination of digital or analog signals from the field devices that can indicate a current state of the industrial devices and/or their associated industrial processes (e.g., temperature, position, part presence or absence, fluid level, etc.), and can execute a user-defined control program that can perform automated decision-making for the controlled industrial processes based on the received signals. The industrial controller can output appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code that can be used to process input signals read into the controller and to control output signals generated by the industrial controller, including, but not limited to, ladder logic, sequential function charts, function block diagrams, structured text, or other such platforms.

Although the exemplary overview illustrated in FIG. 4 depicts the industrial devices (e.g., $408_1$, $408_N$, $410_1$, $410_N$) as residing in fixed-location industrial facilities (e.g., industrial facility$_1$ $404_1$ up through industrial facility$_N$ $404_N$, respectively), in some implementations, the industrial devices (e.g., $408_1$, $408_N$, $410_1$, and/or $410_N$) also can be part of a mobile control and/or monitoring application, such as a system contained in a truck or other service vehicle.

According to one or more embodiments of the disclosed subject matter, industrial devices (e.g., $408_1$, $408_N$, $410_1$, $410_N$, etc.) can be coupled to a cloud platform 402 to facilitate leveraging cloud-based applications and services (e.g., industrial-plant-backup-related services, data collection services, data storage services, modeling services, etc.) associated with the cloud platform 402. That is, the industrial devices (e.g., $408_1$, $408_N$, $410_1$, $410_N$, etc.) can be configured to discover and interact with cloud-based computing services 412 that can be hosted by the cloud platform 402. The cloud platform 402 can be any infrastructure that can allow cloud services 412 (e.g., cloud-based computing services, shared computing services) to be accessed and utilized by cloud-capable devices. The cloud platform 402 can be a public cloud that can be accessible via a public network, such as the Internet, by devices having public network connectivity (e.g., Internet connectivity) and appropriate authorizations to utilize the cloud services 412. In some scenarios, the cloud platform 502 can be provided by a cloud provider as a platform-as-a-service (PaaS) and/or reliability-as-a-service (RaaS), and the cloud services 412 can reside and execute on the cloud platform 402 as a cloud-based service. In some such configurations, access to the cloud platform 402 and associated cloud services 412 can be provided to customers as a subscription service by an owner of the cloud services 412. Additionally and/or alternatively, the cloud platform 402 can be a private cloud that can be operated internally by the industrial enterprise 400 or an associated enterprise associated with a third-party entity. An exemplary private cloud platform can comprise a set of servers that can host the cloud services 412 and can reside on a private network (e.g., an intranet, a corporate network, etc.) that can be protected by a firewall.

The cloud services 412 can include, but are not limited to, backup-related services, translation services (e.g., translation services to translate model data or other backup data), data collection, data storage, data analysis, control applications (e.g., applications that can generate and deliver control instructions to industrial devices (e.g., $408_1$, $408_N$, $410_1$, $410_N$, etc.) based at least in part on analysis of real-time or near real-time system data or other factors), remote monitoring and support, generation and management of a model (s) of an industrial automation system(s) that can correspond to the industrial automation system(s), remote control of an industrial automation system(s) via a model(s), provision of security in connection with a model or virtualized industrial automation system and an associated industrial automation system, or provision of other applications or services relating to industrial automation. If the cloud platform 402 is a web-based cloud, industrial devices (e.g., $408_1$, $408_N$, $410_1$, $410_N$, etc.) at the respective industrial facilities 404 can interact with cloud services 412 via the public network (e.g., the Internet). In an exemplary configuration, the industrial devices (e.g., $408_1$, $408_N$, $410_1$, $410_N$, etc.) can access the cloud services 412 through separate cloud gateways (e.g., cloud gateway component $406_{1M}$ up through cloud gateway component $406_{NM}$) at the respective industrial facilities (e.g., industrial facility$_1$ $404_1$ up through industrial facility$_N$ $404_N$, respectively), wherein the industrial devices (e.g., $408_1$, $408_N$, $410_1$, $410_N$, etc.) can connect to the respective cloud gateway components (e.g., cloud gateway component $406_{1M}$ up through cloud gateway component $406_{NM}$) through a physical (e.g., wireline) or wireless local area network or radio link. In another exemplary configuration, the industrial devices (e.g., $408_1$, $408_N$, $410_1$, $410_N$, etc.) can access the cloud platform 402 directly using an integrated cloud gateway service. Cloud gateway components (e.g., cloud gateway component $406_{1M}$ up through cloud gateway component $406_{NM}$) also can comprise an integrated component of a network infrastructure device, such as a firewall box, router, or switch.

Providing industrial devices with cloud capability via the cloud gateway components (e.g., cloud gateway component $406_{1M}$ up through cloud gateway component $406_{NM}$) can offer a number of advantages particular to industrial automation. For instance, cloud-based storage (e.g., cloud-based data store) offered by the cloud platform 402 can be easily scaled to accommodate the large quantities of data that can be generated daily by an industrial enterprise. Further, multiple industrial facilities (e.g., industrial facility$_1$ $404_1$ up through industrial facility$_N$ $404_N$) at different geographical locations can migrate (e.g., communicate) their respective industrial automation data to the cloud platform 402 (e.g., via the collection component) for aggregation, collation, collective big data analysis, and enterprise-level reporting without the need to establish a private network between the respective industrial facilities. Industrial devices (e.g., $408_1$, $408_N$, $410_1$, $410_N$, etc.) and/or cloud gateway components (e.g., cloud gateway component $406_{1M}$ up through cloud gateway component $406_{NM}$) having smart configuration capability can be configured to automatically detect and communicate with the cloud platform 402 upon installation at any facility, which can thereby simplify integration with existing cloud-based data storage, analysis, or reporting applications used by the industrial enterprise 400. In another exemplary application, cloud-based backup applications (e.g., employed by the backup system comprising a backup component) can access the data (e.g., model data or other backup information) relating to an industrial automation system(s) stored in the cloud-based data store, and can perform backup-related services (e.g., restoring industrial-automation-system-related data (e.g., lost model data or other backup data), configuring or programming all or a portion of an industrial automation system using backup information (e.g., model data or other backup data), standardizing industrial plant configurations and operations, translating model data or other backup data in accordance with a desired format or platform), to facilitate desirable (e.g., optimal, suitable) operation of the industrial automation system(s), or another industrial automation system(s), and remote interaction with the industrial automation system(s) by users (e.g., via a communication device) to facilitate remote performance of tasks in connection with the industrial automation system(s). In still another exemplary application, cloud-based backup applications or modeling applications (e.g., employed by a modeler system comprising the modeler component) can access the data relating to an industrial automation system(s) stored in the cloud-based data store, can generate and/or update a model(s) of an industrial automation system(s), wherein the model(s) can accurately depict or represent the layout and device make-up, and operation, of the industrial automation system(s) to facilitate desirable (e.g., optimal, suitable) operation of the industrial automation system(s) and remote interaction with the industrial automation system(s) by users (e.g., via a communication device) to facilitate remote performance of tasks in connection with the industrial automation system(s). These industrial cloud-computing applications are only intended to be exemplary, and the systems and methods described herein are not limited to these particular applications. As these examples demonstrate, the cloud platform 402, working with cloud gateway components (e.g., cloud gateway component $406_{1M}$ up through cloud gateway component $406_{NM}$), can allow builders of industrial applications to provide scalable solutions as a service, removing the burden of maintenance, upgrading, and backup of the underlying infrastructure and framework.

Figure 5:
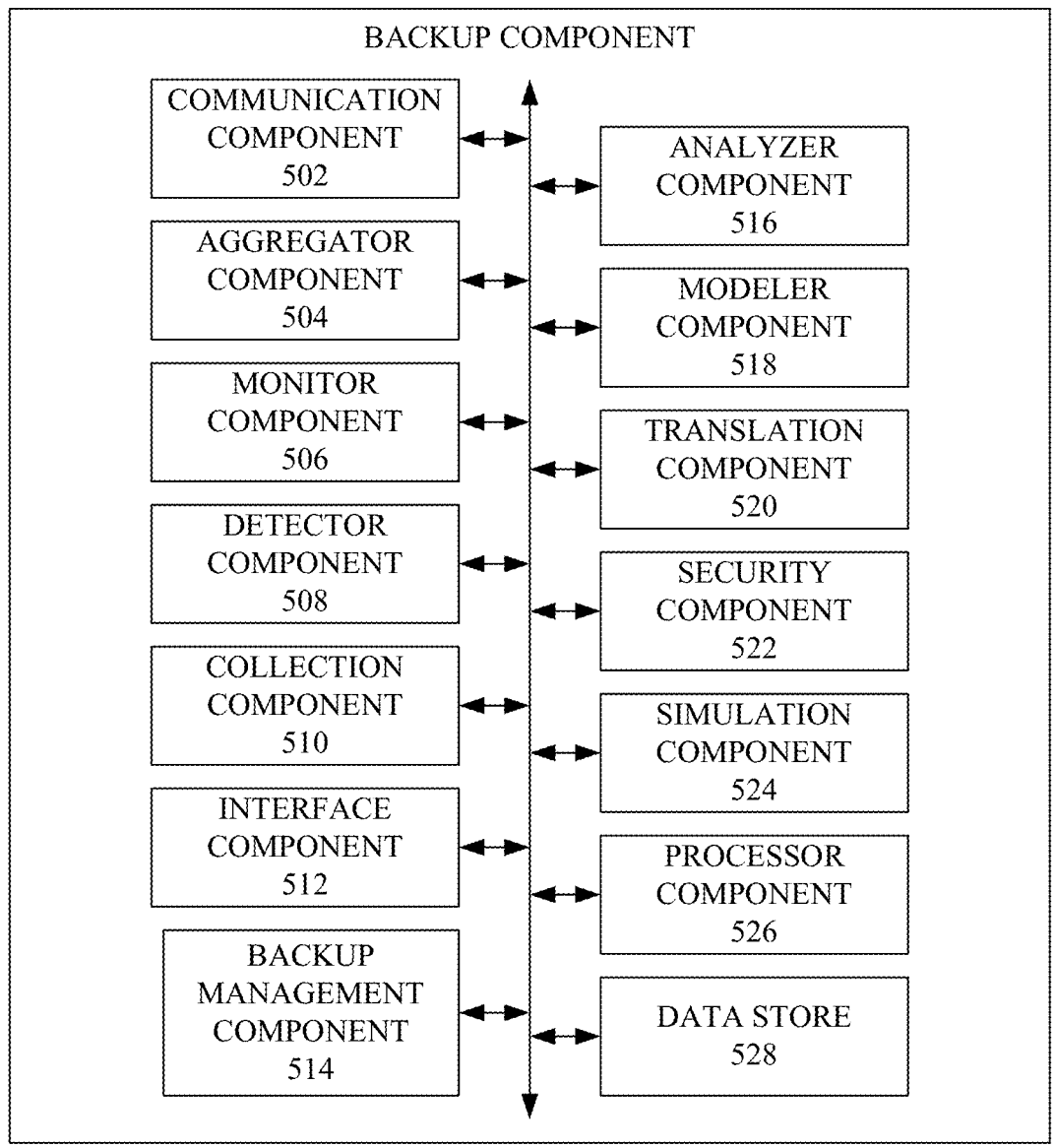
FIG. 5 presents a block diagram of an exemplary backup component (e.g., cloud-based, or partially cloud-based, backup component) according to various implementations and embodiments of the disclosed subject matter.

FIG. 5 presents a block diagram of an exemplary backup component 500 (e.g., cloud-based, or partially cloud-based, modeler component) according to various implementations and embodiments of the disclosed subject matter. The backup component 500 can be part of a backup system (e.g., a cloud-based backup system). Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

The backup component 500 can comprise a communication component 502 that can be used to communicate (e.g., transmit, receive) information between the backup component 500 and other components (e.g., communication devices, network-related devices, industrial devices, other types of industrial assets that have communication functionality, other devices with communication functionality that are associated with industrial enterprises, cloud gateway components, etc.). The information can include, for example, data relating to industrial automation systems, data relating to specifications, properties, or characteristics of industrial devices or other industrial assets, customer-related data, work-order-related data relating to work orders that will or may be handled by an industrial automation system, etc.

The backup component 500 can comprise an aggregator component 504 that can aggregate data received (e.g., obtained, collected, detected, etc.) from various entities (e.g., communication devices, industrial devices, industrial assets, network-related devices, cloud gateway components, other devices with communication functionality that are associated with industrial enterprises, processor component(s), user interface(s), data store(s), etc.). The aggregator component 504 can correlate respective items of data based at least in part on type of data, source of the data, time or date the data was generated or received, type of device or asset associated with the data, identifier associated with a device or asset, customer associated with the data, user (e.g., operator, supervisor or manager, engineer, technician, etc.) associated with the data, industrial automation system associated with the data, industrial enterprise associated with the system, etc., to facilitate processing of the data (e.g., analyzing of the data, backing up data of an industrial automation system(s), generating models, etc.).

The backup component 500 also can include a monitor component 506 that can monitor device data, process data, asset data, system data, customer data, and/or other data in connection with the industrial automation systems. For instance, the monitor component 606 can monitor information (e.g., signals, device or process statuses, network communication of information, process flows, updates, modifications, etc.) associated with industrial automation systems, virtualized industrial automation systems, industrial enterprises, and/or systems or devices of customers associated with the industrial enterprises to facilitate detecting information associated with industrial automation systems that can facilitate backing up information relating to the industrial automation systems, generating and updating models of industrial automation systems, generating and updating virtualized industrial automation systems, remotely tracking operation of or controlling operation of an industrial automation system via an associated model or associated virtualized industrial automation system, and/or performing other backup-related or modeling-related services. The monitor component 506 can be associated with sensors, meters, HMIs, communication monitoring components, or other components associated with industrial automation systems, industrial enterprises, and/or systems or devices of the customers to facilitate the monitoring of the industrial automation systems, industrial enterprises, and/or systems or devices of the customers.

The backup component 500 can comprise a detector component 508 that can detect desired information associated with industrial automation systems that can facilitate performing backup-related services, model-related services, or other services (e.g., other cloud-based services) in connection with an industrial automation system (e.g., backing up information relating to an industrial automation system, generating or updating a model, remotely interacting with (e.g., monitoring, tracking, and/or controlling, etc., operation of) an industrial automation system via interacting with a model or a virtualized industrial automation system, etc.), in accordance with the defined operation criteria (e.g., defined backup criteria, defined modeling criteria, or other operation criteria). For instance, the detector component 508 can detect desired device data, process data, asset data, system data, and/or customer data in connection with the industrial automation systems that can facilitate backing up data relating to the industrial automation system(s), or generating a model or a virtualized industrial automation system that can accurately represent and/or interface with an industrial automation system, remotely interacting with and/or controlling an industrial automation system via an associated model or virtualized industrial automation system, and/or performing other backup-related or modeling-related services or functions. In some implementations, the detector component 508 can be, can comprise, or can be associated with the discovery component (e.g., as described herein with regard to the system 200 of FIG. 2).

The backup component 500 also can include a collection component 510 that can receive, collect, or obtain data (e.g., desired device data, process data, asset data, system data, and/or customer data) from industrial automation systems, communication devices, models, virtualized industrial automation systems, extrinsic sources, etc., to facilitate performing backup-related and modeling-related services, as more fully disclosed herein. The data collected by the collection component 510 can be stored in the data store 528, and/or can be made available to other components (e.g., backup management component 514, analyzer component 516, etc.) to facilitate backing up data relating to the industrial automation systems, generating and updating models of industrial automation systems, generating and updating virtualized industrial automation systems, translating configuration, programming, and/or model data to facilitate restoring, configuring, and/or programming an industrial automation system, or portion thereof, remotely interacting with (e.g., monitoring, tracking, and/or controlling, etc.) an industrial automation system via an associated model or virtualized industrial automation system, and/or performing other backup-related or modeling-related services or functions.

The backup component 500 can comprise an interface component 512 that can be employed to facilitate interfacing the backup component 500 with industrial automation systems and their constituent components (e.g., industrial devices or assets, network-related devices or assets, etc.) or processes, systems or devices associated with customers, systems or devices associated with device manufacturers, etc. For instance, the interface component 512 can be configured to receive industrial data (e.g., device data, process data, asset data, system data, configuration data, status data, process variable data, etc.) sent by one or more cloud-capable industrial devices, cloud-capable network-related devices, cloud gateway components associated with industrial devices or network-related devices, communication devices, or other sources of industrial data. The interface component 512 also can be configured to receive network-related data (e.g., data relating to communication conditions, network-status data, data identifying network-related devices, etc.) communicated by one or more network-related devices of the network component of an industrial automation system. The interface component 512 also can be configured to interface a model (or an virtualized industrial automation system) with a corresponding industrial automation system to facilitate remotely interacting with (e.g., monitoring, tracking, and/or controlling, etc., operation of) the industrial automation system via interactions (e.g., user interactions) with the model (or the virtualized industrial automation system (e.g., via virtualized control of the virtualized operation of the virtualized industrial automation system)). The interface component 512 further can be configured to exchange data with one or more client or customer devices via an Internet connection. For example, the interface component 512 can receive customer profile data, requests for firmware upgrades, customer service selections, information relating to work orders for products, customer preferences or requirements with regard to a work order, or other such information from a client device (e.g., an Internet-capable client device, such as a phone, a computer, an electronic tablet or pad, or other suitable Internet-capable device). The interface component 512 also can deliver (e.g., communicate, download) backed-up data (e.g., configuration data, programming data, parameter data model data of the model), upgrade notifications, firmware upgrades, reports or notifications regarding the evaluation of and determinations regarding proposed modifications to an industrial automation system, notifications of impending device failures, identification of asset or system inefficiencies, configuration recommendations, or other such data to the client device.

The backup component 500 also can contain a backup management component 514 that can control operations relating to processing data, backing up data of an industrial automation system(s) for storage on the cloud platform, generating agnostic or standardized backed-up data (e.g., model data, configuration data, programming data, parameter data) relating to an industrial automation system, translating (e.g., converting) data from one format or platform (e.g., agnostic or standardized format or platform) to another format or platform (e.g., a format or platform employed by an industrial automation system, or portion thereof), generating or updating a model of an industrial automation system, facilitating generating or updating a virtualized industrial automation system that can represent an industrial automation system, remotely controlling an industrial automation system (e.g., using an associated model or virtualized industrial automation system), performing simulation operations using a model (e.g., simulation model) in connection with an industrial automation system, and/or performing other operations in connection with the industrial automation system. The backup management component 514 can facilitate controlling operations being performed by various components of the backup component 500, controlling data flow between various components of the backup component 500, controlling data flow between the backup component 500 and other components or systems associated with the backup component 500, etc.

The analyzer component 516 can analyze data (e.g., device data, process data, asset data, system data, customer data, user-generated or user-provided data, and/or other data) to facilitate generating backed-up data relating to an industrial automation system (e.g., model data, configuration data, programming data, parameter data), translating (e.g., converting) data from one format or platform (e.g., agnostic or standardized format or platform) to another format or platform (e.g., a format or platform employed by an industrial automation system, or portion thereof), downloading backed-up data to an industrial automation system, generating or updating a model of an industrial automation system, generating or updating a virtualized industrial automation system of an industrial automation system, performing simulation of operation of an industrial automation system using a model, etc. The analyzer component 516 can parse data to facilitate identifying data that is relevant to performing an operation (e.g., generating backed-up data, generating a model, generating a virtualized industrial automation system, etc.) by the backup component 500. Based at least in part on the analysis of the data, the analyzer component 516 can generate analysis results that can be provided to another component (e.g., backup management component 514, processor component 526, data store 528, etc.) to facilitate the performance of various operations by the backup component 500.

The backup component 500 also can comprise a modeler component 518 that can generate and/or update a model that can represent an industrial automation system, facilitate remotely interacting with and/or controlling an industrial automation system using an associated model or virtualized industrial automation system, perform simulation operations using a model of an industrial automation system, and/or performing other operations. For instance, the modeler component 518 can generate and/or update a model that can represent an industrial automation system, including generating and/or updating modeled versions or instances of the constituent components (e.g., industrial devices, industrial processes, industrial assets, network-related devices or assets, etc.) of the industrial control system, the interrelationships between respective constituent components, configurations of respective constituent components, etc., in accordance with the set of defined modeling criteria, as more fully disclosed herein.

The backup component 500 can include a translation component 520 that can translate (e.g., convert) data from one format or platform (e.g., agnostic or standardized format or platform) to another format or platform (e.g., a format or platform employed by an industrial automation system, or portion thereof). For instance, the translation component 520 can generate or translate data, such as backed-up data (e.g., configuration data, programming data, parameter data, model data), relating to an industrial automation system such that the data is in an agnostic or standardized format, or in another desired format (e.g., commonly used format), wherein the backed-up data can be agnostic with respect to the format or platform employed by any particular industrial automation system or constituent component (e.g., industrial device, network-related device) thereof. When backed-up data is to be downloaded to a particular industrial automation system, the translation component 520 can translate the backed-up data to a desired (e.g., compatible) format that can be compatible with the particular industrial automation system (e.g., an industrial device(s) of the industrial automation system) with respect to format (e.g., language, syntax, or other structure) and/or platform, based at least in part on the characteristics of the particular industrial automation system. The backup management component 514, translation component 520, or other component can determine the characteristics of the particular industrial automation system based at least in part on industrial data (e.g., industrial-automation-system-related data) relating to the particular industrial automation system (e.g., obtained from the particular industrial automation system, the data store 528, or from an extrinsic data source). The translation component 520 can determine a translation function to apply to the stored backed-up data (e.g., backed-up data in the agnostic or standardized format), based at least in part on the characteristics of the particular industrial automation system, and can apply the translation function to translate the backed-up data to generate compatible backup data that can be compatible with the particular industrial automation system. The backup management component 514 can communicate (e.g., transmit, download) the compatible backup data to the industrial automation system to facilitate restoring, configuring or reconfiguring, and/or programming or re-programming, etc., the particular industrial automation system, or portion thereof.

The backup component 500 also can comprise a security component 522 that can facilitate securing data (e.g., industrial data, backed-up data, a model (e.g., model data)), the cloud platform (including components therein), a virtualized industrial automation system associated with a model, and an industrial automation system. The security component 522 can facilitate controlling access to the data, the cloud platform, the virtualized industrial automation system, and/or the industrial automation system, based at least in part on respective authentication credentials of user, respective access rights of users, respective locations of users, etc.

The backup component 500 also can comprise a simulation component 524 that can generate or augment a model of the industrial automation system for use as a simulation model of the industrial automation system based at least in part on the simulation or emulation of the industrial control system, in accordance with the set of defined modeling criteria. The simulation component 524 can integrate the respective simulations or emulations of the constituent components of the industrial automation system, the interrelationships between respective constituent components, configurations of respective constituent components, etc., to facilitate generating the simulation model that can simulate or emulate the industrial automation system. The simulation component 524 also can use the simulation model to facilitate simulating operation of the industrial automation system under (e.g., in response to) a given set of conditions (e.g., under a set of conditions associated with a modification (e.g., adjustment to a modeled control, adjustment to a modeled switch, addition of a modeled industrial device, replacement of a modeled industrial device with a new modeled industrial device, change of a parameter on a modeled industrial device, etc.) to the model (or associated virtualized industrial control system) that is under consideration). The backup component 500 or a user can analyze the results of the simulated operation of the industrial automation system, and can determine whether the model of the industrial automation system accurately replicates the industrial automation system, determine whether a modification to the model (or associated virtualized industrial control system) that is under consideration is to be performed, determine whether the corresponding modification to the industrial automation system is to be performed, etc., based at least in part on the analysis results.

The backup component 500 also can comprise a processor component 526 that can operate in conjunction with the other components (e.g., communication component 502, aggregator component 504, monitor component 506, etc.) to facilitate performing the various functions and operations of the backup component 500. The processor component 526 can employ one or more processors (e.g., CPUs, GPUs, FPGAs, etc.), microprocessors, or controllers that can process data, such as industrial data (e.g., device data, process data, asset data, system data, etc.) associated with industrial control systems, customer or client related data, data relating to parameters associated with the backup component 500 and associated components, etc., to facilitate backing up an industrial automation system, translating data relating to an industrial automation system, downloading backed-up data to an industrial automation system, generating or updating a model or a virtualized industrial automation system that can represent an industrial automation system, remotely interacting with and/or controlling an industrial automation system using an associated model or virtualized industrial automation system, generating a simulation model of an industrial automation system, performing simulation operations using simulation models to facilitate determining whether to perform a particular action in connection with a model, a virtualized industrial automation system, or associated industrial automation system, performing other backup-related or modeling-related operations, etc.; and can control data flow between the backup component 500 and other components associated with the backup component 500.

In yet another aspect, the backup component 500 can contain a data store 528 that can store data structures (e.g., user data, metadata); code structure(s) (e.g., modules, objects, classes, procedures), commands, or instructions; industrial data or other data associated with industrial automation systems or industrial enterprises; customer or client related information; data relating to backup-related or modeling-related services in connection with industrial automation systems; data relating to backing up an industrial automation system, translating data relating to an industrial automation system, downloading backed-up data to an industrial automation system, or generating or updating a model or a virtualized industrial automation system that can represent an industrial automation system; parameter data; algorithms (e.g., algorithm(s) relating to backing up data or using backed-up data; algorithm(s) relating to generating or updating model or a virtualized industrial automation system that can represent an industrial automation system, including its industrial devices, industrial processes, industrial assets, network-related devices, interrelationships between such devices, processes, or assets, etc.; algorithm(s) relating to remotely interacting with (e.g., monitoring, tracking, controlling, etc.) an industrial automation system using an associated model or virtualized industrial automation system); defined backup criteria, defined modeling criteria, or other defined operation criteria; and so on. In an aspect, the processor component 526 can be functionally coupled (e.g., through a memory bus) to the data store 528 in order to store and retrieve data desired to operate and/or confer functionality, at least in part, to the communication component 502, aggregator component 504, monitor component 506, etc., of the backup component 500 and/or substantially any other operational aspects of the backup component 500. It is to be appreciated and understood that the various components of the backup component 500 can communicate data, instructions, or signals between each other and/or between other components associated with the backup component 500 as desired to carry out operations of the backup component 500. It is to be further appreciated and understood that respective components (e.g., communication component 502, aggregator component 504, monitor component 506, etc.) of the backup component 500 each can be a stand-alone unit, can be included within the backup component 500 (as depicted), can be incorporated within another component of the backup component 500 (e.g., within the backup management component 514) or a component separate from the backup component 500, and/or virtually any suitable combination thereof, as desired. It also is to be appreciated and understood that respective components (e.g., communication component 502, aggregator component 504, monitor component 506, . . . processor component 526, data store 528) of the backup component 500 can be shared with and used by another component(s) (e.g., virtualization component) or system(s) (e.g., modeling system, virtualization system) or such other component(s) or system(s) can comprise components that can be the same as or similar to that of the backup component 500.

In accordance with various embodiments, one or more of the various components of the backup component 500 (e.g., communication component 502, aggregator component 504, monitor component 506, etc.) can be electrically and/or communicatively coupled to one another to perform one or more of the functions of the backup component 500. In some implementations, one or more components of the backup component 500 (e.g., communication component 502, aggregator component 504, monitor component 506, etc.) can comprise software instructions that can be stored in the data store 528 and executed by the processor component 526. The backup component 500 also can interact with other hardware and/or software components not depicted in FIG. 5. For example, the processor component 526 can interact with one or more external user interface devices, such as a keyboard, a mouse, a display monitor, a touchscreen, or other such interface devices.

Figure 6:
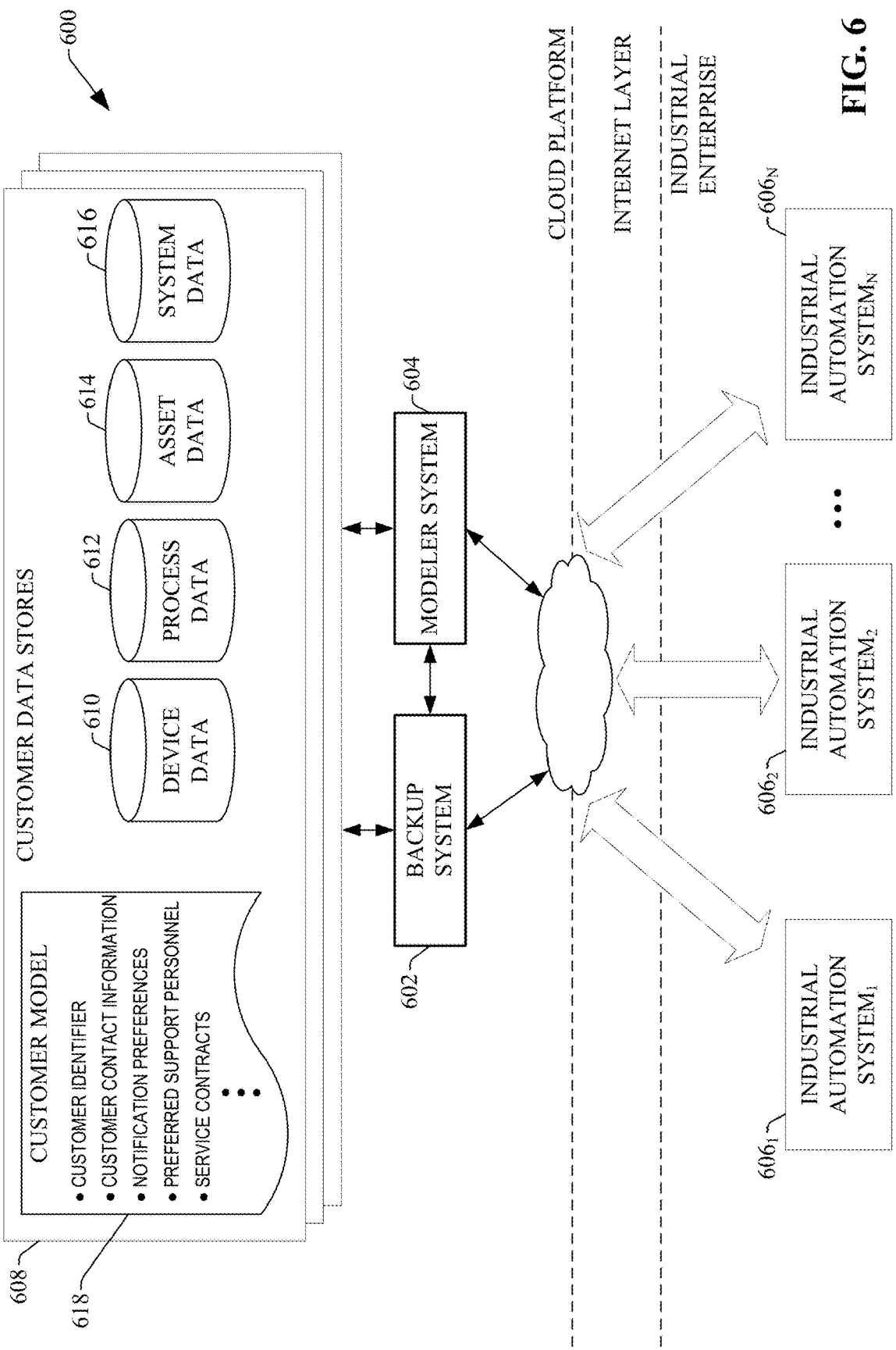
FIG. 6 illustrates a diagram of an example system that can facilitate backup of an industrial automation system and/or generation of a model of the industrial automation system that can be representative of the industrial automation system, and the performance of other backup-related services and model-related services based at least in part collection of customer-specific industrial data by a cloud-based backup system or modeler system, in accordance with various aspects and embodiments of the disclosed subject matter.

FIG. 6 illustrates a diagram of an example system 600 that can facilitate backup of an industrial automation system and/or generation of a model of the industrial automation system that can be representative of the industrial automation system, and the performance of other backup-related services and model-related services based at least in part collection of customer-specific industrial data by a cloud-based backup system or modeler system, in accordance with various aspects and embodiments of the disclosed subject matter. The system 600 can include a backup system 602 and modeler system 604 that respectively can execute as (e.g., perform and provide) cloud-based services on a cloud platform (e.g., cloud platform 402 of FIG. 4), and can collect data from multiple industrial automation systems, such as industrial automation system$_1$ 606$_1$, industrial automation system$_2$ 606$_2$, and/or (up through) industrial automation system$_N$ 606$_N$. The industrial automation systems (e.g., 606$_1$, 606$_2$, 606$_N$) can comprise different industrial automation systems within a given facility and/or different industrial facilities at diverse geographical locations. Industrial automation systems (e.g., 606$_1$, 606$_2$, 7606$_N$) also can correspond to different business entities (e.g., different industrial enterprises or customers), wherein the backup system 602 or modeler system 604 can collect and maintain a distinct customer data store 608 for each customer or business entity.

The backup system 602 or modeler system 604 can organize manufacturing data collected from the industrial automation systems (e.g., 606$_1$, 606$_2$, 606$_N$) according to various classes. In the illustrated example, manufacturing data can be classified according to device data 610, process data 612, asset data 614, and system data 616.

Figure 7:
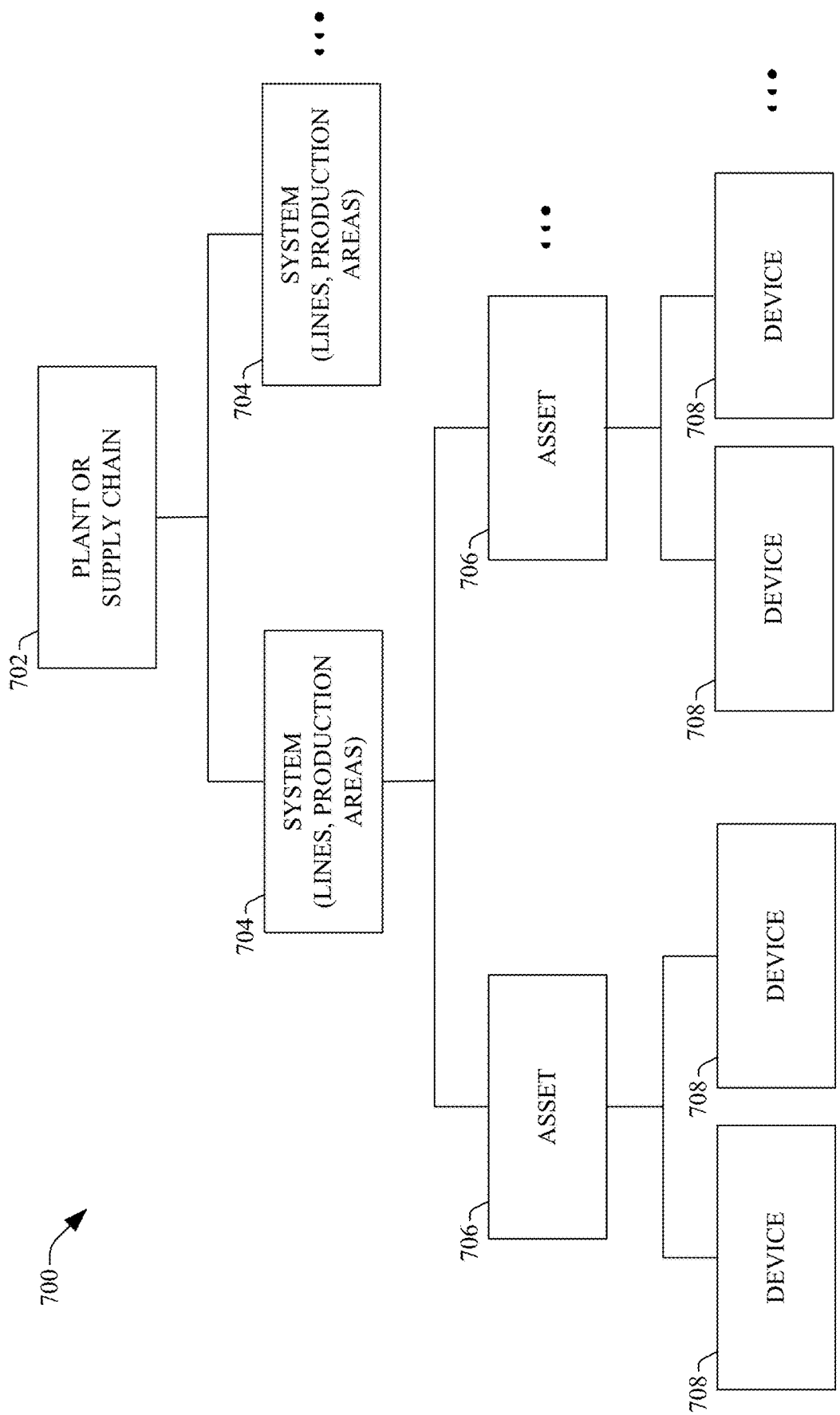
FIG. 7 illustrates a diagram of an example hierarchical relationship between these example data classes.

Referring briefly to FIG. 7, FIG. 7 illustrates a diagram of an example hierarchical relationship 700 between these example data classes. A given plant or supply chain 702 can comprise one or more industrial automation systems 704. The industrial automation systems 704 can represent the production lines or productions areas within a given plant facility or across multiple facilities of a supply chain. Each industrial automation system 704 can comprise a number of assets 706 that can represent the machines and equipment that make up the industrial automation system (e.g., the various stages of a production line). In general, each asset 706 can comprise one or more industrial devices 708, which can include, for example, the programmable controllers, motor drives, HMIs, sensors, meters, etc. comprising the asset 706. The various data classes depicted in FIGS. 6 and 7 are only intended to be exemplary, and it is to be appreciated that any organization of industrial data classes maintained by the backup system 602 or modeler system 604 is within the scope of one or more embodiments of the disclosed subject matter.

Returning again to FIG. 6 (along with FIG. 7), the backup system 602 or modeler system 604 can collect and maintain data from the various devices and assets that make up the industrial automation systems 704 and can classify the data according to the aforementioned classes for the purposes of facilitating analysis of the data, generation of models of the industrial automation systems (e.g., $606_1$, $606_2$, $606_N$), and/or performing other operations by the backup system 602 or modeler system 604. Device data 610 can comprise device-level information relating to the identity, configuration, and status of the respective devices comprising the industrial automation systems (e.g., $606_1$, $606_2$, $606_N$), including but not limited to device identifiers, device statuses, current firmware versions, health and diagnostic data, device documentation, identification and relationship of neighboring devices that interact with the device, etc.

The process data 612 can comprise information relating to one or more processes or other automation operations carried out by the devices; e.g., device-level and process-level faults and alarms, process variable values (speeds, temperatures, pressures, etc.), and the like.

The asset data 614 can comprise information generated, collected, determined, or inferred based on data that can be aggregated from various (e.g., multiple) industrial devices over time, which can yield higher asset-level views of the industrial automation systems (e.g., $606_1$, $606_2$, $606_N$). Example asset data 614 can include performance indicators (key performance indicators (KPIs)) for the respective assets, asset-level process variables, faults, alarms, etc. Since the asset data 614 can yield a relatively longer term view of asset characteristics relative to the device and process data, the backup system 602 or modeler system 604 can leverage the asset data 614 to facilitate identifying operational patterns and correlations unique to each asset, among other types of analysis, and this can facilitate backing up information relating to the industrial automation system, performing other backup-related services, generating respective modeling assets or virtualization assets that can correspond to the respective assets, and generating, updating, using, customizing, etc., of model or a virtualized industrial automation system of the industrial control system based at least in part on the respective models or virtualizations of the respective assets associated with the industrial control system.

The system data 616 can comprise collected, determined, or inferred information that can be generated based on data that can be aggregated from various (e.g., multiple) assets over time. The system data 616 can characterize system behavior within a large system of assets, yielding a system-level view of each of the industrial automation systems (e.g., $606_1$, $606_2$, $606_N$). The system data 616 also can document the particular system configurations in use and industrial operations performed at each of the industrial automation systems (e.g., $606_1$, $606_2$, $606_N$). For example, the system data 616 can document the arrangement of assets, interconnections between devices, the product being manufactured at a given facility, an industrial process performed by the assets, a category of industry of each industrial system (e.g., automotive, oil and gas, food and drug, marine, textiles, etc.), or other relevant information. Among other functions, this data can be accessed by technical support personnel during a support session so that particulars of the customer's unique system and device configurations can be obtained without reliance on the customer to possess complete knowledge of their assets.

As an example, a given industrial facility can include a packaging line (e.g., the system), which in turn can comprise a number of individual assets (e.g., a filler, a labeler, a capper, a palletizer, etc.). Each asset can comprise a number of devices (e.g., controllers, variable frequency drives, HMIs, etc.). Using an architecture similar to that depicted in, for example, FIG. 1, 2, 3, or 4, the backup system 602 or modeler system 604 can collect industrial data from the individual devices during operation and can classify the data in the customer data store 608 according to the aforementioned classifications. Note that some data may be duplicated across more than one class. For example, a process variable classified under process data 612 also can be relevant to the asset-level view of the system represented by the asset data 614. Accordingly, such process variables can be classified under both classes. Moreover, subsets of data in one classification can be derived, determined, or inferred based on data under another classification. For example, subsets of system data 616 that can characterize certain system behaviors can be derived, determined, or inferred based on a long-term analysis of data in the lower-level classifications.

In addition to maintaining the data classes (e.g., 610, 612, 614, 616), each customer data store also can maintain a customer model 618 that can contain data specific to a given industrial entity or customer. The customer model 618 can contain customer-specific information and preferences, which can be leveraged by (e.g., used by) the backup system 602 or modeler system 604 to facilitate backing up information relating to the industrial automation system, performing other backup-related services, generating or updating a model of an industrial automation system, generating a simulation model of an industrial automation system, performing simulation operations using simulation models, and/or performing other operations in connection with the industrial automation system, etc. Example information that can be maintained in the customer model 618 can comprise a client identifier, client preferences or requirements with regard to production or work orders associated with an industrial automation system, client contact information specifying which plant personnel are to be notified in response to results of a response of the industrial automation system to a user interaction with an associated model, notification preferences that can specify how plant personnel are to be notified (e.g., email, mobile phone, text message, etc.), service contracts that are active between the customer and the technical support entity, and other such information. The backup system 602 or modeler system 604 can marry (e.g., associate, link, unite, map, etc.) data collected for each customer with the corresponding customer model 618 for identification and event handling purposes.

As noted above, industrial data can be migrated (e.g., communicated) from industrial devices to the cloud platform (e.g., comprising the backup system 602 or modeler system 604) using cloud gateway components. To this end, some devices can include integrated cloud gateways that can directly interface each device to the cloud platform. Additionally or alternatively, some configurations can utilize a cloud proxy device that can collect industrial data from multiple devices associated with the industrial automation systems (e.g., $606_1$, $606_2$, $606_N$) and can send (e.g., transmit) the data to the cloud platform. Such a cloud proxy can comprise a dedicated data collection device, such as a proxy server that can share a network (e.g., communication network) with the industrial devices. Additionally or alternatively, the cloud proxy can be a peer industrial device that can collect data from other industrial devices.

Figure 8:
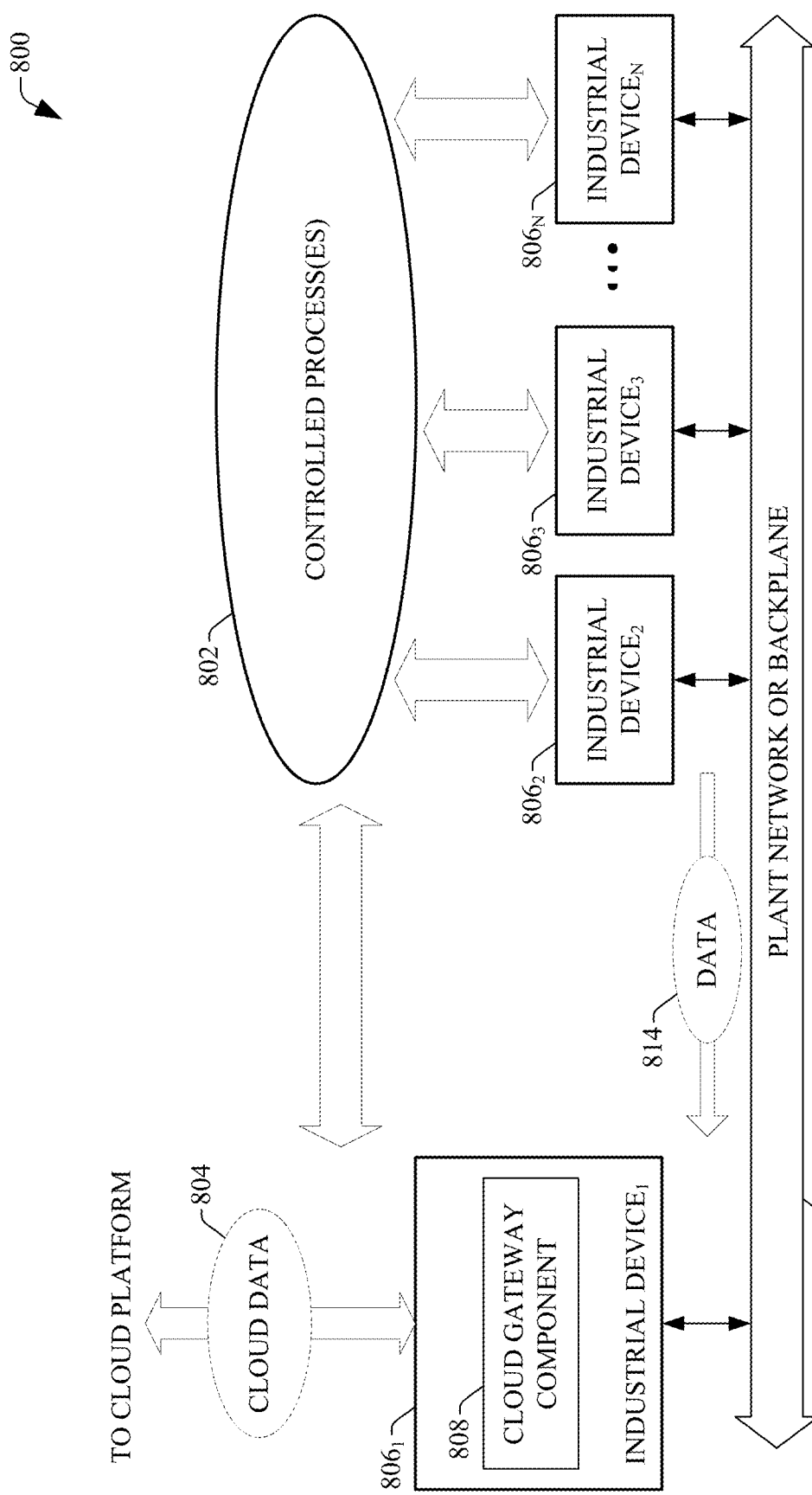
FIG. 8 depicts a block diagram of an example system that can be configured to comprise an industrial device that can act or operate as a cloud proxy for other industrial devices of an industrial automation system to facilitate migrating industrial data to the cloud platform for classification and analysis by a backup system and a modeler system, in accordance with various aspects and implementations of the disclosed subject matter.
Figure 9:
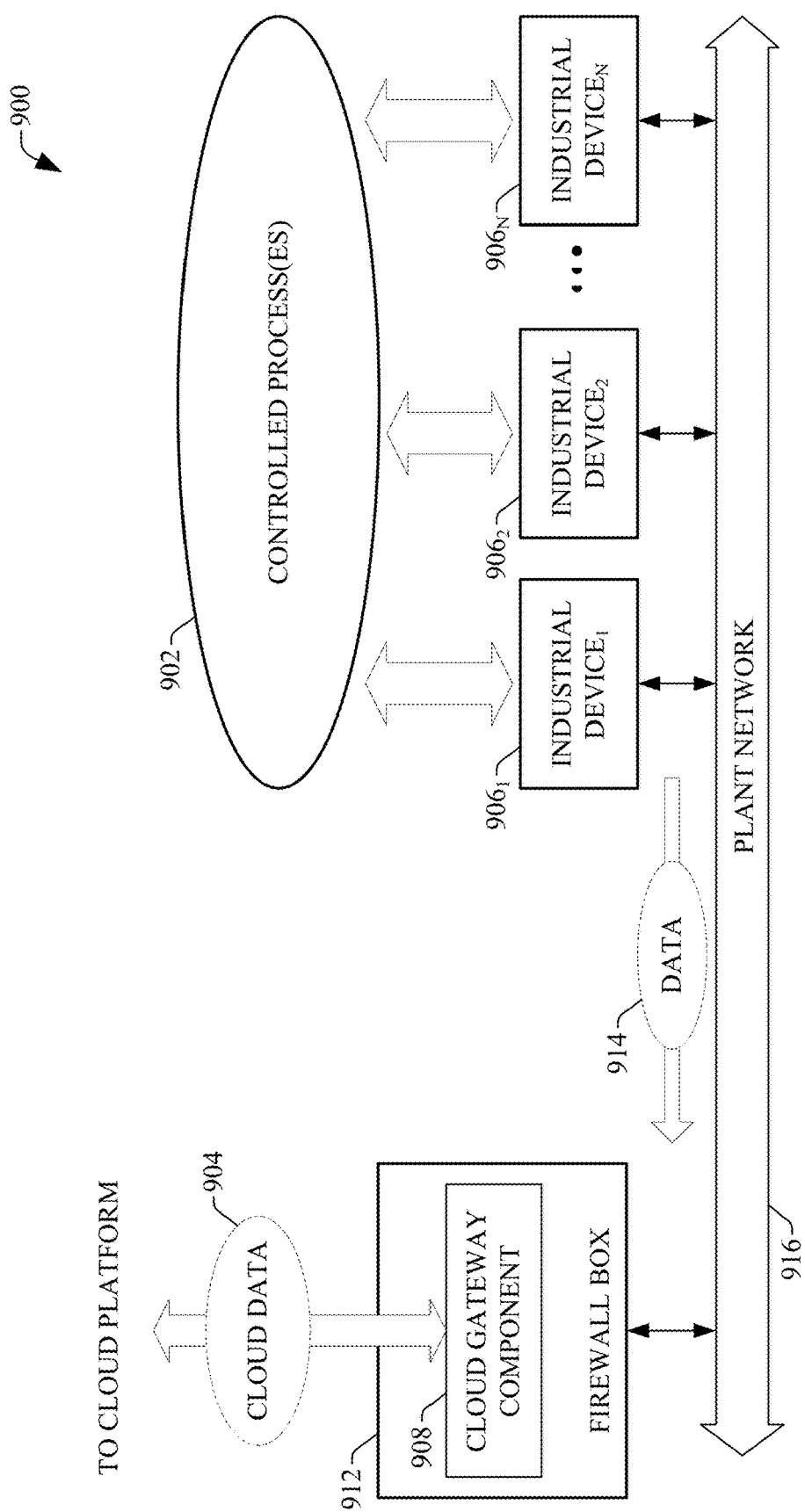
FIG. 9 illustrates a block diagram of an example system that can employ a firewall box that can serve as a cloud proxy for a set of industrial devices to facilitate migrating industrial data to the cloud platform for classification and analysis by a backup system and a modeler system, in accordance with various aspects and implementations of the disclosed subject matter.

FIGS. 8 and 9 depict block diagrams of example systems 800 and 900, respectively, illustrating respective techniques that can facilitate migrating industrial data to the cloud platform via proxy devices for classification and analysis by a backup system (e.g., comprising a backup component) and a modeler system (e.g., comprising a modeler component), in accordance with various aspects and implementations of the disclosed subject matter. FIG. 8 depicts the system 800 that can be configured to comprise an industrial device that can act or operate as a cloud proxy for other industrial devices of an industrial automation system. The industrial automation system can comprise a plurality of industrial devices, including industrial device$_1$ 806$_1$, industrial device$_2$ 806$_2$, industrial device$_3$ 806$_3$, and/or (up through) industrial device$_N$ 806$_N$, that collectively can monitor and/or control one or more controlled processes 802. The industrial devices 806$_1$, 806$_2$, 806$_3$, and/or (up through) 806$_N$ respectively can generate and/or collect process data relating to control of the controlled process(es) 802. For industrial controllers such as PLCs or other automation controllers, this can include collecting data from telemetry devices connected to an industrial controller's I/O, generating data internally based on measured process values, etc.

In the configuration depicted in FIG. 8, industrial device$_1$ 806$_1$ can act, operate, or function as a proxy for industrial devices 806$_2$, 806$_3$, and/or (up through) 806$_N$, whereby the data 814 from devices 806$_2$, 806$_3$, and/or (up through) 806$_N$ can be sent (e.g., transmitted) to the cloud via proxy industrial device$_1$ 806$_1$. Industrial devices 806$_2$, 806$_3$, and/or (up through) 806$_N$ can deliver their respective data 814 to the proxy industrial device$_1$ 806$_1$ over the plant network or backplane 812 (e.g., a Common Industrial Protocol (CIP) network or other suitable network protocol). Using such a configuration, as desired, one industrial device can be interfaced to the cloud platform (via cloud gateway component 808). In some embodiments, the cloud gateway component 808 can perform preprocessing on the gathered data prior to migrating the data to the cloud platform (e.g., time stamping, filtering, formatting, normalizing, summarizing, compressing, etc.). The collected and processed data can be pushed (e.g., transmitted) to the cloud platform as cloud data 804 via cloud gateway component 808. Once migrated to the cloud platform, the cloud-based backup system or modeler system can classify the data according to the example classifications described herein and/or can utilize the data to facilitate performing various operations relating to backing up information relating to the industrial automation system, performing other backup-related services or operations, generating or updating models of industrial automation systems, or performing other cloud-based service or operations.

While the proxy device illustrated in FIG. 8 is depicted as an industrial device that itself can perform monitoring, tracking, and/or controlling of a portion of controlled process(es) 802, other types of devices also can be configured to serve as cloud proxies for multiple industrial devices according to one or more implementations of the disclosed subject matter. For example, FIG. 9 illustrates an example system 900 that can comprise a firewall box 912 that can serve as a cloud proxy for a set of industrial devices 906$_1$, 906$_2$, and/or (up through) 906$_N$. The firewall box 912 can act as a network infrastructure device that can allow the plant network 916 to access an outside network such as the Internet, while also providing firewall protection that can prevent unauthorized access to the plant network 916 from the Internet. In addition to these firewall functions, the firewall box 912 can include a cloud gateway component 908 that can interface the firewall box 912 with one or more cloud-based services (e.g., backup-related services, model-related services, data collection services, data storage services, etc.). In a similar manner to the proxy industrial device 806$_1$ of FIG. 8, the firewall box 912 of FIG. 9 can collect industrial data 914 from an industrial automation system including industrial device$_1$ 906$_1$, industrial device$_2$ 906$_2$, and/or (up through) industrial device$_N$ 906$_N$, which can monitor and control respective portions of controlled process(es) 902. Firewall box 912 can include a cloud gateway component 908 that can apply appropriate preprocessing to the gathered industrial data 914 prior to pushing (e.g., communicating) the data to the cloud-based backup system or modeler system as cloud data 904. Firewall box 912 can allow industrial devices 906$_1$, 906$_2$, and/or (up through) 906$_N$ to interact with the cloud platform without directly exposing the industrial devices to the Internet.

In some embodiments, the cloud gateway component 808 of FIG. 8 or cloud gateway component 908 of FIG. 9 can tag the collected industrial data (e.g., 814 or 914) with contextual metadata prior to pushing the data as cloud data (e.g., 804 or 904) to the cloud platform. Such contextual metadata can include, for example, a time stamp, a location of the device at the time the data was generated, or other contextual information. In another example, some cloud-aware devices can comprise smart devices capable of determining their own context within the plant or enterprise environment. Such devices can determine their location within a hierarchical plant context or device topology. Data generated by such devices can adhere to a hierarchical plant model that can define multiple hierarchical levels of an industrial enterprise (e.g., a workcell level, a line level, an area level, a site level, an enterprise level, etc.), such that the data can be identified (e.g., by the backup system or modeler system) in terms of these hierarchical levels. This can allow a common terminology to be used across an entire industrial enterprise to identify devices and their associated data. Cloud-based applications and services that backup information relating to, or model an enterprise according to, such an organizational hierarchy can represent industrial controllers, devices, machines, or processes as data structures (e.g., type instances) within this organizational hierarchy to provide context for data generated by respective devices within the enterprise relative to the enterprise as a whole. Such a convention can replace the flat name structure that is employed by some industrial applications.

In some embodiments, the cloud gateway component 808 of FIG. 8 or cloud gateway component 908 of FIG. 9 can comprise uni-directional "data only" cloud gateways that can be configured to only move data from the premises (e.g., industrial facility) to the cloud platform. Alternatively, the cloud gateway components 808 and 908 can comprise bi-directional "data and configuration" gateways that additionally can be configured to receive configuration or instruction data from services running on the cloud platform. Some cloud gateway components can utilize store-and-forward technology that can allow the gathered industrial data (e.g., 814 or 914) to be temporarily stored locally on storage associated with the cloud gateway component (e.g., 808 or 908) in the event that communication between a cloud gateway component and the cloud platform is disrupted. In such events, the cloud gateway component (e.g., 808 or 908) can forward (e.g., communicate) the stored data to the cloud platform when the communication link is re-established.

To ensure a rich and descriptive set of data for analysis purposes, the cloud-based modeler system or virtualization system can collect device data in accordance with one or more standardized device models. To this end, a standardized device model can be developed for each industrial device. Device models can profile the device data that is available to be collected and maintained by the modeler system or virtualization system.

Figure 10:
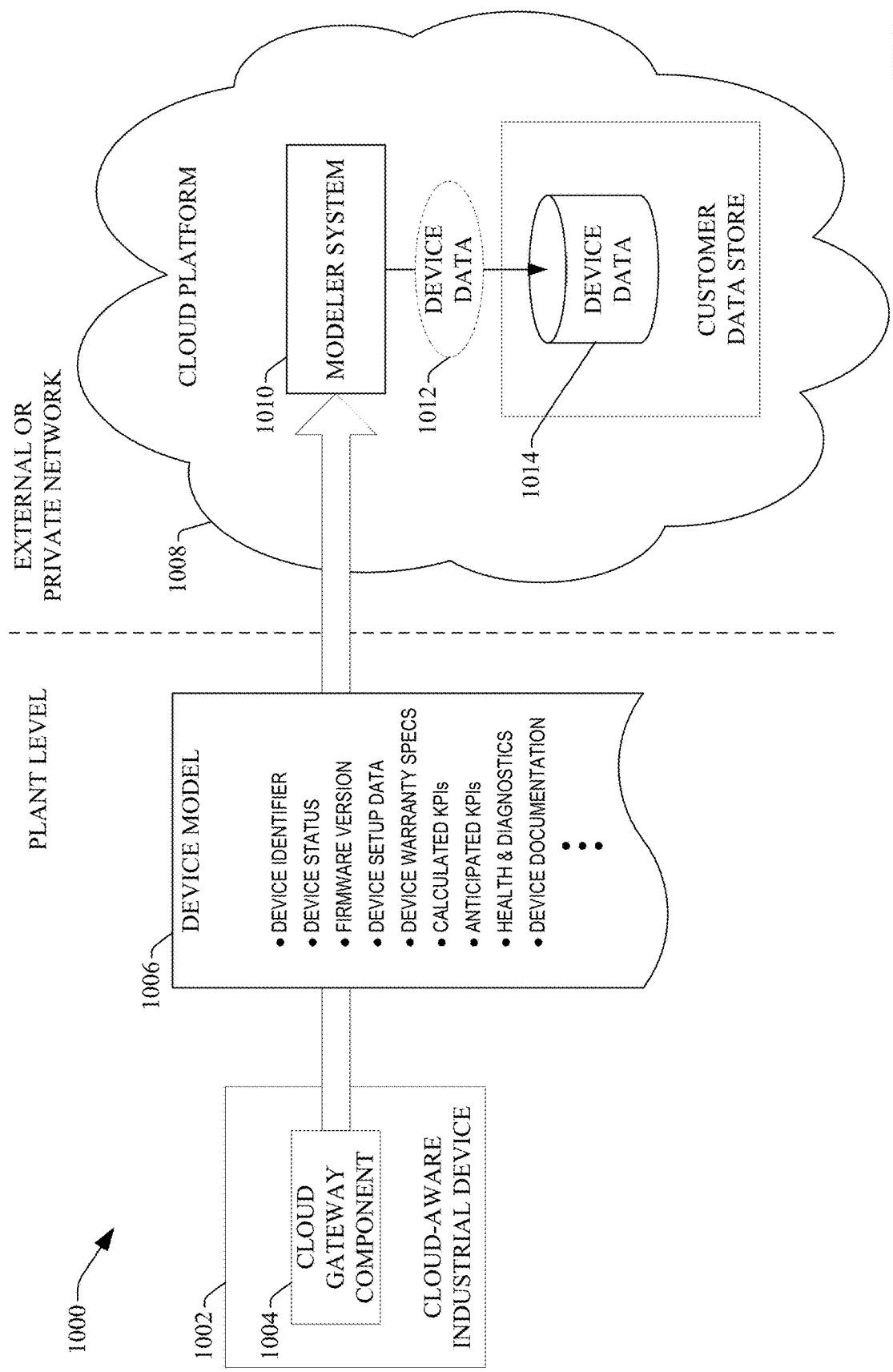
FIG. 10 illustrates a block diagram of an example device model according to various aspects and implementations of the disclosed subject matter.

FIG. 10 illustrates a block diagram of an example device model 1000 according to various aspects and implementations of the disclosed subject matter. In the illustrated example model 1000, the device model 1006 can be associated with a cloud-aware industrial device 1002 (e.g., a programmable logic controller, a variable frequency drive, an HMI, a vision camera, a barcode marking system, etc.). As a cloud-aware device, the industrial device 1002 can be configured to automatically detect and communicate with the cloud platform 1008 upon installation at a plant facility, simplifying integration with existing cloud-based data storage, analysis, and applications (e.g., as performed by the virtualization system described herein). When added to an existing industrial automation system, the industrial device 1002 can communicate with the cloud platform and can send identification and configuration information in the form of the device model 1006 to the cloud platform 1008. The device model 1006 can be received by the modeler system 1010 (or backup system (not shown in FIG. 10)), which can update the customer's device data 1014 based on the device model 1006. In this way, the modeler system 1010 (or backup system) can leverage the device model 1006 to facilitate integrating the new industrial device 1002 into the greater system as a whole. This integration can include the modeler system 1010 (or backup system) updating cloud-based applications or services to recognize the new industrial device 1002, adding the new industrial device 1002 to a dynamically updated data model of the customer's industrial enterprise or plant, modifying a model to integrate, incorporate, or include a model of the new industrial device 1002 based at least in part on the identification and configuration information (or other data), determining or predicting a response of the modified industrial automation system based at least in part on a modified model or modified simulation model that integrates the new industrial device 1002, making other devices on the plant floor aware of the new industrial device 1002, or other desired integration functions. Once deployed, some data items comprising the device model 1006 can be collected and monitored by the modeler system 1010 (or backup system) on a real-time or near real-time basis.

The device model 1006 can comprise such information as a device identifier (e.g., model and serial number) associated with the industrial device 1002, status information for the industrial device 1002, a currently installed firmware version associated with the industrial device 1002, device setup data associated with the industrial device 1002, warranty specifications associated with the industrial device 1002, calculated and/or anticipated performance indicators (e.g., KPIs) associated with the industrial device 1002 (e.g., mean time between failures), health and diagnostic information associated with the industrial device 1002, device documentation, or other such parameters.

Figure 11:
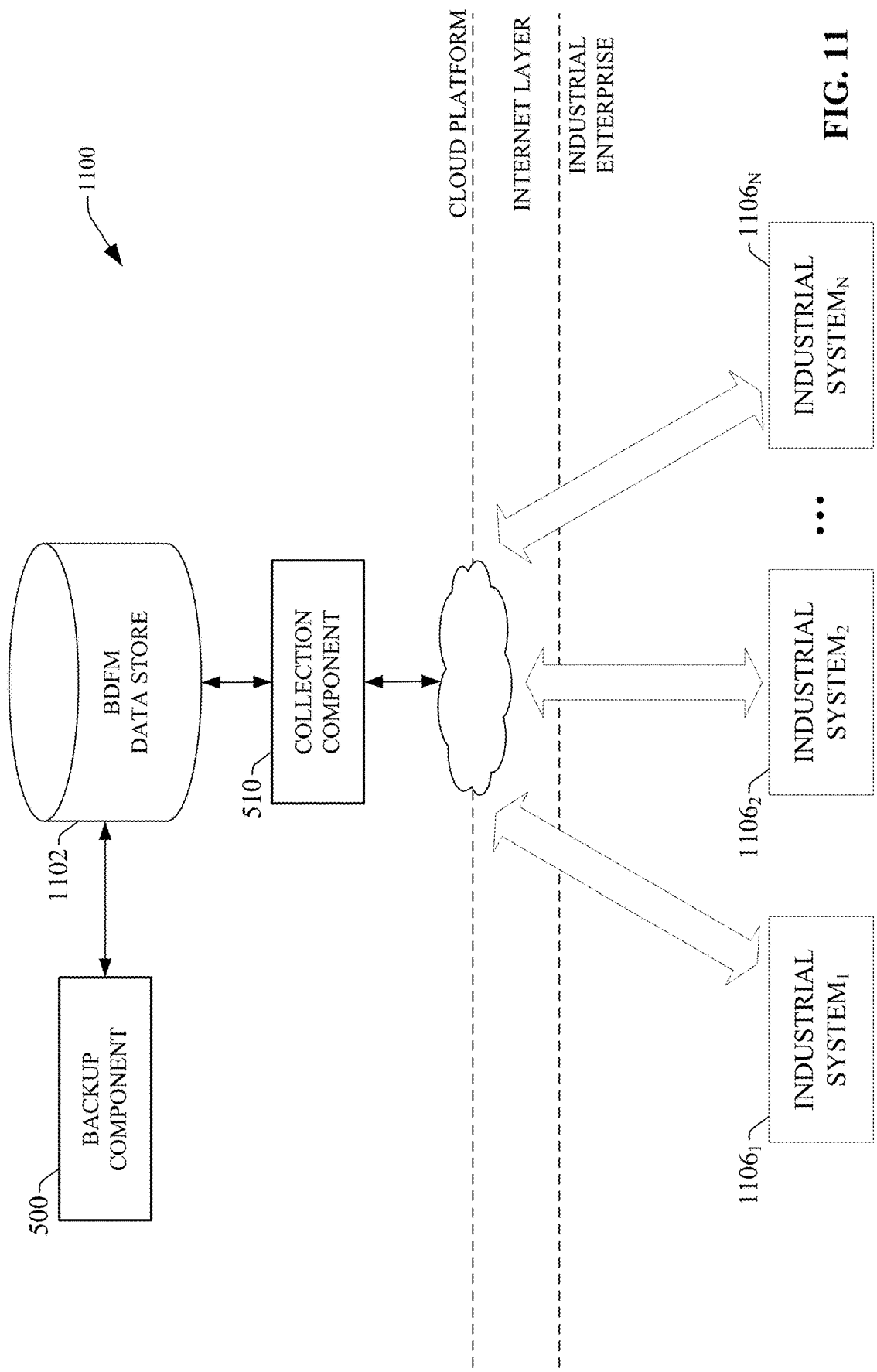
FIG. 11 presents a block diagram of an example system that can facilitate collection of data from devices and assets associated with respective industrial automation systems for storage in cloud-based data storage, in accordance with various aspects and implementations of the disclosed subject matter.

In addition to maintaining individual customer-specific data stores for each industrial enterprise, the virtualization system (e.g., cloud-based virtualization system) also can feed (e.g., transmit) sets of customer data to a global data storage (referred to herein as cloud-based data store or Big Data for Manufacturing (BDFM) data store) for collective big data analysis in the cloud platform (e.g., by the virtualization system). FIG. 11 presents a block diagram of an example system 1100 that can facilitate collection of data from devices and assets associated with respective industrial automation systems for storage in cloud-based data storage, in accordance with various aspects and implementations of the disclosed subject matter. As illustrated in FIG. 11, the collection component 510 of the backup system (e.g., as facilitated by the interface component 512) can collect data from devices and assets comprising respective different industrial automation systems, such as industrial automation system$_1$ 1106$_1$, industrial automation system$_2$ 1106$_2$, and/or (up through) industrial automation system$_N$ 1106$_N$, for storage in a cloud-based BDFM data store 1102. In some embodiments, data maintained in the BDFM data store 1102 can be collected anonymously with the consent of the respective customers. For example, customers can enter into a service agreement with a technical support entity whereby the customer can agree to have their device and asset data collected by the backup system or modeler system in exchange for backup-related, model-related, or other services or a credit towards backup-related, model-related, or other services. The data maintained in the BDFM data store 1102 can include all or portions of the classified customer-specific data described in connection with FIG. 6, as well as additional data (e.g., derived, determined, or inferred data). The backup component 500 (e.g., aggregator component 504, backup management component 514, etc.) or another component of the backup system or modeler system can organize the collected data stored in the BDFM data store 1102 according to device type, system type, application type, applicable industry, or other relevant categories. The backup component 500 can analyze data stored in the resulting multi-industry, multi-customer data store (e.g., BDFM data store 1102) to facilitate learning, determining, or identifying industry-specific, device-specific, and/or application-specific trends, patterns, thresholds (e.g., device-related thresholds, network-related thresholds, etc.), industrial-automation-system interrelationships between devices or assets, etc., associated with the industrial automation systems associated with the cloud platform. In general, the backup component 500 can perform a data analysis (e.g., big data analysis) on data (e.g., the multi-industrial enterprise data) maintained (e.g., stored in) the BDFM data store 1102 to facilitate backing up (e.g., storing on the cloud platform), learning, determining, identifying, characterizing, virtualizing, simulating, and/or emulating operational industrial-automation-system interrelationships, thresholds, trends, or patterns associated with industrial automation systems as a function of industry type, application type, equipment in use, asset configurations, device configuration settings, or other types of variables.

For example, it can be known that a given industrial asset (e.g., a device, a configuration of device, a machine, etc.) can be used across different industries for different types of industrial applications. Accordingly, the backup component 500 can identify a subset of the global data stored in BDFM data store 1102 relating to the asset or asset type, and perform analysis on this subset of data to determine how the asset or asset type performs over time and under various types of operating conditions for each of multiple different industries or types of industrial applications. The backup component 500 also can determine the operational behavior of the asset or asset type over time and under various types of operating conditions for each of different sets of operating constraints or parameters (e.g. different ranges of operating temperatures or pressures, different recipe ingredients or ingredient types, etc.). The backup component 500 can leverage (e.g., use) a large amount of historical data relating to the asset or asset type that has been gathered (e.g., collected and/or aggregated) from many different industrial automation systems to facilitate learning or determining common operating characteristics of many diverse configurations of industrial assets or asset types at a relatively high degree of granularity and under many different operating contexts. The backup component 500 can use the learned or determined operating characteristics relating to the industrial assets or asset types to facilitate restoring industrial-automation-system-related data (e.g., lost model data or other backup data), configuring or programming all or a portion of an industrial automation system using backup information (e.g., model data or other backup data), standardizing industrial plant configurations and operations, translating model data or other backup data in accordance with a desired format or platform), performing other backup-related services, generating, updating, and/or using modeled versions or virtualized versions of the industrial assets or asset types when employed in an industrial automation system to facilitate generating, updating, and/or using a model of an industrial automation component or a virtualized industrial automation system that can be based at least in part on the modeled or virtualized versions of the industrial assets or asset types.

Figure 12:
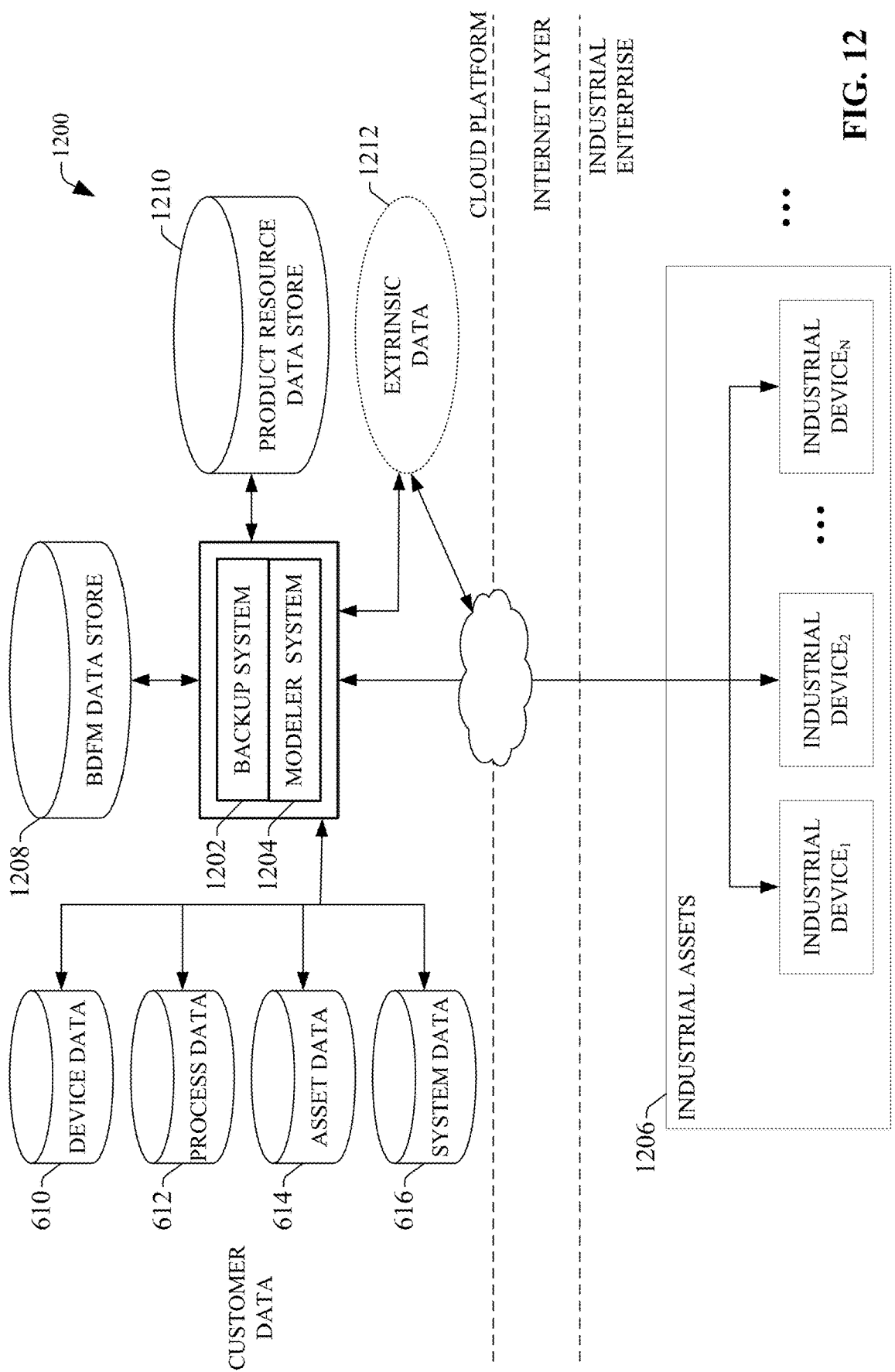
FIG. 12 illustrates a block diagram of a cloud-based system that can employ a backup system and modeler system to facilitate performing or providing backup-related services and model-related services associated with industrial automation systems, in accordance with various aspects and embodiments of the disclosed subject matter.

FIG. 12 illustrates a block diagram of a cloud-based system 1200 that can employ a backup system and modeler system to facilitate performing or providing backup-related services and model-related services associated with industrial automation systems, in accordance with various aspects and embodiments of the disclosed subject matter. As disclosed herein, the backup system 1202 and modeler system 1204 can collect, maintain, and monitor customer-specific data (e.g. device data 610, process data 612, asset data 614, and system data 616) relating to one or more industrial assets 1206 of an industrial enterprise. In addition, the backup system 1202 and modeler system 1204 can collect and organize industrial data anonymously (with customer consent) from multiple industrial enterprises, and can store such industrial data in a BDFM data store 1208 for collective analysis by the backup system 1202 and/or modeler system 1204, for example, as described herein.

The backup system 1202 and modeler system 1204 also can collect product resource information and maintain (e.g., store) the product resource information in the cloud-based product resource data store 1210. In general, the product resource data store 1210 can maintain up-to-date information relating to specific industrial devices or other vendor products in connection with industrial automation systems. Product data stored in the product resource data store 1210 can be administered by the backup system 1202 and/or modeler system 1204 and/or one or more product vendors or OEMs. Exemplary device-specific data maintained by the product resource data store 1210 can include product serial numbers, most recent firmware revisions, preferred device configuration settings and/or software for a given type of industrial application, or other such vendor-provided information.

The system depicted in FIG. 12 can provide backup-related services, model-related services, and/or other cloud-based services to subscribing customers (e.g., owners of industrial assets 1206). For example, customers can enter an agreement with a product vendor or technical support entity to allow their system data to be gathered anonymously and fed into (e.g., communicated to and stored in) the BDFM data store 1208, and this thereby can expand the store of global data available for collective analysis by the backup system 1202 and/or modeler system 1204. In exchange, the vendor or technical support entity can agree to provide backup-related services, model-related services, and/or other services to the customer (e.g., provide real-time or near real-time system monitoring; real-time or near real-time backing up of an industrial automation system; real-time or near real-time generation, updating, and/or use of a model or a virtualized industrial automation system associated with an industrial automation system, etc.). Alternatively, the customer can subscribe to one or more available backup-related services, model-related services or other cloud-based services that can be provided by the backup system 1202 and/or modeler system 1204, and optionally can allow their system data to be maintained in the BDFM data store 1208. In some embodiments, a customer can be given an option to subscribe to backup-related services, model-related services, or other cloud-based services without permitting their data to be stored in the BDFM data store 1208 for collective analysis with data from other systems (e.g., industrial automation systems). In such cases, the customer's data will only be maintained as customer data (e.g., in customer data store 608) for the purposes of real-time or near real-time generation, updating, and/or use of backup information, a model, or a virtualized industrial automation system associated with an industrial automation system relating to that particular customer, and the collected customer data will be analyzed in connection with data stored in the BDFM data store 1208 and the product resource data store 1210 without that customer data being migrated for storage in the BDFM data store 1208 for long-term storage and analysis. In another exemplary agreement, customers can be offered a discount on backup-related services or model-related services in exchange for allowing their system data to be anonymously migrated to the BDFM data store 1208 for collective analysis by the backup system 1202 or modeler system 1204.

In accordance with various aspects, the customer-specific data can include device and/or asset level faults and alarms, process variable values (e.g., temperatures, pressures, product counts, cycle times, etc.), calculated or anticipated performance indicators (e.g., KPIs) for the customer's various assets, indicators of system behavior over time, and other such information. The customer-specific data also can include documentation of firmware versions, configuration settings, and software in use on respective devices of the customer's industrial assets. Moreover, the backup system 1202 or modeler system 1204 can take into consideration customer information encoded in customer model 618, which can have a bearing on inferences made by the backup system 1202 or modeler system 1204 based at least in part on the analysis (e.g., big data analysis) stored in the BDFM data store 1208. For example, customer model 618 may indicate a type of industry that is the focus of the customer's business (e.g., automotive, food and drug, oil and gas, fibers and textiles, power generation, marine, etc.). Knowledge of the customer's industry can facilitate enabling the backup system 1202 or modeler system 1204 to correlate the customer-specific data with data relating to similar systems and applications in the same industry, as documented by the data stored in the BDFM data store 1208.

Taken together, customer-specific data and a customer model (e.g., 618) can facilitate accurately modeling the customer's industrial enterprise at a highly granular level, from high-level system behavior over time down to the device and software level. The analyzing (e.g., by the backup system 1202 or modeler system 1204) of this customer-specific data in view of global industry-specific and application-specific trends learned via analysis of data stored in the BDFM data store 1208, as well as vendor-provided device information maintained in the product resource data store 1210, can facilitate real-time or near real-time performance of other backup-related services (e.g., restoring industrial-automation-system-related data (e.g., lost model data or other backup data) for an industrial automation system, configuring or programming all or a portion of an industrial automation system using backup information (e.g., model data or other backup data), standardizing industrial plant configurations and operations, translating model data or other backup data in accordance with a desired format or platform), real-time or near real-time generation, updating, and/or use of a model or a virtualized industrial automation system associated with an industrial automation system to facilitate real-time or near real-time remote interaction with (e.g., monitoring, tracking, controlling, etc., of) the industrial automation system using the model or the virtualized industrial automation system (e.g., based at least in part on user interactions with the virtualized industrial automation system by a user via a communication device).

In some implementations, the system 1200 (e.g., via the collection component, backup system 1202, or modeler system 1204) also can receive, collect, or capture extrinsic data 1212 from one or more sources (e.g., external data sources). The backup system 1202 or modeler system 1204 can use or leverage the extrinsic data 1212 received, collected, or captured from sources external to a customer's industrial enterprise, wherein the extrinsic data 1212 can have relevance to operation of the customer's industrial automation system(s). Example extrinsic data 1212 can include, for example, energy cost data, material cost and availability data, transportation schedule information from companies that provide product transportation services for the customer, market indicator data, web site traffic statistics, information relating to known information security breaches or threats, or other information relevant to the operation of the customer's industrial automation system(s). The backup system 1202 or modeler system 1204 can retrieve extrinsic data 1212 from substantially any data source, such as, e.g., servers or other data storage devices linked to the Internet, cloud-based storage that maintains extrinsic data of interest, or other sources. The backup system 1202 or modeler system 1204 can analyze the extrinsic data 1212 and/or other data (e.g., user-related data associated with users (e.g., operators, managers, technicians, other workers) associated with the industrial automation system(s), device data 610, process data 612, asset data 614, system data 616, etc.) to facilitate performing backup-related, model-related, or other services in connection with the industrial automation system(s).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 13:
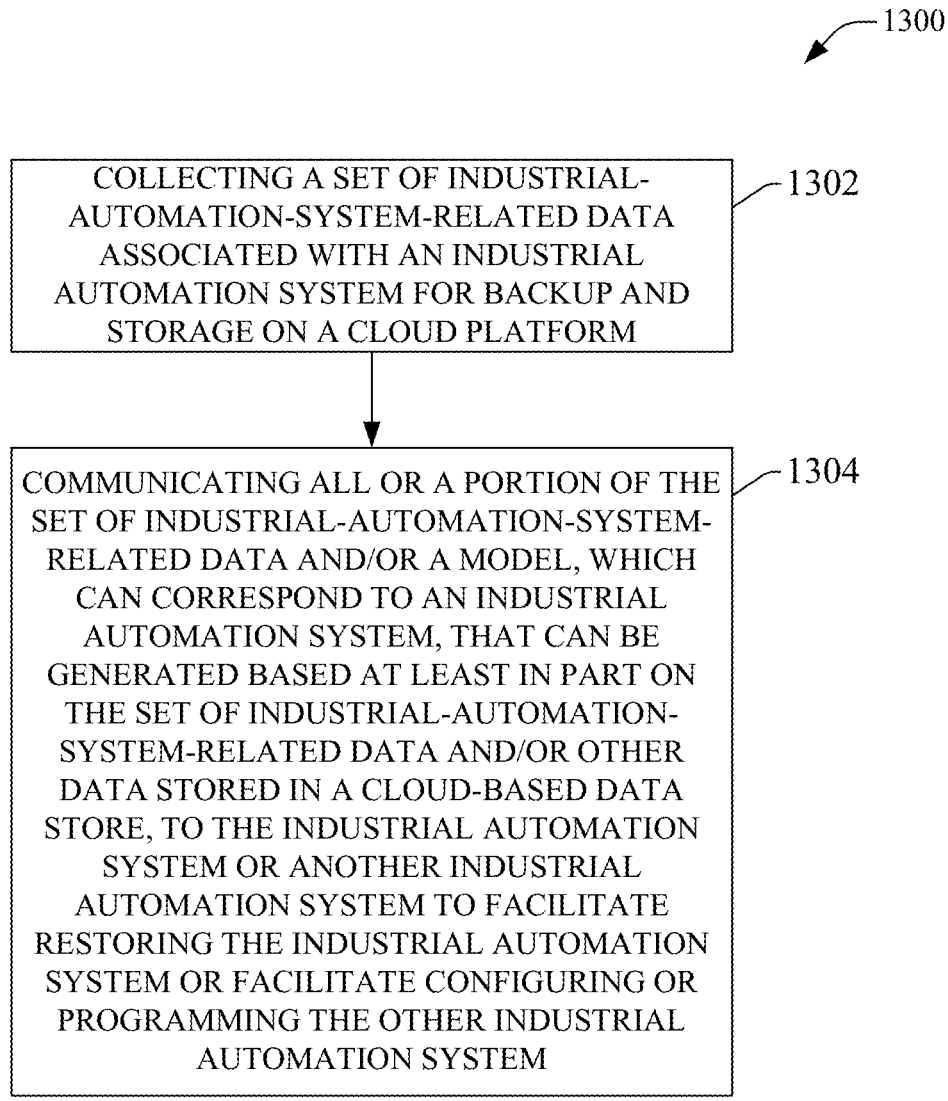
FIG. 13 illustrates a flow diagram of an example method that can facilitate backing up, on a cloud platform, information associated with an industrial automation system that is associated with an industrial enterprise to facilitate restoring all or a portion of the information to the industrial automation system of all or a portion of such information is lost by the industrial automation system and/or configuring or programming another industrial automation system, in accordance with various implementations and embodiments of the disclosed subject matter.
Figure 14:
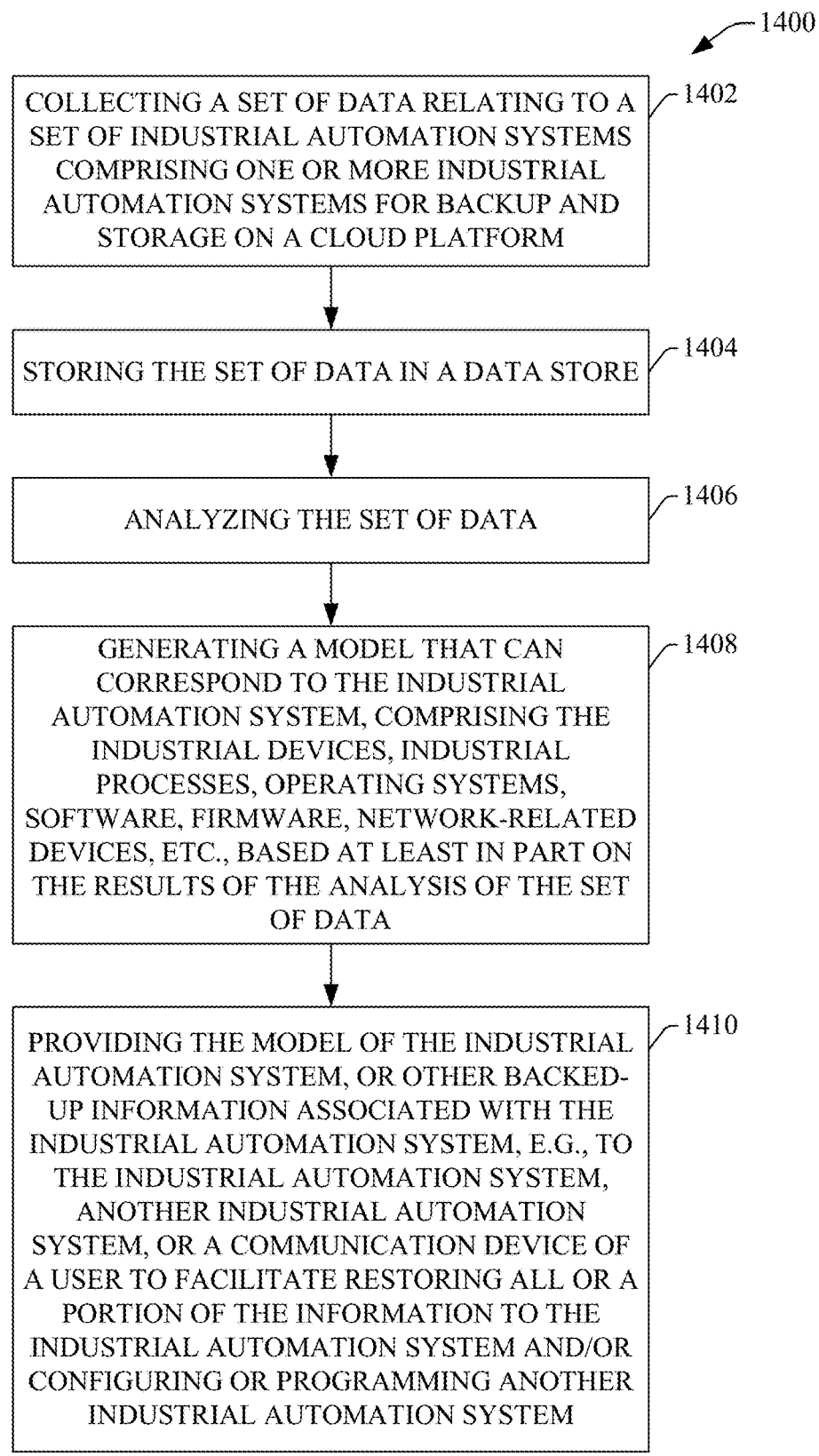
FIG. 14 depicts a flow diagram of an example method that can facilitate backing up, on a cloud platform, information associated with an industrial automation system that is associated with an industrial enterprise to facilitate generating a model of the industrial automation system for use to facilitate restoring all or a portion of the information to the industrial automation system if all or a portion of such information is lost by the industrial automation system and/or configuring or programming another industrial automation system, in accordance with various implementations and embodiments of the disclosed subject matter.
Figure 15:
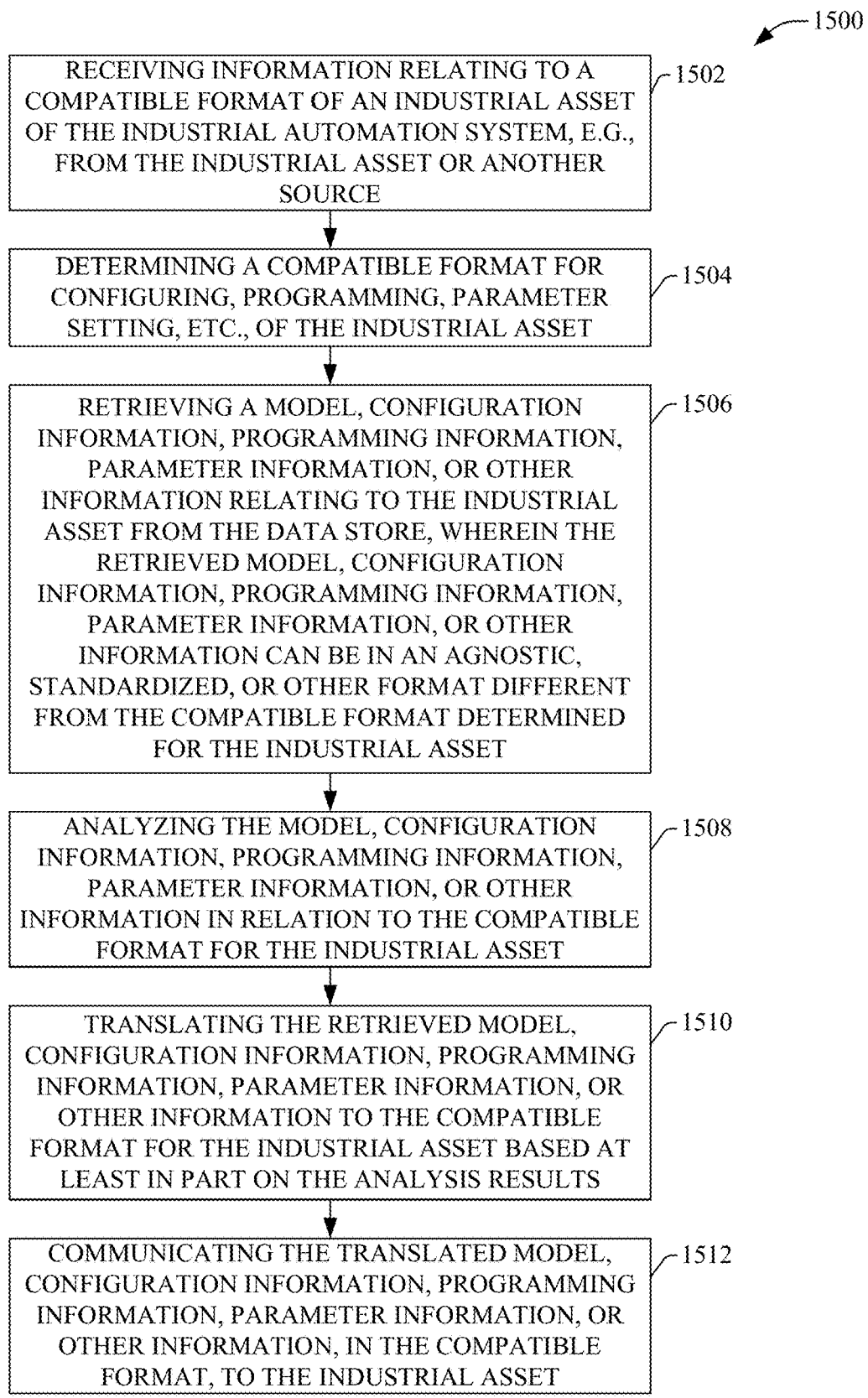
FIG. 15 illustrates a flow diagram of an example method that can translate information relating to an industrial asset to a format that is compatible with the industrial asset, in accordance with various implementations and embodiments of the disclosed subject matter.

FIGS. 13-15 illustrate various methods in accordance with one or more embodiments of the subject application. While, for purposes of simplicity of explanation, the one or more methods shown herein are shown and described as a series of acts, it is to be understood and appreciated that the disclosed subject matter is not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Furthermore, interaction diagram(s) may represent methods, in accordance with the subject disclosure when disparate entities enact disparate portions of the methods. Further yet, two or more of the disclosed example methods can be implemented in combination with each other, to accomplish one or more features or advantages described herein.

FIG. 13 illustrates a flow diagram of an example method 1300 that can facilitate backing up, on a cloud platform, information associated with an industrial automation system that is associated with an industrial enterprise to facilitate restoring all or a portion of the information to the industrial automation system of all or a portion of such information is lost by the industrial automation system and/or configuring or programming another industrial automation system, in accordance with various implementations and embodiments of the disclosed subject matter. The method 1300 can be implemented by a backup system that can comprise a backup component that can comprise a collection component, a data store, a backup management component, and/or a modeler component. All or a desired portion of the backup component can reside on a cloud platform.

At 1302, a set of industrial-automation-system-related data associated with an industrial automation system can be collected for backup and storage on a cloud platform. The collection component (e.g., cloud-based collection component) can obtain, collect, or otherwise receive industrial-automation-system-related data and can store such data in a cloud-based data store, for example, to use such data as backup (e.g., hot plant backup) to restore configuration information, programming information, or other information associated with the industrial automation system to the industrial automation system, or portion thereof, and/or to configure or program another industrial automation system using such data. The collection component also can receive other data, including other industrial-automation-system-related data from another (e.g., a related) industrial automation system or one or more extrinsic data sources.

The set of industrial-automation-system-related data can comprise, for example, device-related data (e.g., industrial device-related data, network device-related data), asset-related data, process-related data (e.g., industrial-automation-process-related data), data relating to users associated with the industrial automation system (e.g., role information, user preferences, etc.), and/or other industrial-automation-system-related data associated with an industrial enterprise. The industrial-automation-system-related data can be migrated (e.g., communicated) to the cloud platform using one or more cloud gateways (e.g., communication gateway components) that can serve as uni-directional or bi-directional communication interfaces between industrial devices or assets of the industrial automation system and the cloud platform. The device-related data, asset-related data, process-related data, and/or other industrial-automation-system-related data can be stored in the cloud-based data store in association with identification information, such as, for example, a customer identifier and other customer-specific information.

At 1304, all or a portion of the set of industrial-automation-system-related data and/or a model, which can correspond to an industrial automation system, that can be generated based at least in part on the set of industrial-automation-system-related data and/or other data stored in a cloud-based data store, can be communicated to the industrial automation system or another industrial automation system to facilitate restoring (e.g., re-configuring, re-programming) the industrial automation system or facilitate configuring or programming the other industrial automation system. The backup management component can access the cloud-based data store and can receive (e.g., collect, obtain, etc.) the set of industrial-automation-system-related data from the cloud-based data store. In some implementations, the modeler component also can access such data, analyze the set of industrial-automation-system-related data to generate analysis results, and generate, manage, modify, and/or update a model of the industrial automation system based at least in part on the results of the analysis of the set of industrial-automation-system-related data, as more fully disclosed herein. The backup component can communicate all or a portion of the set of industrial-automation-system-related data and/or the model (e.g., model data of the model) to the industrial automation system or the other industrial automation system to facilitate restoring (e.g., re-configuring, re-programming) the industrial automation system or facilitate configuring or programming the other industrial automation system.

FIG. 14 depicts a flow diagram of a example method 1400 that can facilitate backing up, on a cloud platform, information associated with an industrial automation system that is associated with an industrial enterprise to facilitate generating a model of the industrial automation system for use to facilitate restoring all or a portion of the information to the industrial automation system if all or a portion of such information is lost by the industrial automation system and/or configuring or programming another industrial automation system, in accordance with various implementations and embodiments of the disclosed subject matter. The method 1400 can be implemented by a backup system that can comprise a backup component that can comprise a collection component, a data store, a backup management component, and/or a modeler component. All or a desired portion of the backup component can reside on a cloud platform.

At 1402, a set of data (e.g., industrial-automation-system-related data) relating to a set of industrial automation systems comprising one or more industrial automation systems can be collected for backup and storage on a cloud platform. The collection component can collect the set of data relating to the set of industrial automation systems. The set of data can comprise data relating to industrial devices, industrial processes, other industrial assets, and/or network-related devices, etc., associated with the one or more industrial automation systems of the set of industrial automation systems. The set of industrial automation systems can be associated with one or more industrial enterprises.

Respective subsets of the data can be obtained from respective industrial devices, industrial processes, other industrial assets, and/or network-related devices via one or more cloud gateway devices (e.g., respective cloud gateways integrated with the respective devices, processes, assets, etc.). For instance, the backup management component and/or model management component can discover the respective industrial devices, industrial processes, other industrial assets, and/or network-related devices in the industrial automation system, and the respective industrial devices, industrial processes, other industrial assets, and/or network-related devices can provide their respective subsets of data via the one or more cloud gateway devices, in response to being polled (e.g., queried) by the backup management component and/or model management component.

At 1404, the set of data can be stored in a data store. The backup component and/or collection component can facilitate storing the set of data in the data store, wherein the data store can be a cloud-based data store located on the cloud platform.

At 1406, the set of data can be analyzed. The backup component or modeler component of or associated with the backup component can access the cloud-based data store and can retrieve, obtain, read the set of data from the cloud-based data store. The modeler component can analyze the set of data (e.g., perform big data analysis on the set of data) to facilitate generating, managing, and/or updating a model that can correspond to, backup, and interface or interact with, the industrial automation system. The modeler component can analyze the set of data to facilitate identifying or determining industrial devices, industrial processes, operating systems, software (e.g., software type, software version, software functions, software manufacturer, etc.), firmware (e.g., firmware type, firmware version, firmware functions, firmware manufacturer, etc.), network-related devices, etc., associated with the industrial automation system; identifying or determining configuration of the industrial devices, industrial processes, operating systems, software, firmware, and network-related devices, including the functional relationships or connections between respective industrial devices, industrial processes, operating systems, software, firmware, and network-related devices; respective properties or characteristics associated with the respective industrial devices, industrial processes, operating systems, software, firmware, and network-related devices; etc.

At 1408, a model that can correspond to (e.g., be a replication of) the industrial automation system, comprising the industrial devices, industrial processes, operating systems, software, firmware, network-related devices, etc., can be generated based at least in part on the results of the analysis of the set of data. The modeler component can generate the model associated with the industrial automation system, including generating respectively modeled industrial devices, modeled industrial processes, modeled industrial assets, modeled network-related devices (e.g., modeled communication devices, computers, routers, etc.), modeled software and/or firmware configurations associated with the industrial devices and/or other components of the industrial automation system, modeled functional and communicative relationships between industrial devices, assets, or other components (e.g., modeled communication connections or conditions between industrial devices, types of connections between industrial devices, modeled communication connections between industrial devices and network-related devices, etc.), modeled mechanical or process properties or characteristics associated with industrial devices (e.g., modeled mechanical latency, modeled process cycle times, modeled operating schedules, etc., associated with industrial devices), modeled properties or characteristics associated with the network-related devices (e.g., modeled communication conditions, modeled total bandwidth, modeled available bandwidth, modeled wireless communications, modeled wireline communications, etc., associated with the network-related devices), and/or other aspects or features of the industrial automation system.

At 1410, the model (e.g., model data of the model) of the industrial automation system, or other backed-up information associated with the industrial automation system, can be provided (e.g., communicated, presented), for example, to the industrial automation system, another industrial automation system, or a communication device of a user to facilitate restoring all or a portion of the information (e.g., configuration information, programming information, parameter setting information, other information) to the industrial automation system, for example, if all or a portion of such information is lost by the industrial automation system and/or configuring or programming another industrial automation system. The backup component can provide the model, or other backed-up information associated with the industrial automation system, to the industrial automation system, the other industrial automation system, or the communication device of the user via a communication network (e.g., a communication network comprising an IP-based network (e.g., Internet, intranet), a mobile core network, and/or a local area network (LAN)). The industrial automation system, or portion (e.g., industrial device or other asset) thereof, to restore information (e.g., configuration information, programming information, parameter setting information, other information) to the industrial automation system, or portion thereof, and/or the other industrial automation system can be configured, programmed, set, etc., based at least in part on the model or backed-up information, wherein all or a portion of the other industrial automation system can be the same as or similar to the industrial automation system.

FIG. 15 illustrates a flow diagram of an example method 1500 that can translate information relating to an industrial asset to a format that is compatible with the industrial asset, in accordance with various implementations and embodiments of the disclosed subject matter. The method 1500 can be implemented by a backup system that can comprise a backup component, wherein the backup component can comprise or be associated with a collection component, a data store, a backup management component, and/or a modeler component, etc. All or a desired portion of the backup system can reside on a cloud platform.

At 1502, information relating to a compatible format for configuration, programming, parameter setting, etc., of an industrial asset of the industrial automation system can be received, for example, from the industrial asset or another source. The backup management component can receive information relating to a compatible format for configuration of the industrial asset from the industrial asset (e.g., via an associated cloud gateway device) or another source (e.g., extrinsic source, such as the supplier or manufacturer of the industrial asset). The information can comprise information indicating what format(s) (e.g., computer language or code format is supported, a manufacturer, type, or model of the industrial asset, a platform(s) (e.g., operational platform(s)) that is supported by the industrial asset, and/or other format-related information.

At 1504, a compatible format for configuring, programming, parameter setting, etc., of the industrial asset can be determined. The backup management component can analyze the received information relating to the compatible format for configuration of the industrial asset. Based at least in part on the analysis results, the model management component can determine or identify a compatible format for configuring, programming, and/or setting parameters for, etc., of the industrial asset.

At 1506, a model (e.g., model of the industrial asset), configuration information, programming information, parameter information, or other information relating to the industrial asset can be retrieved from the data store (e.g., cloud-based data store), wherein the retrieved model, configuration information, programming information, parameter information, or other information can be in an agnostic, standardized, or other format that can be different from the compatible format determined for the industrial asset. The backup management component can retrieve the model, configuration information, programming information, parameter information, or other information, in the agnostic, standardized, or other different format, from the data store.

At 1508, the model, configuration information, programming information, parameter information, or other information in the agnostic, standardized, or different format can be analyzed in relation to the compatible format for the industrial asset. The backup management component can analyze the retrieved model, configuration information, programming information, parameter information, or other information in relation to the compatible format for the industrial asset to facilitate translating the retrieved model, configuration information, programming information, parameter information, or other information to the compatible format.

At 1510, the retrieved model, configuration information, programming information, parameter information, or other information can be translated from the agnostic, standardized, or other format to the compatible format for the industrial asset based at least in part on the analysis results. The backup management component can translate the retrieved model, configuration information, programming information, parameter information, or other information from the agnostic or different format to the compatible format for the industrial asset based at least in part on the analysis results.

At 1512, the translated model, configuration information, programming information, parameter information, or other information, in the compatible format, can be communicated to the industrial asset to facilitate configuration, programming, setting (e.g., of the parameters), etc., of the industrial asset. The backup management component can communicate the translated (e.g., converted) model, configuration information, programming information, parameter information, or other information, in the compatible format, to the industrial asset in the industrial automation system. The industrial asset (e.g., via the associated cloud gateway device) can receive translated model, configuration information, programming information, parameter information, or other information, in the compatible format. The industrial asset can be configured, programmed, set, etc. (e.g., can configure, program, set itself) using the translated model, configuration information, programming information, parameter information, or other information, in the compatible format, to facilitate desired operation of the industrial asset in the industrial automation system. In other implementations, the translated model, configuration information, programming information, parameter information, or other information, in the compatible format, can be communicated to another industrial asset or a communication device, wherein the other industrial asset or the communication device can configure, program, set, etc., the industrial asset using the translated model, configuration information, programming information, parameter information, or other information.

Embodiments, systems, and components described herein, as well as industrial automation or control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors— electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
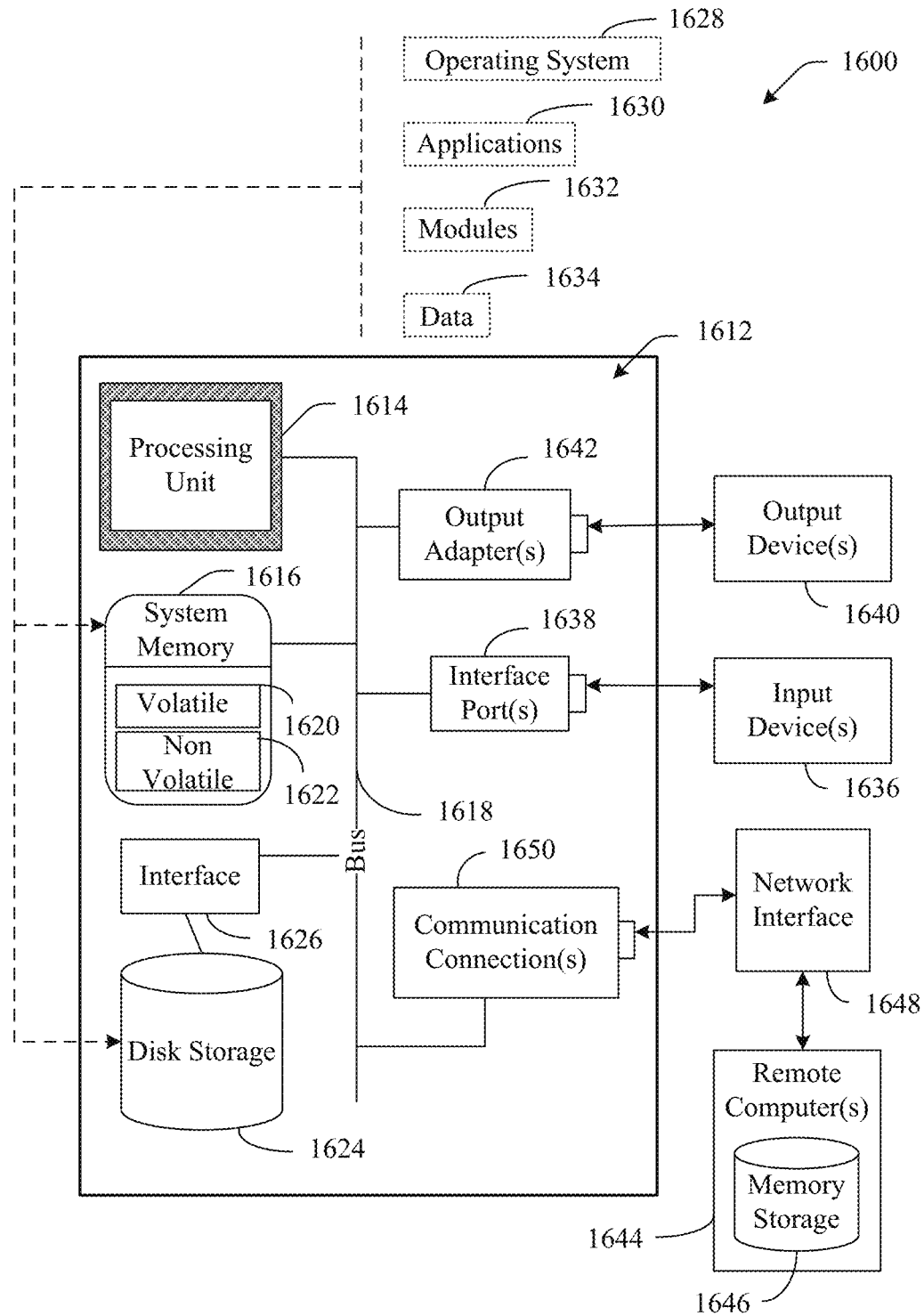
FIG. 16 is an example computing and/or operating environment.
Figure 17:
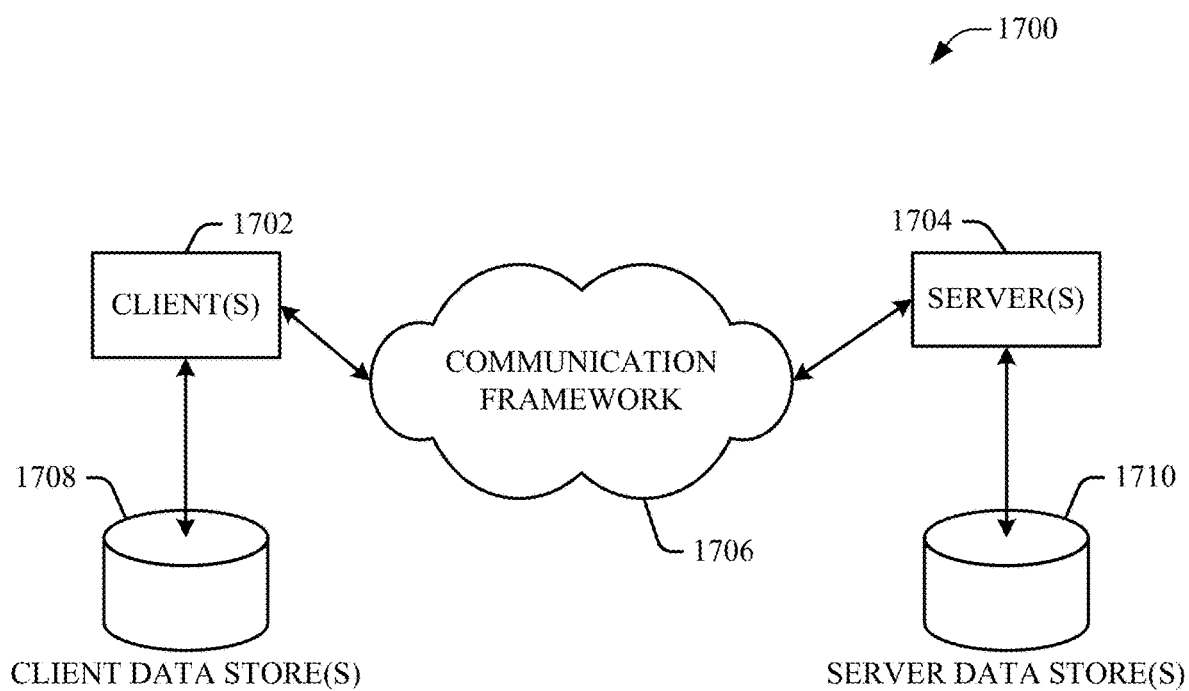
FIG. 17 is an example computing and/or networking environment.

In order to provide a context for the various aspects of the disclosed subject matter, FIGS. 16 and 17 as well as the following discussion are intended to provide a brief, general description of a suitable environment in which the various aspects of the disclosed subject matter can be implemented.

With reference to FIG. 16, an example environment 1600 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1600. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing and/or networking environment 1700 with which the disclosed subject matter can interact. The computing and/or networking environment 1700 can include one or more clients 1702. The client(s) 1702 can be hardware and/or software (e.g., threads, processes, computing devices). The computing and/or networking environment 1700 also can include one or more servers 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The computing and/or networking environment 1700 can include a communication framework 1706 that can be employed to facilitate communications between the client(s) 1702 and the server(s) 1704. The client(s) 1702 are operably connected to one or more client data stores 1708 that can be employed to store information local to the client(s) 1702. Similarly, the server(s) 1704 are operably connected to one or more server data stores 1710 that can be employed to store information local to the servers 1704.

What has been described above includes examples of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

It is to be appreciated and understood that components (e.g., modeler component, model management component, virtualization component, collection component, communication device, information provider component, processor component, data store, etc.), as described with regard to a particular system or method, can include the same or similar functionality as respective components (e.g., respectively named components or similarly named components) as described with regard to other systems or methods disclosed herein.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A method, comprising:
receiving, by a system comprising a processor, a set of industrial data from a set of devices of an industrial automation system and a set of extrinsic data relating to target device characteristics of a target device from an external device for storage in a data store on a cloud platform associated with the industrial automation system to facilitate backing up the industrial automation system on the cloud platform, wherein the external device is external to the industrial automation system and associated with a supplier or a manufacturer of the target device, and wherein the set of devices comprises a first device and a second device;
generating, by the system, model data representative of a model of the industrial automation system, based at least in part on a first modeling analysis of the set of industrial data, wherein the model data comprises configuration data indicative of a configuration of the first device and the second device;

determining, by the system, a functional role of the first device in a context of the industrial automation system, wherein the functional role of the first device is determined based at least in part on a result of analyzing a portion of the set of industrial data, wherein the portion of the set of industrial data comprises device characteristic data relating to characteristics of the first device from which the functional role of the first device is determined;

generating, by the system, function data indicative of the functional role of the first device in a device-agnostic form, based at least in part on the configuration data;

receiving, by the system, a request for target configuration data indicative of operational settings of the target device to facilitate enabling the target device to operate according to the functional role of the first device;

determining, by the system, the target device characteristics of the target device based at least in part on the set of extrinsic data relating to the target device characteristics of the target device, wherein the target device characteristics relate to the functional role;

translating, by the system, the function data from the device-agnostic format to generate target device function data in a target device-compatible format that is suitable for use by the target device, wherein the target device-compatible format is different from a device format suitable for use by the first device and the device-agnostic format, and wherein the target configuration data is determined based at least in part on the target device function data and the target device characteristics of the target device;

transmitting, by the system, the target configuration data to the target device, wherein the target configuration data is indicative of the operational settings of the target device suitable to enable the target device to operate according to the functional role of the first device;

in response to determining that the first device has been replaced with the target device in the industrial automation system, modifying, by the system, the model of the industrial automation system, based at least in part on a second modeling analysis of replacement-related industrial data relating to the replacement of the first device with the target device, to generate an updated model of the industrial automation system that accounts for changes to the industrial automation system resulting from the replacing of the first device with the target device, wherein the replacement-related industrial data is received from the industrial automation system;

determining, by the system, whether an alteration is to be made to the second device, based at least in part on analyzing the updated model, to account for a change in operation associated with the second device due in part to the replacing of the first device with the target device; and in response to determining that the alteration is to be made to the second device, transmitting, by the system, alteration data relating to the alteration to the second device to facilitate the alteration of the second device.

2. The method of claim 1, further comprising:

interfacing, by the system, the cloud platform, comprising the data store, with the industrial automation system to facilitate communicating information between the industrial automation system and the cloud platform, wherein the information comprises the set of industrial data, the configuration data, and the model data; and monitoring, by the system, the industrial automation system via the interfacing to facilitate the receiving of the set of industrial data from the set of devices of the industrial automation system.

3. The method of claim 1, wherein the model is a two-dimensional model or a three-dimensional model that replicates a system configuration and operation of the industrial automation system.

4. The method of claim 1, wherein the receiving the set of industrial data from the set of devices further comprises receiving a subset of the set of industrial data from an industrial device of the industrial automation system via a cloud gateway device, wherein the subset of industrial data relates to the industrial device, and wherein the industrial device is the first device or the second device.

5. The method of claim 4, wherein the subset of industrial data comprises at least one of a pre-deployed model that models characteristics and operation of the industrial device, identifier information that facilitates identification of the industrial device, information relating to one or more relationships between the industrial device and one or more other industrial devices or network-related devices associated with the industrial automation system, or information relating to the one or more other industrial devices or network-related devices.

6. The method of claim 4, wherein the generating the model data further comprises generating sub-model data of a sub-model of the industrial device based at least in part on analyzing the subset of industrial data, wherein the model data comprises the sub-model data.

7. The method of claim 1, further comprising:

generating, by the system, a product model of a product relating to the industrial automation system based at least in part on product design data and executable code relating to the product; and storing, by the system, the product model in the data store on the cloud platform.

8. The method of claim 7, further comprising:

downloading, by the system, the product model to a product generator device associated with the cloud platform to facilitate producing the product based at least in part on the product model.

9. The method of claim 1, further comprising:

generating, by the system, at least one of a set of agnostic or standardized configuration data or a set of agnostic or standardized model data associated with the industrial automation system, based at least in part on analyzing the set of industrial data, wherein at least one of the set of agnostic or standardized configuration data or the set of agnostic or standardized model data is in an agnostic or standardized format, and wherein the model comprises the set of agnostic or standardized model data.

10. The method of claim 9, further comprising:

determining, by the system, characteristics of the industrial automation system, based at least in part on the set of industrial data;

translating, by the system, at least one of the set of agnostic or standardized configuration data or the set of agnostic or standardized model data to at least one of a set of compatible configuration data or a set of compatible model data, based at least in part on a translation result of analyzing the characteristics of the industrial automation system, wherein at least one of the set of compatible configuration data or the set of compatible model data is compatible with the industrial automation system to facilitate configuring the industrial automation system, and wherein the set of compatible configuration data comprises the subset of compatible configuration data and the set of compatible model data comprises the subset of compatible model data; and downloading, by the system, at least one of the set of compatible configuration data or the set of compatible model data to the industrial automation system to facilitate configuring the industrial automation system.

11. The method of claim 10, further comprising:

determining, by the system, other characteristics of another industrial automation system, based at least in part on a set of other industrial data relating to the other industrial automation system;

translating, by the system, at least one of the set of agnostic or standardized configuration data or the set of agnostic or standardized model data to at least one of a set of different compatible configuration data or a set of different compatible model data, based at least in part on another translation result of analyzing the other characteristics of the other industrial automation system, wherein at least one of the set of different compatible configuration data or the set of different compatible model data is compatible with the other industrial automation system to facilitate configuring the other industrial automation system; and downloading, by the system, at least one of the set of different compatible configuration data or the set of different compatible model data to the other industrial automation system to facilitate configuring the other industrial automation system.

12. The method of claim 1, wherein the set of industrial data comprises at least one of first data relating to an industrial device of the set of devices, second data relating to an industrial process associated with the set of devices, third data relating to an industrial asset, fourth data relating to a network-related device of the set of devices that facilitates data communications associated with the industrial automation system, fifth data relating to at least one interrelationship between the at least one device and at least one other device of the set of devices, sixth data relating to an operating system associated with the industrial automation system, seventh data relating to software associated with the industrial automation system, or eighth data relating to firmware associated with the industrial automation system.

13. A non-transitory computer-readable storage medium storing computer-executable instructions that, in response to execution, cause a system comprising a processor to perform operations, comprising:

aggregating a set of industrial data from a set of devices of an industrial automation system and the set of extrinsic data from an external data source for storage in a data store on a cloud platform associated with the industrial automation system to facilitate backing up the industrial automation system on the cloud platform, wherein the set of devices comprises a first device and a second device;

generating model data based at least in part on a first modeling analysis of the set of industrial data, wherein the model data is indicative of a model of the industrial automation system, wherein the model data comprises configuration data indicative of a configuration of the first device and the second device;

translating device-dependent configuration data, indicative of an operational setting of the first device and having a first format, to device-agnostic function data, indicative of a function of the first device within the industrial automation system;

determining a second format associated with a target device;

determining target device characteristics of the target device based at least in part on the set of industrial data and the set of extrinsic data, wherein the target device characteristics relate to the function;

in response to determining the second format is associated with the target device, translating the device-agnostic function data to generate target device function data in the second format to facilitate determining target device-dependent configuration data in the second format, wherein the second format is different from the first format, and wherein the target device-dependent configuration data is determined based at least in part on the target device function data in the second format and the target device characteristics;

transmitting, to the target device, the target device-dependent configuration data indicative of a device-dependent operational setting of the target device that facilitates configuring the target device to perform the function of the first device;

subsequent to the first device being replaced with the target device in the industrial automation system, altering the model of the industrial automation system, based at least in part on a second modeling analysis of replacement-related industrial data relating to the replacement of the first device with the target device, to generate an updated model of the industrial automation system that reflects changes to the industrial automation system resulting from the replacement of the first device with the target device, wherein the replacement-related industrial data is obtained from the industrial automation system;

based at least in part on analyzing the updated model, determining whether the second device is to be reconfigured to account for a change in operation associated with the second device due in part to the replacement of the first device with the target device; and in response to determining that the second device is to be reconfigured, transmitting, to the second device, reconfiguration information relating to the reconfiguration of the second device to facilitate the reconfiguration of the second device.

14. The non-transitory computer-readable storage medium of claim 13, wherein the operations further comprise:

storing the model data representative of the industrial automation system in the data store on the cloud platform, wherein the model data replicates the industrial automation system.

15. A method, comprising:

collecting, by a system comprising a processor, a set of industrial data from a set of devices of the industrial automation system for storage in a data store on a cloud platform to facilitate backing up the industrial automation system on the cloud platform, wherein the set of devices comprises a first device and a second device;

based at least in part on a first modeling analysis of the set of industrial data, generating, by the system, model data representative of a model of the industrial automation system, wherein the model data comprises configuration data representative of a configuration of the first device and the second device, wherein the configuration data comprises first configuration data representative of a first configuration of the first device;

determining, by the system, a function of the first device within the industrial automation system;

translating, by the system, the first configuration data of the first device to function data representative of the function in a device-agnostic format;

in response to determining that a target device is replacing the first device in the industrial automation system and performing the function, determining, by the system, a target device-compatible format for the target device;

determining, by the system, target device characteristics of the target device based at least in part on a result of a first analysis of the set of industrial data and a set of extrinsic data relating to the target device characteristics of the target device, wherein the target device characteristics relate to the function, and wherein the set of extrinsic data is received from an external device;

translating, by the system, the function data from the device-agnostic format to target device function data in the target device-compatible format to facilitate determining target configuration data in the target device-compatible format, wherein the target device-compatible format is different from a format associated with the first device and the device-agnostic format, wherein the target configuration data is determined based at least in part on the target device function data and the target device characteristics of the target device, and wherein the target configuration data is communicated to the target device;

in response to replacing the first device with the target device in the industrial automation system, adjusting, by the system, the model of the industrial automation system, based at least in part on a second modeling analysis of replacement-related industrial data relating to the replacing of the first device with the target device, to generate an updated model of the industrial automation system that models changes to the industrial automation system resulting from the replacing of the first device with the target device, wherein the replacement-related industrial data is obtained from the industrial automation system;

determining, by the system, whether an adjustment is to be made to the second device, based at least in part on a second analysis of the updated model, to account for a change in operation associated with the second device due in part to the replacing of the first device with the target device; and in response to determining that the adjustment is to be made to the second device, communicating, by the system, adjustment information relating to the adjustment to the second device to facilitate the adjustment of the second device.

16. The method of claim 15, further comprising:

interfacing, by the system, the cloud platform, comprising the data store, with the industrial automation system via a cloud gateway device to facilitate communicating information between the industrial automation system and the cloud platform, wherein the information comprises at least one of a portion of the set of industrial data, the configuration data, or the model data; and monitoring, by the system, the industrial automation system via the interfacing to facilitate the collecting of at least the portion of the set of industrial data from the set of devices.

17. The method of claim 15, further comprising:

determining, by the system, the target configuration data in the target device-compatible format, based at least in part on the target device characteristics and the target device-compatible format, to have the target device configured, based at least in part on the target configuration data, to perform the function; and communicating, by the system, the target configuration data to the target device, wherein the target device is configured, based at least in part on the target configuration data, to have the target device perform the function.

18. The method of claim 15, further comprising:

generating, by the system, an industrial device model of an industrial device of the industrial automation system based at least in part on a modeling result of the first modeling analysis of a subset of the set of industrial data, wherein the industrial device is the first device, the second device, or the target device.

19. The method of claim 18, wherein the subset of industrial data comprises at least one of a subset of the model data, pre-deployed model data of a pre-deployed model that models characteristics and operation of the industrial device, identifier information that facilitates identification of the industrial device, device relationship information relating to one or more relationships between the industrial device and one or more other industrial devices or network-related devices associated with the industrial automation system, or information relating to the one or more other industrial devices or network-related devices.

20. The method of claim 15, further comprising:

generating, by the system, a product model of a product relating to the industrial automation system based at least in part on product design information and executable code relating to the product, wherein the product model is stored in the data store on the cloud platform.

21. The method of claim 20, wherein the product model comprises the product design information and the executable code, wherein the product design information and the executable code are representative of and enable manufacture of the product.

22. The method of claim 15, wherein the adjustment to the second device comprises a parameter modification of a parameter of the second device, a connection modification of a connection associated with the second device, or a software or firmware modification of software or firmware of the second device.

23. The method of claim 15, wherein the change in the operation associated with the second device is a first change in the operation, and wherein the method further comprises:

detecting, by the system, a second change to the industrial automation system.

24. The method of claim 23, wherein the second change to the industrial automation system comprises at least one of an addition of an industrial device or a network-related device to the industrial automation system, a replacement of a first industrial device with a second industrial device in the industrial automation system, a replacement of a first network-related device with a second network-related device in the industrial automation system, a connection modification of a connection associated with the first industrial device or the first network-related device, a parameter modification of a parameter associated with the first industrial device or the first network-related device, or a software or firmware modification of software or firmware associated with the first industrial device or the first network-related device.

25. The method of claim 15, further comprising:

receiving, by the system, a set of legacy industrial device data from a communication device that obtains the set of legacy industrial device data from a legacy industrial device of the set of devices, wherein the legacy industrial device is part of the industrial automation system.

26. The method of claim 25, wherein the result of the first analysis is a first result, wherein the set of legacy industrial device data comprises visual images of the legacy industrial device captured by the communication device, and wherein the method further comprises:

- based at least in part on a second result of a third analysis of the visual images, determining, by the system, a manufacturer and a device model of the legacy industrial device, a connection between the legacy industrial device and the second device, and at least one operational characteristic of or associated with the legacy industrial device, wherein the at least one operation characteristic comprises a mechanical latency associated with operation of the legacy industrial device.

27. The method of claim 26, further comprising:

- deriving, by the system, at least a portion of the set of legacy industrial device data from the visual images based at least in part on a recognizer technique or an optical character recognition technique utilized as part of the third analysis of the visual images.

28. The method of claim 15, further comprising:

at least one of:

- processing, by the system, the set of industrial data to generate a set of configuration information in an agnostic or standardized format, or
- processing, by the system, the model data of the model to structure the model data in the agnostic or standardized format; and
- storing, by the system, the set of configuration information or the model data in the agnostic or standardized format.

29. The method of claim 15, wherein the set of industrial data comprises at least one of first data relating to an industrial device of the set of devices, second data relating to an industrial process associated with the set of devices, third data relating to an industrial asset, fourth data relating to a network-related device of the set of devices that facilitates data communications associated with the industrial automation system, fifth data relating to at least one interrelationship between at least one device and at least one other device of the set of devices, sixth data relating to an operating system associated with the industrial automation system, seventh data relating to software associated with the industrial automation system, or eighth data relating to firmware associated with the industrial automation system.

* * * * *